United States Patent
Gordaychik

(10) Patent No.: US 12,550,171 B2
(45) Date of Patent: Feb. 10, 2026

(54) TRANSMIT POWER CONTROL VIA DOWNLINK CONTROL INFORMATION

(71) Applicant: Brian Gordaychik, Columbus, NJ (US)

(72) Inventor: Brian Gordaychik, Columbus, NJ (US)

( * ) Notice: Subject to any disclaimer, the term of this patent is extended or adjusted under 35 U.S.C. 154(b) by 381 days.

(21) Appl. No.: 17/945,635

(22) Filed: Sep. 15, 2022

(65) Prior Publication Data

US 2023/0019892 A1 Jan. 19, 2023

Related U.S. Application Data

(63) Continuation of application No. 16/950,369, filed on Nov. 17, 2020, now abandoned, which is a
(Continued)

(51) Int. Cl.
*H04W 72/51* (2023.01)
*H04L 1/00* (2006.01)
(Continued)

(52) U.S. Cl.
CPC ........... *H04W 72/51* (2023.01); *H04L 1/0013* (2013.01); *H04L 1/08* (2013.01); *H04L 1/1671* (2013.01); *H04L 1/1835* (2013.01); *H04L 1/1854* (2013.01); *H04L 1/1887* (2013.01); *H04L 1/1896* (2013.01); *H04L 5/0058* (2013.01); *H04L 67/125* (2013.01); *H04W 8/22* (2013.01); *H04W 28/16* (2013.01); *H04W 52/18* (2013.01); *H04W 52/54* (2013.01); *H04W 52/58* (2013.01); *H04W 72/044* (2013.01); *H04W 72/23* (2023.01); *H04W 74/0833* (2013.01); *H04W 74/0836* (2024.01)

(58) Field of Classification Search
CPC ....... H04W 72/51; H04W 72/23; H04W 8/22; H04W 28/16; H04W 52/18; H04W 52/54; H04W 52/58; H04W 72/044; H04W 74/0833; H04L 1/0013; H04L 1/08; H04L 1/1671; H04L 1/1835; H04L 1/1854; H04L 1/1887; H04L 1/1896; H04L 5/0058; H04L 67/125
See application file for complete search history.

(56) References Cited

U.S. PATENT DOCUMENTS 8,982,801 B2 3/2015 Shin et al.
9,031,600 B2 5/2015 Pelletier et al.
(Continued)

OTHER PUBLICATIONS

Huawei, HiSilicon, Compact DCI for URLLC, 3GPP TSG RAN WG1 Ad-Hoc Meeting 1901 R1-1900863 Taipei, Jan. 21-25, 2019.
(Continued)

*Primary Examiner* — Michael Thier
*Assistant Examiner* — Nevena Zecevic Sandhu

(57) ABSTRACT

A method performed by a user equipment may comprise receiving first DCI of a first DCI format and receiving second DCI of a second DCI format which is different than the first DCI. The second DCI format may specify a variable number of TPC command bits and may include no less than 6 bits of TPC information. The second DCI format may be a variable length DCI format. A number of information bits of the second DCI may be less than or equal to a number of information bit of the first DCI. The second DCI may be scrambled with a SRS RNTI.

4 Claims, 9 Drawing Sheets

Related U.S. Application Data continuation of application No. 16/421,034, filed on May 23, 2019, now Pat. No. 10,880,895.

(60) Provisional application No. 62/830,478, filed on Apr. 7, 2019, provisional application No. 62/800,464, filed on Feb. 2, 2019, provisional application No. 62/775,342, filed on Dec. 4, 2018, provisional application No. 62/728,032, filed on Sep. 6, 2018, provisional application No. 62/677,016, filed on May 27, 2018.

(51) Int. Cl.

| | |
|---|---|
| *H04L 1/08* | (2006.01) |
| *H04L 1/1607* | (2023.01) |
| *H04L 1/1829* | (2023.01) |
| *H04L 1/1867* | (2023.01) |
| *H04L 5/00* | (2006.01) |
| *H04L 67/125* | (2022.01) |
| *H04W 8/22* | (2009.01) |
| *H04W 28/16* | (2009.01) |
| *H04W 52/18* | (2009.01) |
| *H04W 52/54* | (2009.01) |
| *H04W 52/58* | (2009.01) |
| *H04W 72/044* | (2023.01) |
| *H04W 72/23* | (2023.01) |
| *H04W 74/0833* | (2024.01) |
| *H04W 74/0836* | (2024.01) |

(56) References Cited

U.S. PATENT DOCUMENTS

| | | | |
|---|---|---|---|
| 10,212,755 B1* | 2/2019 | Pawar | H04W 72/541 |
| 11,277,238 B2 | 3/2022 | Chen et al. | |
| 2014/0295909 A1* | 10/2014 | Ouchi | H04W 52/245 |
| | | | 455/522 |
| 2015/0099555 A1* | 4/2015 | Krishnaswamy | H04W 4/70 |
| | | | 455/509 |
| 2015/0223213 A1* | 8/2015 | Moon | H04W 52/325 |
| | | | 370/329 |
| 2018/0098307 A1* | 4/2018 | Yang | H04L 5/0094 |
| 2019/0159126 A1* | 5/2019 | Kadiri | H04L 5/0057 |
| 2019/0222364 A1* | 7/2019 | Shimoda | H04W 80/02 |
| 2020/0059912 A1* | 2/2020 | Shen | H04L 5/0094 |
| 2020/0162212 A1* | 5/2020 | Liu | H04W 72/0446 |
| 2020/0337038 A1* | 10/2020 | Takeda | H04L 1/00 |
| 2020/0404617 A1* | 12/2020 | Murray | H04W 16/28 |
| 2021/0058215 A1* | 2/2021 | Si | H04L 5/001 |
| 2021/0289532 A1* | 9/2021 | Zhang | H04W 72/23 |
| 2024/0224227 A1* | 7/2024 | Lee | H04L 5/0007 |

OTHER PUBLICATIONS

Intel Corporation, On multi-TRP/multi-panel transmission, 3GPP TSG RAN WG1 Ad-Hoc Meeting 1901 R1-1901275 Taipei, Taiwan, Jan. 21-25, 2019.

\* cited by examiner

| TPC Command | Value (in dB) | 4-Bit TPC Command | Value (in dB) | 5-Bit TPC Command | Value (in dB) | 6-Bit TPC Command | Value (in dB) | 6-Bit TPC Command | Value (in dB) |
|---|---|---|---|---|---|---|---|---|---|
| 0 | -6 | 0 | -7 | 0 | -7 | 0 | -7 | 32 | 1 |
| 1 | -4 | 1 | -6 | 1 | -6.5 | 1 | -6.75 | 33 | 1.25 |
| 2 | -2 | 2 | -5 | 2 | -6 | 2 | -6.5 | 34 | 1.5 |
| 3 | 0 | 3 | -4 | 3 | -5.5 | 3 | -6.25 | 35 | 1.75 |
| 4 | 2 | 4 | -3 | 4 | -5 | 4 | -6 | 36 | 2 |
| 5 | 4 | 5 | -2 | 5 | -4.5 | 5 | -5.75 | 37 | 2.25 |
| 6 | 6 | 6 | -1 | 6 | -4 | 6 | -5.5 | 38 | 2.5 |
| 7 | 8 | 7 | 0 | 7 | -3.5 | 7 | -5.25 | 39 | 2.75 |
|  |  | 8 | 1 | 8 | -3 | 8 | -5 | 40 | 3 |
|  |  | 9 | 2 | 9 | -2.5 | 9 | -4.75 | 41 | 3.25 |
|  |  | 10 | 3 | 10 | -2 | 10 | -4.5 | 42 | 3.5 |
|  |  | 11 | 4 | 11 | -1.5 | 11 | -4.25 | 43 | 3.75 |
|  |  | 12 | 5 | 12 | -1 | 12 | -4 | 44 | 4 |
|  |  | 13 | 6 | 13 | -0.5 | 13 | -3.75 | 45 | 4.25 |
|  |  | 14 | 7 | 14 | 0 | 14 | -3.5 | 46 | 4.5 |
|  |  | 15 | 8 | 15 | 0.5 | 15 | -3.25 | 47 | 4.75 |
|  |  |  |  | 16 | 1 | 16 | -3 | 48 | 5 |
|  |  |  |  | 17 | 1.5 | 17 | -2.75 | 49 | 5.25 |
|  |  |  |  | 18 | 2 | 18 | -2.5 | 50 | 5.5 |
|  |  |  |  | 19 | 2.5 | 19 | -2.25 | 51 | 5.75 |
|  |  |  |  | 20 | 3 | 20 | -2 | 52 | 6 |
|  |  |  |  | 21 | 3.5 | 21 | -1.75 | 53 | 6.25 |
|  |  |  |  | 22 | 4 | 22 | -1.5 | 54 | 6.5 |
|  |  |  |  | 23 | 4.5 | 23 | -1.25 | 55 | 6.75 |
|  |  |  |  | 24 | 5 | 24 | -1 | 56 | 7 |
|  |  |  |  | 25 | 5.5 | 25 | -0.75 | 57 | 7.25 |
|  |  |  |  | 26 | 6 | 26 | -0.5 | 58 | 7.5 |
|  |  |  |  | 27 | 6.5 | 27 | -0.25 | 59 | 7.75 |
|  |  |  |  | 28 | 7 | 28 | 0 | 60 | 8 |
|  |  |  |  | 29 | 7.5 | 29 | 0.25 | 61 | 8.25 |
|  |  |  |  | 30 | 8 | 30 | 0.5 | 62 | 8.5 |
|  |  |  |  | 31 | 8.5 | 31 | 0.75 | 63 | 8.75 |

FIG. 2

| UE Capability | $L_{NWUS\,Max}$ | Actual NWUS Durations Set |
|---|---|---|
| NWUS Regular Capable | 1 | {1} |
| NWUS Regular Capable | 2 | {1,2} |
| NWUS Regular Capable | 4 | {1,2,4} |
| NWUS Regular Capable | 8 | {1,2,4,8} |
| NWUS Regular Capable | 16 | {1,2,4,8,16} |
| NWUS Regular Capable | 32 | {1,2,4,8,16,32} |
| NWUS Regular Capable | 64 | {1,2,4,8,16,32,64} |
| NWUS Regular Capable | 128 | {1,2,4,8,16,32,64,128} |
| NWUS Regular Capable | 256 | {1,2,4,8,16,32,64,128,256} |
| NWUS Regular Capable | 512 | {1,2,4,8,16,32,64,128,256,512} |
| NWUS Regular Capable | 1024 | {1,2,4,8,16,32,64,128,256,512,1024} |
| NWUS Ext Capable | 2048 | {1,2,4,8,16,32,64,128,256,512,1024, 2048} |
| NWUS Ext Capable | 4096 | {1,2,4,8,16,32,64,128,256,512,1024, 2048,4096} |
| NWUS Ext Capable | 8192 | {1,2,4,8,16,32,64,128,256,512,1024, 2048,4096,8192} |
| NWUS High Ext Capable | 16384 | {1,2,4,8,16,32,64,128,256,512,1024, 2048,4096,8192,16384} |
| NWUS High Ext Capable | 32768 | {1,2,4,8,16,32,64,128,256,512,1024, 2048,4096,8192,16384,32768} |
| NWUS High Ext Capable | 65536 | {1,2,4,8,16,32,64,128,256,512,1024, 2048,4096,8192,16384,32768,65536} |

FIG. 3

TRANSMIT POWER CONTROL VIA DOWNLINK CONTROL INFORMATION

CROSS REFERENCE TO RELATED APPLICATIONS

This application is a continuation of U.S. application Ser. No. 16/950,369 filed Nov. 17, 2020 which is a continuation of U.S. application Ser. No. 16/421,034 filed May 23, 2019, which issued as U.S. Pat. No. 10,880,895 on Dec. 29, 2020, which claims the benefit of U.S. Provisional Application Ser. No. 62/677,016 filed on May 27, 2018, U.S. Provisional Application Ser. No. 62/728,032 filed on Sep. 6, 2018, U.S. Provisional Application Ser. No. 62/775,342 filed on Dec. 4, 2018, U.S. Provisional Application Ser. No. 62/800,464 filed on Feb. 2, 2019 and U.S. Provisional Application Ser. No. 62/830,478 filed on Apr. 7, 2019, the contents of each of which are hereby incorporated by reference herein.

SUMMARY

A method performed by a user equipment may comprise receiving first downlink control information (DCI) of a first DCI format and receiving second DCI of a second DCI format which is different than the first DCI. The second DCI format may specify a variable number of TPC command bits and may include no less than 6 bits of TPC information. The second DCI format may be a variable length DCI format. A number of information bits of the second DCI may be less than or equal to a number of information bit of the first DCI. The second DCI may be scrambled with a sounding reference signal (SRS) RNTI.

BRIEF DESCRIPTION OF THE DRAWINGS

FIG. 2 is an illustration of example transmit power control (TPC) values;

FIG. 3 is a table of example wake up signal duration settings;

DETAILED DESCRIPTION

Figure 1:
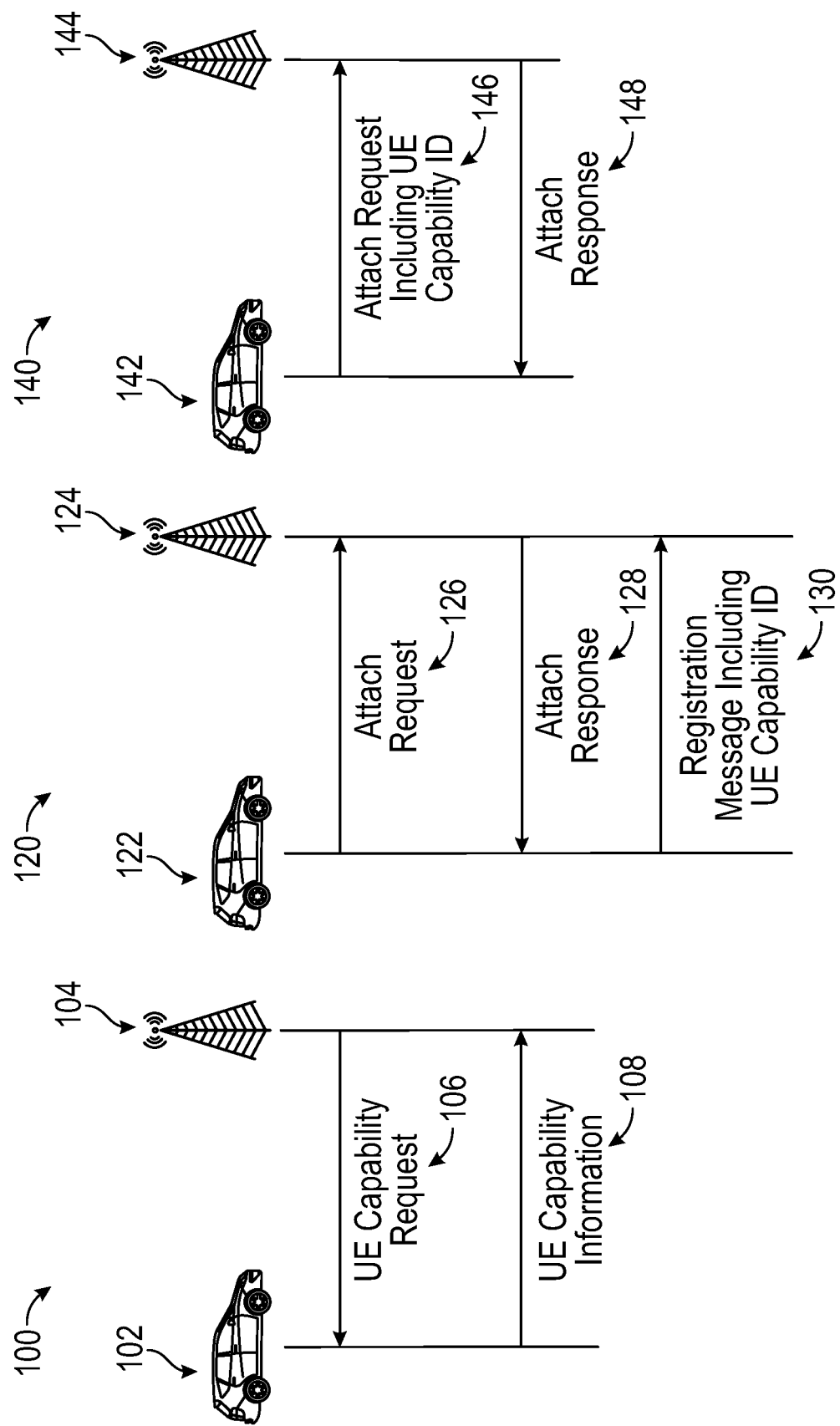
FIG. 1 is an illustration of an embodiment in which a capability identifier (ID) is included in an attach request message.

In next generation radio technologies, a user equipment (UE) capability identifier (ID) may specify or indicate capabilities which are common across various devices and device types. This capability ID may be signaled or used in a registration request or other message to a network, for example during initial access, handover, association, random access or the like. In response to a registration request, which may or may not include a capabilities transmission, the UE may receive a registration area configuration with an indication that capabilities are acceptable for a registered area. All registered capabilities or a portion of the registered capabilities may be accepted or acceptable by the network. A network, for example, an Access and Mobility Management Function (AMF) and a next generation Node B (gNB) may send a capability enquiry message to the UE for responding, by the UE, with the capability information, i.e. the capability ID. The network may assign a new capability to the UE once the UE is determined to have an enhanced capability.

Support for a capability identifier may itself be a capability of a UE which may need to be reported prior to the capability identifier. There may be common sets of capabilities defined, for example, using a database or lookup table (LUT) method which provides an index to a particular capability identifier based on a type, classification, code, capability or the like. There may be a lookup performed, by the UE for example using Huffman coding, or LZW coding etc. A more typical cellular based coding may be employed, for example, a gold sequence may be used to signify levels of a particular capability. Using a gold sequence, a particular sequence of bits may refer to the capability, while the shift in the sequence refers to a capability version. A coding or hashing of a portion of the capability identifier may be indicated by a manufacturer specific or public land mobile network (PLMN) specific portion of the capability identifier. The ID may be sent in RRC, MAC, NAS or other signaling protocols. A DCI may indicate resources for the transmission of the capability ID. One or more capability IDs may represent access stratum vs. non access stratum capabilities. In an embodiment, a capability ID may be included in a MAC header, for example, coded in a duration/ID field.

A hash of the capabilities may be performed via a secure hash algorithm (SHA) hash or another secure hash. A UE may support a capability to compress information before transmission or decompress information after reception. The compression may be used to compress/decompress the capability ID itself. The capability identifier may be compressed, for example at a radio resource control (RRC), Packet Data Convergence Protocol (PDCP) layer or other layer and may also be segmented if necessary. A system information block (SIB) may indicate a type of compression used and the UE may respond with a compressed capability ID according to the compression type. Compression may be lossy compression or lossless compression. One base station may provide lossy information compression while another provides less lossy or lossless compression information. An ID may be transmitted along with other UE parameters including a unique UE identifier. A UE ID may be permanent or be comprised of a permanent portion and a temporary portion, for example, similar to a changing RSA code. A UE ID may comprise a portion of an International Mobile Equipment Identity (IMEI), for example, a TAC/FAC. The UE ID may contain a checksum.

A device may or may not recognize a UE capability ID. For example a base station, relay TRP etc. may not have seen a newer device which has a recent capability ID. The base station may request a capability table from the UE so that the device can update it set of capabilities. Alternatively, the device may reach out to a network entity, for example, an HLR etc for an updated table to match the transmitted capability ID of the UE. Capability IDs may be stored in the RAN or core network. Capability ID may be reported as a delta from a previous capability ID.

FIG. 1 illustrates embodiments 100, 120, 140 in which a capability ID may be provided to a network. In a first embodiment 100, a UE 102, for example a vehicle, may receive a UE capability request 106 from a gNB 104. In response, the UE 102 may provide a UE capability information message 108 including a UE capability ID to the gNB 104. In a second embodiment 120, a UE 122 may send an attach request 126 to a gNB 124. An attach response 128 sent from the gNB 124 to the UE 122 may or may not request a capability ID. The UE 122 may respond with a registration message including a UE capability ID 130. In a third embodiment 140, a UE 142 may transmit an attach request message 146 including a UE capability ID. The gNB 144 may respond with an attach response 148 indicating acceptance of the UE capabilities.

If the network cannot discern the capability ID, the network may request the UE transmit capability bitmap or a capability indicator in another format. The capability ID may include cellular specific elements only, for example, an ability to communicate via a particular protocol or a device type (new radio, LTE, machine type communication (MTC), narrowband, etc). The capability ID may also indicate non cellular specific information such as a high level device type, for example, a vehicle or drone. In this way, vehicle specific information may be includes, i.e. car, motorcycle, vessel or the like. One vehicle specific example includes a capability of detecting and reporting fog, by the car, motorcycle, vessel or the like. Detecting fog may be achieved via a single photon avalanche diode or camera or other wireless means, thus, the UE may report an indication of the diode, camera or other hardware. The car may transmit information of the detected fog levels to other vehicles, or use this information when reading street signs or making assessments as to road conditions. A boat or vessel may have sensors and transceivers mounted on elements including motors, engines, sails, a hull etc. For a drone, a speed capability or altitude ability may be detected and/or included in a transmission. This ability to indicate something for which a cellular network may have no information to may be performed via a lookup to a manufacturer (for example Ford or Nissan) or a standard based organization (3GPP, NIST, or the like).

In some examples, the capability identifier may be multi-format capable, for example, it may include a base indicator plus additional features or capabilities. In one example, a 5G release version may be a base indication and feature characteristics may be appended. The base features may be considered mandatory while add on capabilities are considered optional. There may be specific numbering and identification of or for a 5G system architecture. There may also be application to USIM/ISIM application/HPSIM and USAT. The capability identifier may provide or indicate support for group message capability. It may also indicate radio access technology type. Examples of base features may also include an indication of supported modulation types, for example 256QAM for a downlink shared channel or pi/2-BPSK for an uplink control channel for example. Modulation types may be supported on a per band basis, a per BWP basis etc. For example, 256QAM may not be supported while a 128 QAM modulation is supported. Control channels may consist of or may be comprised of 32 or 64 control channel elements. Uplink control channel formats may be any format in the range of [0:10] or more. A capability indicator may indicate support for rate matching, for which the base station may provide an indicator via DCI or other methods. Base support may include base subcarrier spacings of 15/30/60/120 khz subcarrier spacing and thus may not need to be incorporated in a capability identifier. Support for other subcarrier spacing options may be delineated as an offset or indicator from the base spacing. Other features may include amount of baseband processing memory (which may be applicable to carrier aggregation); support for SCells with or without typical NR SS/PBCH block occurring with a 16 frame period, a maximum number of MIMO layers, RX beam switching and support for basic or advanced CSI feedback type(s). CSI types may include zero padding (ZP) and nonzero padding (NZP) CSI. A number of ZP or NZP elements may be reported prior to, simultaneously with or following a payload transmission. Before or after an RX beam is switched, the UE may transmit CSI feedback. As used herein, the term SCell may refer to a secondary cell, for example, a supplementary uplink cell which operates in addition to a PCell or regular uplink cell. Cells may be organized into cell groups which each have primary cell and zero or more secondary cells.

In one embodiment, a UE may detect a synchronization signal (SS) and attempt to determine whether to initiate random access on a cell based on the SS or contents of the PBCH block. The UE may due this at initial access, upon handover, or the like in accordance with based on pre-indicated or preconfigured frequencies. The UE may receive a MIB or SIB before handover and before initiating random access. It may be that the MIB or SIB contains information for aiding in random access. It could also be that the MIB or SIB provide other information for the UE.

A capability indicator may be used to report capability for virtual reality aspects including graphics processing capabilities, microphone capabilities, speaker capabilities, headset capabilities, etc. Other capabilities may include 3D audio capabilities. For example, a capability for supporting virtual reality chat may be exchanges in addition to support for other chat/messaging services. If virtual reality chat is not available, a call may fall back to video chat or audio chat. Alternatively, a text based chat may also be one embodiment. In one embodiment, 3D audio may be channel, object or scene based and each one of these may be separate capabilities reported. 3D video may also be supported by a UE with or without the use of glasses. For example, a UE may be configured to support one or more point cloud attributes of 3D video including certain color triples and reflectance attributes. A UE may support a holographic display with a wave guide or other means. Alternatively, legacy only audio support may be indicated. A number of supported channels, codecs, number of MOPS and/or sampling rates may be provided. In one embodiment, a sampling device may be integrated into a baseband chipset. In this way, sampling, for example, an accelerometer input may be done by a same chipset as which is converting the sampled information to transmission data. This may lower latency in a surgical system, anatomical vision system or mission critical system. Thus, a remote doctor/analyst may be provided with images and control information from an imaging device, for example, an endoscope or other scope.

Voice or video applications may have their own priorities including and aside from Quality of Service (QoS) or Quality of Experience (QoE). For example, a support for live uplink streaming may be indicated. A number of encoders/decoders may be provided. Video and audio, for example, spatialized audio, may be received in accordance with the transmitted capabilities. UEs may be musical instruments, for example, guitars, drum sets, or the like which have pickups or other microphones which are powered by batteries configured to the shape of the device. For example, a guitar may be fully battery powered and may transmit a signal to a receiver for providing it (relaying it) to an amplifier or other device. Some capabilities may be power related, for example a capability of the UE to transmit two or more signals simultaneously on different channels or carriers. These capabilities may include capabilities to simultaneously transmit periodic and/or non periodic transmissions.

Simultaneous transmissions may occur on fixed frequency or beam offsets. For example, two same transmissions may occur at different frequency positions. Transmissions may change over time, for example, at a next TTI in time, the frequency positions of both simultaneous transmission may change with respect to the previous transmission.

Signals transmitted may include reference signals such as a sounding reference signal (SRS), phase tracking reference signals (PTRSs), pilot signals, data signals, discovery reference signals or the like. These signals may be associated with one another and/or transmitted with one another. The network may transmit triggers, via downlink control information (DCI), based on a capability to report SRS, report CSI or the like. There may be different types of SRS based on capability and the gNB may need to indicate which type (or implicitly indicate an SRS TX, having the capability information in hand). These signals may be allowed in all symbols, some symbols or no symbols of a slot or subframe. Transmissions may be scrambled with a SRS RNTI. A UE may have a capability indicator which indicates a capability to avoid SRS collisions when the UE must transmit user or control information. Alternatively, when SRS collides with another signal, for example, HARQ feedback, the UE may not have a capability of avoiding the collision. HARQ may be performed using chase combining or incremental redundancy. The capability indicator may be based on a UE power capability, frequency capability or other capability. The indicator may not necessarily be a maximum capability in terms of power, frequency, etc. but may relate to a maximum efficient capability. There may be multiple SRS resources configured in a slot, subslot, subframe or the like configured via DCI or other means. Each configuration type may have a different number of SRS ports, for example, 1, 2, 3 or 4 ports. SRS resources may be indicated using a panel identifier.

For example, the indicator may provide a maximum number of antennas that the UE may currently support while maintaining a conservative power threshold. The power threshold, or another threshold disclosed herein, may be measured as a % from normal operating conditions or as a % from a baseline. In one embodiment, the capability may relate to an ability for the UE to receive a signal indicating a switch to a lower number of antennas so as to conserve power, battery and complexity.

A UE may have one capability supported for operation using a PCELL or master cell. The UE may have another capability supported for a SCELL or secondary cell. The same may be true for a cell of another technology or frequency. A cell may be divided into a number of parts, for example, based on direction, frequency, one or more TRPs or the like. A UE may report capabilities which are different for uplink and downlink, the supported frequency or the like. In the downlink, a UE may support a wider array of frequencies than the downlink, i.e. the uplink may only support a narrow band. For example, the UE may support limited DCI formats including narrowband DCI formats denoted as Nx based formats, for example, preexisting formats including: N0, N1, N2 as well as new formats including N3, N4 and N5 which may be defined as providing parameters and control information herein. Each may be provided to UEs which may have the capability to support the format. The UE may report the frequencies, frequency bands (for example, 2.4 ghz, 4.9 ghz, 5 ghz, 5.9 ghz, 6 ghz, 60 ghz etc.), number of supported bandwidth parts, numerology, subcarrier spacing or the like to a base station during a capability report. The UE and base station may tailor bandwidth accordingly. A capability of supporting channel bandwidths including 15 MHz, 20 MHz, 25 MHz, 27.5 MHz, 30 MHz, 35 MHz, 37.5 MHz, 40 MHz, 50.5 MHz and 50 MHz may be transmitted. A capability of supporting subcarrier spacings may include spacings of 15 kHz, 30 kHz, 45 KHz and 60 kHz among others. Channel bandwidths may be further broken down. For example, a 20 MHz bandwidth may be broken into two 10 MHz channels, of which one may be a primary channel and another may be a secondary channel. If a STA is able to transmit on one channel, but the other is busy, then the STA may be limited to 10 MHz transmission. Otherwise, both 10 MHz channels may be made available. Other bandwidths disclosed herein may be broken into 2 half-width channels or the like. A single preamble may be sent on one 10 MHZ channel, while the other channel carries data. Or, preambles may be sent on both channels followed by data transmissions. A receiver may reconstruct a PDU or packet from both data segments on each 10 MHZ channel. Alternatively, each channel may convey data of a single PDU.

A UE using a numerology and particular subcarrier spacing may receive a demodulation reference signal (DMRS) and may also transmit a DMRS in the uplink. The DMRS may be UE specific and the UE may receive multiple (or transmit) multiple DMRSs which are separated by frequency, code, beam or the like. In this way, multiple orthogonal DMRS signals may be received (or transmitted) in MIMO scenarios. Some DMRS may be narrowband, some may be wideband. Any one of the signals or parameters transmitted or received herein may be transmitted with a specific offset from DMRS. This may include control and/or data information for example, SIBs. In one embodiment, the UE may group DMRS on a per base station or per TRP basis. In this way, multiple DMRS per TRP may share a parameter or may be initialized in a first way. Multiple DMRS per another TRP may share a different parameter or may be initialized in a second way. The initialization may be according to an initialization sequence. The groups may include uplink and downlink signals or may not be in accordance with an initialization sequence, for example, groups may be based on UE ID, location or capability. A UE may indicate a capability of supporting a DMRS type or a sequence type. This may aid in backwards capability wherein DMRS are not provided to UEs who cannot receive them. Groups of UEs may be assigned to a same carrier, same beam, same resource, same resource block, same resource block group (RBG) or the like. Groups may be determined based on location, capability or the like. DCI may provide an indication of resource unit, resource block or resource block group (RBG) for uplink or downlink purposes, based on a capability indication.

An indicator of antenna, transceiver or processing capability may be provided by a UE or other network element. One such indicator may indicate a processing technique such as an interference alignment technique. This type of technique may involve aligning transmitters of a plurality or a group of UEs. Alternatively, transceivers of a single UE may be aligned. For example, one or more NR transceivers, WiFi transceivers and a satellite transceiver may be aligned. This may involve having a broad understanding of the transmission qualities and interference with respect to each transmitter of the group of transmitters. In one embodiment, a base station may relay feedback of other UEs to one or more UEs. This may include CSI, beamforming feedback or other information. This may be accomplished through a new downlink control information (DCI) format, broadcast information or other transmission. Alternatively, on in combination, information may be passed directly among the UEs. Feedback may be quantized or compressed, for example using discrete Fourier transform (DFT) or discrete cosine transform (DCT). Other feedback types include transmitted precoding matrix identifier (TPMI) and one or more rank indicator(s). Pre-coding information may be provided to the UE. Feedback may be based on a number of base stations which the UE in in communication with. For example, for rank, the UE may have already dedicated X layers to one gNB and thus is only capable of, for example, X-Y layers with another gNB. Feedback may be signal-to-interference-plus-noise ratio (SINR) or may be SNR based. In an embodiment, feedback or other transmissions may occur when SNR or SINR occurs below or above a threshold level. Other feedback may be DCT compressed, for example, port selection feedback, CSI feedback or the like. The UE may determine the feedback type or quality based on capability or network conditions.

A UE may, for a periodic or an aperiodic transmission, for example a CSI transmission, when configured with another transmission of any signals herein, may be either multiplexed accordingly or dropped. CSI of another carrier or subcarrier may be multiplexed, for example, with an eMBB transmission. For example, if an ultra reliable low latency communication (URLLC) transmission is scheduled at a same time as feedback signals, for example, the UE may move the URLLC transmission to the first symbols of the grant and delay a portion of the lower priority traffic. Any remaining portion of the lower priority traffic that does not fit in the resources granted may be dropped. The grant itself may convey priority information such that subsequent grants may override or be dropped according to priority. Transmission of feedback signals may be based on priority of the feedback or other pending transmissions. Transmissions comprising URLLC and eMBB may be multiplexed along with or without uplink control information (UCI) based on an indication received in a DCI format. DCI formats may also indicate the priority of the UCI information or a priority of any other indicated UL/DL information. For example, eMBB transmission may employ a different UCI format than URLLC transmissions. Information regarding the UCI format, for example, a number of symbols used may be provided in DCI or other higher layer signaling.

eMBB control channels may polar coded with cyclic redundancy check bits. URLLC may be polar coded as well. Polar codes may operate based on successive cancellation or belief propagation (BP). Polar decoding may be combined with CRC codes, for example, candidates that do not satisfy the CRC can be culled. Thus, a UE receiving information over a control channel may check the CRC against polar decoding candidates and if there is a match, then the candidate is provided up the stack. If there is no match, after a given number of decoding attempts, the UE may report a HARQ-NACK or simply discard the data.

Depending on the coding, URLLC and eMBB control information may be multiplexed. Low density parity check (LDPC) codes may also be used for the data transmissions, the control information, the multiplexing or the like. An indicator may be used to indicate transmissions of URLLC vs. eMBB and the coding for each transmission. Feedback from joint URLLC/eMBB PDSCHs may be multiplexed or combined in accordance with or based on an MCS. For example, if an MCS is above a threshold then the multiplexing may occur. Otherwise it may not. Feedback transmissions may be based on traffic/load conditions of a cell. For example, highly loaded cells may require more or less feedback than empty (or near empty) cells from the UEs associated with those cells. Any control information element or format may be multiplexed with a shared channel transmission or reception. Multiplexing may be performed in time, frequency, beam or another format. PDSCH transmissions may be grouped and may have an associated HARQ-ACK configuration which may be symbol, sub-slot, or slot based depending on a value or configuration of K1. For example, K1 may be an offset between when PDSCH is completed, i.e. the last PDSCH symbol and the starting symbol of PUCCH. K1 may be measured by slots, sub-slots or symbols and may be based on numerology, SCS or the like. The group information may be provided via DCI or RRC and may be based on UE capability, UE configuration, numerology or the like.

Other control information may be dropped upon collision if a multiplexed transmission is impossible. A HARQ retransmission of any data may be dropped (or not dropped) when or if a new transmission is queued or anticipated for transmission. In some instances, this new transmission may be a corresponding SRS control information transmission. In some embodiments, an SRS transmission may be a periodic, aperiodic signal or may be a combination of both. Periodic SRS may be transmitted according to a period, but the aperiodic SRS may be event driven and may be transmitted in between or along with other data or in between the periodic SRS transmissions. In some instances, the new transmission may be another uplink control signal such as a scheduling request or CSI feedback transmission. Different QoS situations may come into play. For example, a high QoS uplink transmission may take precedence over HARQ retransmission while a low QoS transmission may not. The contrary may also be true if HARQ is not used for high priority data. In 802.11 embodiments, priority may be AC_BK, AC_BE, AC_VI, AC_VO, or the like.

Dropping of a transmission or reception may be based on a QoS; whether a grant is configured dynamically vs. a periodic transmission; grant-free vs. grant based, traffic type, resources utilized for the transmission, whether only a portion of the transmission/reception may be dropped as opposed to all; time based, for example, an early grant vs. later grant; resource based, for example earlier resources vs later resources; logical channel prioritization based on one or more logical channel identifiers (LCIDs) and/or based on backhaul and/or radio link control (RLC) channel prioritization; whether or not multiplexing of control information can be performed. The UE may receive a prioritization for dropping transmissions in a DCI, MAC or higher layer signaling. Priority rules may be received in RRC or MAC signaling and provided to the PHY layer for determining transmission priority and dropping rules.

Various different UE classes may implement dropping differently. In one embodiment, one UE class may merely select one of a first received grant and a second received grant to be transmitted and the another one dropped. For example, a second grant may be transmitted on, while the first grant dropped even though they were both scheduled on same or overlapping resources. Multiple configured grants may be active and, in an embodiment, no transmissions may be dropped. Dropping may be performed in accordance with or based on a rank indicator or rank. In one embodiment, instead of dropping all CSI, the UE may drop a portion of the CSI. For example, the CSI reported may only be a subset of determined coefficients, i.e. the CSI may comprise bits of the determined coefficients. A trigger for the CSI report may be received via DCI via a wake up signal.

A gNB may inform a UE of a no transmission instance using a DCI format 2_1. A DCI format 2_0 may indicate slot format. One DCI may indicate resources for an initial transmission, while another DCI format indicates resources for a retransmission. Or a same format may indicate transmission and retransmission resources. Some DCI formats may not indicate resources for retransmission or subsequent transport blocks. DCI formats may provide an indication that the resources used for a transmission/retransmission are flexible in nature, for example, frame and subframe length may be flexible. Flexible may also refer to the way in which a symbol or slot is dedicated for transmission. One symbol may be UL, DL or flexible denoted.

A DCI format may be determined, at reception time, by determining it's size (number of bits, number of symbols used on the PDCCH, number of CCEs or the like). The number of bits or symbols may imply an offset for resources indicated, HARQ resources used, etc. The resources of which the PDCCH are placed on may also indicate values for any one of the parameters herein. In this way, there need not necessarily be an indicator to indicate the particular DCI format. Resources for monitoring PDCCH may be indicated in DCI. DCIs may be monitored simultaneously.

Some DCI formats may require HARQ transmissions or receptions and may indicate priority levels associated with the HARQ processes or HARQ transmissions based on a HARQ process number or identifier. A UE may support no more than a fixed number of HARQ processes, for example, no more than 1, 2, 4, 8, 16 or the like. Others may not, for example, when traffic becomes stale only instants after the failed reception. HARQ transmissions may acknowledge a single received data or may be bundled together to transmit an ACK or NACK of multiple data segments together. The HARQ ACK/NACK transmissions may be on sub slot resources indicated in a DCI as an offset from PDSCH or other channel or value. Alternatively, RRC may provide the resources used for HARQ. A UE may just transmit NACKs, rather than ACKs, in an embodiment so that ACK skipping may be employed based on one or more latency requirements and/or priority requirements.

Bundling may be performed using a bit map. This bit map may be transmitted over the physical uplink control channel (PUCCH), physical uplink shared channel (PUSCH) or a combination thereof, i.e. a portion of a map on PUCCH and a portion of the map on PUSCH. The bitmap may include CSI related information or may be multiplexed or transmitted with CSI. The maximum number of HARQ ACKs which a UE is capable of supporting may be based on UE capability or may be in accordance with numerology, a number of configured repetitions, or the like. It may be implicit in terms of DCI format type received, for example, if the network signals a dynamic repetition indication in RRC. For example, based on RRC signaling and a received DCI type, the UE may know whether or not to use repetition based transmission or not. The UE may also be able to ascertain the number of repetitions based on context of the RRC and DCI combination, for example, a repetition factor may indicate this information. A repetition dropping configuration, in the event of a transmission conflict, may be signaled via RRC or other means.

Sub slot HARQ transmissions may include one or more PUCCH transmissions for indicating HARQ ACK feedback. In an embodiment, the PUCCH on each sub slot may be associated with a PDSCH or group of PDSCH. This may be performed based on an offset number of slots, subslots or mini-slots. The association may be a cross slot association, for example, a PUCCH of a next subslot or another subslot of another slot. HARQ ACK feedback may be transmitted for blocks of PDSCH when the PDSCH overlap each other partially or fully. There may be delayed HARQ ACK reporting when PDSCHs overlap only partially, such that the ACK is transmitted after both are fully received.

In an embodiment, repetitions (for example, 2, 3, 4, 5 etc. repetitions) of a data transmission may be scheduled by DCI or using other means. The DCI may indicate whether repetitions shall occur simultaneously, in series or interleaved among other repetitions. Some UEs may be capable of supporting no repetitions or may be configured to not repeat transmissions without being signaled as such. The UE may be capable of supporting an interlaced repetition pattern. Repetitions may be scheduled for example, consecutive or overlapping slots or odd/even slots, etc. As used herein, the term 'repetition' or 'repetitions' may refer to a repeated opportunity to transmit on a resource, slot, transmission time interval (TTI), transport block or may also refer to a set of any one or more of these items, for example a set of resources or a set of slots. A UE may receive a complete data segment after one or more repetitions but less than all repetitions. Repetitions may be reception or transmission receptions, i.e. downlink or uplink. Feedback for the repetitions may be received (or transmitted) at gap intervals from the last transmission or on a gap interval from each transmission. In one embodiment, the transmission may be concatenated with another signal. HARQ feedback may be transmitted one or more times during a TTI, slot, subframe or the like. A DCI may instruct a UE to transmit HARQ feedback on one or more PUCCHs in a same slot which may or may not depend on a numerology of the UE. Other DCIs may indicate grants for same slot or cross slot transmissions or receptions. Cross slot transmissions may begin on one slot, continue on the next slot and complete on a third or later slot. Cross slot transmissions may or may not use consecutive resource elements in time or frequency. Cross slot transmissions may be triggered dynamically and/or via configured grants.

A DCI or other trigger may indicate a resource allocation type for one or more repetitions. The resource allocation may indicate transmissions which occupy more resources in the frequency domain than time domain or vice versa. An allocation may be as an offset from a previous transmission or as an offset from one or more DCIs used to schedule one or more transmissions. One repetition type may comprise, for example, a resource for a first repetition may be explicitly provided and an offset from a previous repetition may be indicated for a next repetition. Offsets may also be used in the case of cross slot repetition scheduling. Another resource allocation type may comprise receiving a plurality of starting symbols (or starting positions indicated by a physical resource block or a portion of a resource block group) and plurality of durations for each transmission or transmission repetition. Another type of repetition may comprise a repetition pool, provided by RRC, shared among multiple UEs, wherein a plurality of potential repetition start times and durations are provided, wherein the UE may sense before transmitting. A DCI may indicate whether transmissions or repetitions may cross slot or other boundaries. A single duration field may indicate a total duration of the first transmission and any/all repetitions and/or whether the repetitions are configured for continuous or non-continuous transmission.

HARQ transmissions may be transmitted at an offset from one or more resource elements of any one of the resources used for the cross slot transmission. DCIs may indicate resources including HARQ resources (for example, a bitmap for first transmission, retransmission, etc), by a starting symbol and/or ending symbol or the like. Same may occur for multiple PUCCHs, i.e. the DCI may indicate which PUCCH corresponds to the DCI. HARQ transmissions may be timer based and/or may be explicit or implicit. The use of a particular timer may be reported as a capability. In one embodiment, the ability to transmit a HARQ-ACK on more than one PUCCH per slot may be reported by a UE in a capability report. The capability may be based on supported HARQ-ACK codebooks (for example, codebooks which support multiple ACK indication), numerology, subcarrier spacing or the like used for the transmission or feedback. For example, the UE may support simultaneous HARQ-ACK codebook generation based on a priority of the data to be transmitted. In another example, an ability to support cross carrier scheduling, in which the carriers are on different numerologies, may be supported. A UE may have a switching capability, for example, a time period in which the UE is capable of switching to receive/transmit on resources of a different TRP/numerology. When a UE is cross carrier scheduled, there may be a gap period or delay introduced depending on the numerology of the scheduled carrier or the carrier for transmission/reception. For example, the gNB may not schedule a UE on another carrier before the gap or delay period. For example, when scheduling resources on a carrier having a different SCS (higher or lower) than the carrier in which a DCI is received on, the UE may anticipate a longer or shorter delay than if the resources were scheduled on a same carrier. The gap period may be determined based on capability of the UE.

For ultra reliable communication, a different MCS or coding scheme may be negotiated and may be used for the HARQ-ACK transmission among other transmissions. HARQ-ACK transmission may be in accordance with the DCI format received, for example, for a given DCI, the UE may choose an associated HARQ-ACK codebook. Alternatively, or in combination, the UE may select a HARQ-ACK codebook based on an indicator in the DCI format or may not use a HARQ codebook at all. In an embodiment, a follow up DCI may be transmitted such that resources are provided for HARQ feedback, wherein the HARQ feedback is for resources of a previous DCI. Previous and follow up DCIs may include power parameters which may be applicable to a same transmission resource. Power parameters may include sets of power parameters each set directed to a particular transmission priority, i.e. for MTC, eMBB or URLLC traffic. Power levels and power level sets may be different for each transmission priority. Alternatively, HARQ may be multiplexed with HARQ from previous transmissions of another type, priority, or the like. For example, a HARQ ACK may be dropped in favor of a SR; a HARQ ACK may be transmitted over CSI or PUSCH or the like. HARQ for URLLC may always supersede eMBB or other traffic.

Multiple carriers and/or BWPs may have unique data channels but shared control channels. For example, a single DCI format may be received over a set of BWPs, yet schedule resources on only a single BWP. Alternatively, a DCI may occur on any BWP and yet may schedule resources on different BWPs or multiple BWPs. The same may be true in terms of channels or cells or even radio access technologies.

A scheduling request transmission sent from a UE to a base station (BS), for example a gNB, may involve transmission of a signal which begins at a first power or other level and then is incremented as needed. The UE may have an established power level that may be exceeded, on condition, for a scheduling request transmission. For example, the condition may be a capability of a UE. The condition may relate to a received signal quality indicator. The condition may relate to a carrier of the UE. For example, it may be more important to exceed the configured power level a primary carrier (or primary channel) as compared to a secondary carrier or other carrier. A UE may be configured with one or more primary channels and one or more secondary channels.

There may be a quality of service level configuration or transmission configuration that may be relied upon for determining power level conditions. The conditions may relate to a time (subframe, slot, etc), frequency (subcarrier spacing (SCS), BWP based) and may also be beam specific. SCS may be chosen as a subset, for example, based on applicability in terms of capability or support for a given transmission configuration. Further, the conditions may relate to whether the cell is a cell center UE, a cell edge UE and/or a location with respect to a TRP. A scheduling request or any other request for resources may include a channel estimation error or power control accuracy or inaccuracy measurement level. A scheduling request may be dropped if it overlaps with or collides with another PUCCH transmission of a UE, for example, HARQ feedback. In an embodiment, only a portion of an overlapping or colliding transmission may be dropped. If the scheduling request is for high priority traffic, the scheduling request may be transmitted while the PUCCH or conflicting PUSCH or any other conflicting signal is dropped. Additionally, if the scheduling request is a request for high priority traffic, for example, URLLC traffic of a high priority logical channel or logical channel group, even a data channel transmission or reception may be dropped to allow for the SR to be transmitted. The PUCCH may be a short or long PUCCH. The scheduling request may be transmitted on a condition the request is positive. Alternatively the scheduling request for high priority traffic may be multiplexed, for example, transmitted with another data.

Remote Interference Management (RIM) reference signals (RSs) may be provided by next generation node Bs (gNBs) for detection of remote interference (RI). These references signal may be provided on fixed symbols or may be variable in time/frequency. Traditionally, eNBs in LTE would periodically signal information to other eNBs to indicate patterns for which each eNB plans to use for transmission patterns. That is a reasonable approach, but it may or may not be feasible in situations where more and more eNBs, gNBs and transmitters of other radio access technology come into play. Base stations may exchange information about a time and frequency of a transmission (or no transmission) as well as spatial information. For example, spatial information may include beam information and direction of transmissions. Spatial information may aid in beam tracking. Directions may have a 3 dimensional component, i.e. one that includes height or altitude. Direction indications may be provided in terms of angle from the transmitting base station or angle from the receiving base station. In one embodiment, an indication may be provided for use by a lookup table stored in each base station which corresponds to position information. gNBs may control one or more TRPs, for example, other RAT TRPs, RX only reception points, TX only transmission points, broadcast TRPs, multicast TRPs, unicast TRPs, or any other type of gNB.

In one embodiment, gNBs may form a set or be grouped as a set. A group of gNBs may be referred to as a cell group. Each set may have an associated gNB set identifier (gNB set ID). Set IDs may be of varying formats, lengths or types as disclosed below. Each gNB may transmit unique reference signals, but may also transmit information indicative of a respective configured or established set. gNBs of a same set may transmit same reference signals. That is, gNBs may transmit reference signals (RS) that are distinct in time, frequency, code, power, beam, angle or the like. Each of these distinctions should be conveyed by gNBs such that each nearby gNB knows the RS transmission parameters of the other gNBs. Groups, for example, reliability groups may be formed based on QoS levels, reliability levels, throughput levels, based on frequencies or the like. A gNB may have an identifier which is assigned by a name server or may have a hard coded identifier. In one embodiment, identifiers may be of varying lengths and or of varying formats and or of varying types (bin, hex, dec or the like). A plurality of reference signals may each convey a portion of the gNB set identifier or the reference signals may each convey a complete gNB set identifier. The set identifier may convey information to identify the gNB within the set. A UE may provide uplink control information to a cell group. The uplink control information may include a UE identifier or capability identifier. Information of the cell group may be useful in scheduling UEs for both uplink and downlink transmission either simultaneously or sequentially.

A UE may be configured with a group radio network temporary identifier (RNTI) or cell RNTI. Other temporary identifiers may include I-RNTI, MCS-C-RNTI or C-RNTI. These may be assigned by a gNB when an attack is determined or a UE may be malicious. In fact, any message, data structure or parameter disclosed herein may be either a fixed or variable format or length. A Boolean value may specify whether fixed or variable. If variable, a number of fields or a length field may be included to signal the length or size of a message or other field. Each DCI format received by a UE may be scrambled with a different RNTI. For example, format 0_0 DCI may have a different RNTI than a DCI for URLLC or MTC etc. In this way, a DCI format may be distinguishable by RNTI.

In one embodiment, a UE or base station may be configured to determine whether or not it is located in (or is) an aggressor or victim (cell). In one embodiment, a base station may determine that it is acting as an aggressor by developing an aggression window. The window may be based on a number of transmissions, a number of failed transmissions, a number of HARQ requests or responses. As the window expands, the base station may begin to stagger transmissions (in time or frequency) such that victim transmissions have an opportunity to transmit or at least an opportunity to signal their desire to transmit. A timer could also suffice instead of a window. Using a timer, a UE or base station may transmit and then backoff once the timer expires. A UE or base station may consider an atmospheric ducting phenomenon and may transmit or receive information which models this phenomenon to make decisions. This information may be transmitted in a PHY, MAC, RLC signal, or the like. A base station may sample a refractive index of a material, for example the air or water vapor, and make transmissions to account for the refractive index. In one embodiment, this information may be signaled UE to UE or BS to BS for use in reflective transmissions which mirror the same refractive index. The mirroring technique may be referred to here as channel or beam correspondence.

An indicator of beam support may be provided by a UE or gNB. For example, a UE may support corresponding beams or non-corresponding beams, for example without having to perform sweeping. The indicator may specify one or more of: MU-MIMO; multi-TRP; multi-panel; N4: UL MIMO/coverage; or beam management mode. A UE may support panel switching in accordance with panels of the UE or a TRP. A UE capability may indicate that not all beams may be usable. In one embodiment, a UE may compute effective (or equivalent) isotropic radiated power (EIRP) or a delta or change thereof. A UE may transmit an identifier which indicates a multi-panel configuration. Sweeping procedures may be performed on multiple TRPs, multiple cells, multiple layers and the like, for example transmit sector sweeps and receive sector sweeps. In one embodiment, a number of beams used may increase on an increasing scale. For example, x beams may be used for a 450 mhz to 6 ghz band, 2× beams used between 6 ghz and 24 ghz, 3× beams used between 24 ghz and 52.6 ghz, 4× beams used between 52.6 ghz and 114.25 ghz, 5× beams used between 114.25 ghz and 275 ghz. Higher frequency bands, for example, 52.6-114.25 ghz and above may be used for sidelink communication while other bands are infrastructure based. A multi-panel configured UE may activate panels upon movement of the UE, for example, via an accelerometer, via measurement taking or via network signaling.

A DCI may indicate multiple-TRP information in a multi-panel or multiple TRP use case. For example, the DCI may indicate a number of layers transmitted per panel and may also indicate a panel ID. Panel information including ID and the like can alternatively be signaled in RRC signaling.

Different Control-resource set (CORESET) and search space configurations may be applied per layer or per panel. Some DCI formats may be applicable only in a given search space configuration. Thus, a UE may monitor a same configuration for multiple DCI formats. In some embodiments, the PDSCH or other shared channels of each panel may be configured to completely overlap, partially overlap or not overlap at all. This fact may be signaled via DCI or signaled via another signal. Multiple DCI formats may be received with overlapping resources on a single BWP. In the case of a DCI format which schedules PDSCH or PUSCH on another base station or another carrier, the search space configuration may or may not be the same configuration as the cell which provided the DCI. If not, an indication of the search space configuration may be provided in the DCI. The search space used may inherently convey information of any one of the parameters disclosed herein. PDSCH may be scheduled in any number of symbols and may be preferably scheduled in 1, 2 or 3 symbols. In an embodiment, PDSCH may be scheduled in 4 to 14 symbols in duration. In another embodiment, PDSCH may be scheduled in more than 14 symbols in duration. Once a transmission exceeds a number of symbols, transmission parameters may be changed. Also, transmission parameters, for example, a frequency transmission may change once a slot or subframe boundary is reached regardless of a number of symbols transmitted. A transmission, for example, a retransmission may be dropped if it crosses the slot boundary. This may also be true if the next slot is a different direction, for example UL vs. DL or the opposite. The opportunity may be filled with smaller data of a high priority. Alternatively, once the symbol or slot duration is reached, and the UE determines that a next slot or symbol presents a conflict, the UE may postpone transmission or reception.

DCI formats sent by one TRP may schedule resources for another TRP. HARQ feedback may be provided to one or more TRPs, for example, the TRP which provided the DCI or the TRP for which an uplink/downlink transmission is scheduled on. PUCCH, PUSCH and random access channel (RACH) transmissions may be coscheduled in overlapping frequency/time/beam. PDCCH, PDSCH and other downlink channels may be coscheduled in overlapping frequency/time/beam. A gNB may indicate whether PDUs may be duplicated on the coscheduled transmission, for example, PDCP PDUs or whether unique data transmissions may be provided, for example, sequential PDCP PDUs.

Each TRP may have an associated PUCCH which may receive HARQ feedback for other TRPs. In one embodiment, a gNB may schedule an uplink or downlink transmission, for example, PUSCH or PDSCH, by a plurality of TRPs, wherein each transmission comprises a different redundancy version, yet having a same MCS. Instead of transmitting a plurality of DCI formats which comprise the same parameters, albeit different redundancy versions, a DCI may be transmitted which only includes necessary information for the uplink/downlink transmission to the TRP, for example by limiting a number of redundancy versions to 1, 2, or 4, in an example. This may be performed by limiting the number of bits of the RV indicated in the DCI, for example, to 0 or 1 bit from 2 bits in other formats. The RV may be selected using other information of the grant or other information disclosed herein. An ordering of transmissions or a transmission type separation per TRP may convey information about resource scheduling. Additionally, beam or beam subsets used by a TRP may convey information about resource scheduling in time or frequency.

A UE or gNB may detect a beam failure and a recovery procedure may be necessary. In one embodiment, beam recovery may be initiated by a timer. The same may be true for radio link failure. This would allow the UE to utilize a contention free period in which the UE may recover a beam. The UE may attempt to use preconfigured RACH resources to recover a beam. The subset of resources available for beam recovery may be greater than or less than the resources initially provided for initial or random access. In one embodiment, the beam recovery timer may be incremented upon successive failure attempts. In yet another beam recovery embodiment, upon beam failure, a UE may utilize a secondary cell or another cell, for example a WLAN cell, to signal to a PCell a request for resource(s) to perform a beam recovery procedure. The failed cell/beam may be indicated or conveyed to the base station. The resources may be signaled through the WLAN or other cell. During a beam failure, a UE may determine that it may need to perform random access to acquire a new timing advance and resource grant. The UE may then transmit on the resource grant. The UE may use the RACH to transmit information as to the cell (PCell, SCell) and an index or bitmap corresponding to the failed beams. The UE may also use higher layer signaling if possible, for example MAC signaling.

A TPC value may be included in the random access response (RAR) received from a gNB. TPC command information may also be provided in a DCI format 2_4 and/or other transmission information (new transmission, cancelled transmission, etc) using a DCI Format 2_5 or another format disclosed herein. A TPC value may also be provided via a new DCI format. For example, DCI format 2_6 may include different TPC values and/or different uplink group cancellation values from other format 2_x DCI formats which are group common. DCI format 2_X may be distinguishable by content, for example, range or bitlength of their TPC commands and/or what resources the formats are sent on. Some of the group common 2_x DCI formats may include user information and TX information for a particular user to cancel a particular transmission in either uplink, downlink or both. Instead of indicating a transmission, a coding may be used to indicate the cancelled transmission. For example, the coding may indicate the resource in time or frequency or indicate the priority of the transmission. A 1 bit indication may indicate the most recent allocation is granted. A 2 bit indication may indicate that the second most recent, third most recent, fourth of fifth most recent transmission is cancelled, i.e by signaling 00, 01, 10, or 11.

TPC values may be based on a channel prediction, for example Doppler estimate, fading estimate, or the like performed by the gNB or UE. Alternatively, a TPC may be signaled and multiplied by or added to a value which represents the channel prediction. Thus a modified transmission power control method may be used to transmit data or control information. TPC values may vary in number of bits, thus an indicator may be provided to indicate how many bits the TPC value of a DCI is for. This indicator may be provided in the DCI or within RRC or other signaling. Information of TPC values may be signaled to the UE with a TPC RNTI. If a number of bits used for a DCI is lower than another format, the number of bits may be padded with extra bits, for example, 0 bits, 1 bits, or even data bits, so as to mirror or align with the size of the another format. In this way, a number of CCEs may match any DCI format disclosed herein. This way blind decoding may be reduced and the UE may monitor for a fixed number of DCI sizes. DCI formats 2_x, or any other format herein, may be group specific or UE specific and may indicate UL or DL cancellation configuration information. The number of CCEs may be specified of a capability identifier.

A DCI format may indicate transmission configuration information (TCI). This information may indicate that two or more base stations are providing PDSCH to the UE. In one embodiment, the UE may receive only one PDCCH from one of the two or more base stations. When a DCI format cancels a scheduled transmission, the DCI may be group specific. The cancellation DCI may be of few bits, for example, 1 or 2 bits, indicating one or the previous 1, 2, 3 or 4 received DCIs. The UE may monitor for the cancellation information when a TX of a given priority is scheduled. If a schedule TX is a highest priority, for example, URLLC, the UE may not monitor for a cancellation or preemption indication since there should be nothing of more urgent priority. Monitoring may be performed on a non-slot or mini-slot periodicity, based on capability and/or based on numerology/SCS.

FIG. 2 is a table 200 which illustrates example TPC values. A new set of DCI format indicators may be used for indicating TPC values, for example, 3_0 may be used for a first TPC format with first parameters including those described herein, while 3_1 is used for a second TPC format with same or different parameters as disclosed herein. Formats 3_2 and 3_3, may be used for other formats, for example, for indicating up or down directions. These DCI formats may be used for non orthogonal MU scheduling or other scheduling as disclosed herein. Other DCI formats may include DCI format 4_0 which may be for signaling when a UE is in DRX active time or DCI format 4_1 for scheduling when a UE is not in DRX active time.

As shown in FIG. 2, a 3-bit TPC command 202 may indicate up to 8 discrete values 204 ranging from −6 db to 8 db. The values conveyed by each bit string may differ however in embodiments. A DCI format 4_2 may be used to indicate a 4 bit TPC command 206 having values 208 ranging from −7 db up to 8 db. Using additional bits may allow for additional granularity in adjustments. A DCI format 4_3 may indicate a 5-bit TPC command 210 with values 212 ranging from −7 db to 8.5 db on a 0.5 db range. A DCI format 4_4 may be used to indicate a 6-bit TPC command 214, 218 having values 216, 220 ranging from −7 db up to 8.75 db which increment on a 0.25 db scale. Any DCI format 4_x may signal any parameter or attribute disclosed herein. DCI formats may be used for time duplexed control/data transmissions or other transmissions. In one embodiment, DCI formats may provide a switching indication from FDD to TDD or vice versa. In one embodiment, DCI 3_x formats may be offset in time, frequency or beam from DCI formats 4_x and thus may not need an explicit DCI format indicator. Any DCI format disclosed herein may incorporate any scheduling parameter or other parameter as a component. Other DCI formats for scheduling of PUSCH may be 0_X formats, for example formats 0_2, 0_3 which may be used for PUSCH and other formats, for example, 0_4, 0_5, 0_6 may be dedicated or reserved for future uplink shared channel use, or the like.

Some DCI formats may be encoded such that the TPC value for scheduling uplink shared channel transmissions is consistent with or encoded with a repetition factor. This way, for a particular TPC value, a UE may also determine a repetition factor or number of transmissions/retransmissions. Preferably, as power is reduced via TPC, a number of retransmissions will also be reduced or remain the same. Similarly, as power is increased, a number of retransmissions will be increased. A UE may accumulate TPC values to form a transmit power level command. The UE may do this regardless of whether or not the UE out of order transmits the uplink transmissions. For example, if two TPC commands are provided prior to two PUSCH transmissions, both TPC commands may be accumulated before transmitting either PUSCH. The UE may alternatively delay the second TPC command until after transmitting the first PUSCH regardless of priority or out of order nature of the transmissions.

Preferably, format 0_2 will be used for scheduling URLLC PUSCH and a format 1_2 with be used for scheduling URLLC PDSCH. In a preferred embodiment, elements of the format 0_2 will be variable size, for example, including 0 bits. These variable size elements may include carrier indicator which may be used only when another carrier is being scheduled for PUSCH; PRB bundling size; rate matching indication; and a CSI-RS trigger indication. CSI-RS may be triggered with or without a data payload and may be associated with a SCell or another cell of the UE. A MCS may or may not be included in a DCI format 0_2. The same may be true for a redundancy version and new data indicator and an indication of these elements may be provided by RRC signaling. A CBG transmission information may be included in legacy DCI formats, but may or may not be included in a format 0_2. Format 1_2 may include elements similar to 0_2 and may or may not include any one of the elements disclosed herein.

These DCI formats may include or indicate any one of the parameters herein. For Scheduling PDSCH, or other data, DCI formats may be denoted as 1_2 which may be a dedicated DCI format for URLLC. Other Low latency DCI formats may be reserved for future URLLC use, including format 1_3, 1_4. In a preferred embodiment, PDSCH will be scheduled using a format 1_2. These DCI formats may indicate resources for any information, information type or information format disclosed herein. PDSCH may also carry scheduling information, for example, an indication of a group for uplink HARQ ACK feedback or other feedback information (SRS, CSI, etc). That is to say, multiple PDSCH receptions may group feedback together and transmit as a group. DCI formats may include a header and payload portion so as to indicate information about the following payload portion. The header may be on a first portion of time resources and may indicate the DCI format which may include 1 or more bits for this purpose. Using 1 bit may signify whether resources are scheduled for UL/DL. In an embodiment, any DCI format disclosed herein may have a total number of bits which is fewer, equal to or greater than a DCI format 0_0 or DCI format 0_1, 1_0, 1_1 etc of R15. DCI formats which use less bits may or may not take priority over time conflicting DCI formats with larger numbers of bits. Alternatively, the maximum number of bits used for one DCI format may be the same a maximum number of bits used for a R15 DCI format. The same DCI format may have a minimum number of bits which is less than the R15 DCI format. Alternatively, or in combination, the maximum number of bits may be greater than the R15 DCI format. Individual parameters of a DCI format may be of configurable size, for example a variable size. Other parameters may be of fixed sizes. In other embodiments, individual parameters may have bit sizes that are less than other DCI formats, for example, an equivalent parameter of a format 0_0 or format 0_1.

These legacy DCI formats may also be modified to include any one of the parameters, for example, disclosed herein. The UE may monitor the PDCCH using an aggregation level 8, aggregation level 12, aggregation level 16 or any other aggregation level, for receiving DCI information disclosed herein. Depending on the aggregation level, different DCI formats or parameters may be used. For example, for one aggregation level, a MCS subset may be selected or used. Aggregation levels may be identified by DMRS. Some DCI formats, such as 0_0A, 0_0B, 0_1A, 0_1B may provide extensions to 0_0 and 0_1 for scheduling PUSCH, based on aggregation levels. Similarly, DCI formats such as 1_0A, 1_0B, 1_1A or 1_1B may provide extensions to 1_0 and 1_1 for scheduling PDSCH. For group transmissions, or TPC transmissions etc, extensions to DCI formats, for example, an extended format 2_0A, 2_0B, 2_1A, 2_1B, 2_2A, 2_2B, 2_3A or 2_3B. In an embodiment, a UE may be provided with an index into a table or bitmap which indicates a resource for use in a time or frequency manner. The same table or bitmap may indicate a MCS or beam (via the index specified via DCI). The table or bitmap (indicating symbols, slots, transport blocks or the like) may be scheduled in advance via MAC, RRC etc or may be included in a DCI. In one embodiment, the table may be via a SIB. A DCI may indicate implicitly, as an offset of the DCI itself or any parameter included within, another scheduling parameter, be that time/frequency/resource/beam or the like. For example, RRC may schedule groups of resources which can or cannot be used for URLLC and a DCI may indicate one or more of the groups.

In one example, a first DCI format may indicate a parameter used for resources scheduled by a following DCI format. For example, a first DCI format, for example DCI format 5_0, 5_1, 5_2, 5_3, 5_4 or the like, may indicate resources for receiving a second DCI format which follows subsequently. Alternatively, these formats may simply indicate resources for, or parameters of, the disclosure herein. A first DCI format may have a boolean indicator to indicate whether the first DCI is scheduling a subsequent DCI format. The first DCI may indicate carrier or TRP of a same (for example, quasi co located) or another base station. Parameters may include MCS, power, HARQ parameters (for example HARQ group parameters), or any other parameters as disclosed herein. MCS may be selectable between 0, 1, 2, 3, 4 or 5 bits. The DCI may indicate the number of bits used. The following DCI format may include only parameters which are different from or have changed since the last DCI transmission for the same format. Power parameters for some attributes or parameters may be provided or indicated as an offset from another signal or parameter disclosed herein. For example, an offset of 1 dB, 2 dB, 3 dB . . . 7 dB, 8 dB etc. If a transmitter cannot transmit at full power, for a given rank, precoders of a codebook subset may be used for one or more transmissions or retransmissions.

Any one of the DCI formats herein may provide parameters for use for uplink or downlink control or data information, for example, for an uplink DMRS transmission. The UE may receive, via DCI, a scrambling identity for DMRS and a code division multiplexing (CDM) group index.

In some embodiments, DCI may be two step or multiple step. In a step, a base station may indicate which DCI formats are supported/allowed. A DCI applicable to existing DCI formats, for example, those disclosed in 3GPP TS 38.211 V15.3.0 (2018 September), disclosed herein in entirety, may be received first. That DCI may be followed by another DCI format. Other parameters may be specified in terms of bit length, for example single bit flags or multiple bit parameters. Other parameters disclosed herein may be summed or multiplied as indicated by a DCI. DCI may specify a transmission type, a modulation scheme, resources used for transmission (time domain, frequency domain) or the like. A time domain indicator may be anywhere from 1-8 bits depending on number of time domain resources. A DCI message or other message may indicate preemption, wherein a previous opportunity for transmission or reception is preempted by a higher format transmission or reception. The indication may be provided in terms of the resource preempted or a QoS indicator or other means. Power or QoS may be reflective in nature, i.e. may be similar or identical to a received power/QoS. DCI format may indicate a power, log, floor, and exponent or ceil any resource format, type or time/frequency indication as specified herein. With respect to resource allocation, various types may be used, for example, type 2, 3, 4 etc. A UE may be configured to use a subset of the resource allocation types for a particular transmission type. DCI may provide a power command, request a sounding response, may provide information about HARQ for example a resource allocation for retransmission, redundancy information, modulation information, feedback timing, a cell, a carrier of a cell, a frequency of a cell, code block group (CBG) or the like. CBG based (re)transmission may be based on a DCI format. DCI may provide a CRC coded by any method disclosed herein. Virtual CRCs may also be used, in one embodiment, configured to check a format having 0 bit padding. A new data indicator may be included when the UE should clear a HARQ buffer. Any of this information may be provided conditionally, i.e. for use when a UE meets a certain condition or threshold for any one of the parameters disclosed herein. A DCI may provide a brief data message or paging message. A DCI message may provide information about a numerology or bandwidth part information of another carrier, for example. If there is not enough time to decode the reception on the another carrier, the UE may determine to drop the reception.

A DCI may indicate resources for multiple frames or subframes in a same DCI. The DCI may also indicate a semi-persistent allocation or the like. Another DCI may override or discontinue the allocation. A DCI may be scrambled using and parameter or mechanism disclosed herein. For example, DCI formats may be scrambled by a non-orthogonal multiple access (NOMA) group identity, another group identity, a cell identity, a random access identity, a system information identity, or any combination of the preceding identities. DCI formats may indicate a traffic model, for example, an FTP model 1, model 2, model 3, or the like. A bandwidth part indicator may be more than 2 bits, for example, 3 or 4 bits in length. Power may be specified as a beta offset in terms of 3 or more bits. DCI formats may indicate resources for which multicast and unicast messages are transmitted simultaneously, or for example, where a sidelink or v2x message shall be transmitted simultaneously with an uplink message. These could both share some resources, all resources or no resources. Sidelink transmissions may be unicast, groupcast, multicast or broadcast. Unicast, groupcast, multicast and/or broadcast RNTIs may be employed by a base station or a UE. The DCI may indicating beta offset may be provided when the UE reports a fractional beta value in CSI, for example ½, ¼, ¾ etc. A DCI or MAC CE may configure a sidelink radio bearer (SLRB) of a UE.

A sidelink control information (SCI) format may include an indication of resources for sidelink transmission, modulation and coding scheme information, UE identifiers, UE group identifiers, capabilities of one or more UEs, sensing parameters/configurations or any other information or parameter disclosed herein. There may be multiple different types of sidelink control information provided, for example an SCI format 0, SCI format 1, SCI format 2, SCI format 3 or the like. Some SCI formats may be provided to single UEs, while others are broadcast, group based or subgroup based.

A DCI format may include, or may be selected based on: a number of antennas (or number of antenna radiating elements) at the UE or base station, a number of users in a cell or in an area, a number of resource elements, a spreading length; decoding information; a Boolean indicator to signal hard or soft interference cancellation; matrix column and row information; number of bits used for coding; number of users per RB; a number of antenna ports; band; bandwidth; radio access technology; a transmission configuration indication or the like. Any of these parameters may be for a subsequent downlink transmission or uplink reception (by the base station). Other DCI formats may indicate a modulator mapping, bit interleaving (for example, user or group specific) parameters, spreading parameters, scrambling parameters, timing assignment, power assignment, a resource element mapping or the like. The timing assignment and power assignment may be provided via an index. For scrambling or spreading, the UE may be provided with a random number of an index or seed for plug into a random number generator. The seed may be an initialization seed and may be received via DCI. DCI formats may provide spreading or superposition parameters. DCI formats may indicate resource elements for 0 transmission levels. In one embodiment, the RE's for 0 transmissions may be indicated via a pattern or bitmap. Alternatively, they may be indicated implicitly based on other DCI parameters. For example, based on bandwidth, band, radio access technology (RAT), number of users, or any other parameter disclosed herein.

Any hash for security purposes may include the 0 transmission values or drop any 0 transmission values from the hash calculation. The DCI format may indicate hash function to be applied. DCI parameters may be implicit based on the hashed capability of the UE. For example, MCS or HARQ timing may be implicit based on capability exchange.

DCIs may be received with conflicting resource scheduling parameters. For example, a first DCI may indicate downlink reception on a plurality of resources. A second DCI may be received indicating downlink reception on a subset of the same resources. Conflicts may be resolved by a priority indicator or a timing indicator. If a DCI has a higher priority, the UE may perform actions of the highest priority DCI. Otherwise, the UE may pick a first or last DCI to perform. The UE may also compromise by receiving a portion of both (or transmitting on a portion of both). As for transmitting, the overlap may not necessarily be on a same resource but may cause a power level to be exceeded. In this case the same rules may apply, a first/last or priority may take precedence. A traffic type may be indicative of priority. The UE may also consider whether resources indicated by a DCI have commenced transmission or reception. If this is the case, the UE may ignore the later received DCI. Alternatively, the UE may stop reception on first resources if the priority of the second DCI indicates a higher priority by a given level. Grants may be dynamic and a dynamic grant may take precedence over a non-dynamic grant or vice versa.

DCIs may be provided on a control resource set (CORESET) of a bandwidth part (BWP) of a whole channel bandwidth (CBW). The CORESET or CORESET length may indicate a type of DCI provided to the WTRU. The type of PUSCH or PDSCH may indicate type of DCI. A CORESET may be transmitted on one or more symbols. DCIs or other information provided to the UE may enable the UE to switch BWP to an initial BWP or another BWP, for example, an express indication to switch, an indication to start an inactivity timer or the like.

Other DCI formats may be cross bandwidth part, i.e. may schedule resources on another BWP or even another CBW of another radio access technology. This type of scheduling may be done in combination with RRC scheduling parameters. For example, the RRC may schedule blocks or pools for which DCI specifies or indicates resources of. In this way, PDCCH and PDSCH may be simultaneous in time. A UE may autonomously switch BWP based on traffic parameters including arrival rate/burstiness, QoS parameters, position, transmit power, a timer or the like. A BWP may be selected based on these parameters or information elements as well as on an expected traffic type or file size.

A UE may be provided with an uplink grant that the gNB or other base station must cancel, defer or reschedule, which also may be done by a DCI format which may be group common or UE specific. This may be due to the gNB recognizing that the scheduled or granted uplink resource should be reassigned for a higher priority transmission of the same or another UE. Thus, a UE may be provided with the resource due to the higher priority. The lower priority transmission which was subsequently cancelled may be cancelled via DCI, MAC CE or other means. The DCI may indicate a frequency, time and/or beam of the resources to be cancelled using a same number of CCEs as the original DCI scheduling the resources. The original transmission may be resumed subsequently or dropped altogether based on a remaining portion or a priority thereof. The resumed portion may be multiplexed or transmitted after receiving a following DCI indicating a transmission priority of a same or another priority of the original transmission. The UE may determine to cancel the transmission due to determining a higher priority packet in the buffer. In one embodiment, another gNB may provide the cancellation instruction to the initial UE. Instead of cancelling, the UE may be provided with an indication to lower transmit power or may be provided with alternative resources for transmission. The receiving gNB may then perform interference cancellation and receive both transmissions. In one embodiment, the grants may be provided to multiple UEs and subsequently cancelled in a group fashion. It may be that only UEs in a certain location, having a certain access type, being of a certain category or scheduled with certain frequency or time resources may be instructed to cancel while other group members maintain their transmissions. A UE may be capable of cancelling a transmission in a given time X, Y or Z and this capability may be reported.

The DCI or other information used to cancel transmissions may include a carrier indicator or RAT indicator to indicate a transmission or transmission frequency. The DCI may include a transmission priority for which the UE should cancel transmission to that priority level.

Random access procedures may be necessary for UEs to receive directed system information. System information may be broadcast, multicast, unicast or on demand. A request for system information, for example, a request for one, some or all system information, may be provided by a UE and the response may use broadcast, multicast or unicast transmissions which may be configured on may be determined on demand. A request may be a RACH request which specifies the SIB in an explicit or implicit manner, for example, by indicating a bitmap or using a particular preamble, preamble coding etc. In one embodiment, if a UE cannot receive system information in an omnidirectional transmission from a base station or other station, the UE may be inclined to perform random access to request directional type system information. In this way, the UE may be preconfigured with occasions with which to make the random access request. The UE may be provided with system information, for example, SIB information, directly from the transmitted random access request. Alternatively, the UE may be provided with an indication of resources for use for transmitting a request for the particular system information desired. In response, the UE may receive a MIB, SIB, or partial SIB, etc. Because the UE is not in connected mode, the UE may need to be preconfigured with access and timing information for performing the PRACH transmission in advance. It may be that a certain portion of the preconfigured resources are dedicated for SIB type random access requests. This way, there may not be a need for a specific request after the random access request. In response, the base station may respond on preconfigured resources. In connected mode, the UE may provide mobility state information, for example, information regarding whether the UE is stationary, mobile or fast moving. This may aid in power control as the UE may not be necessarily scheduled to report channel quality as frequently when not moving or may report more often as it becomes more mobile. The UE may receive a configuration for reporting channel quality and/or measurement taking which is based on the mobility state. Channel quality reporting may occur more frequently when there are more users using an MU transmission medium vs less users using a MU transmission medium. In an embodiment, channel quality reports may be included in RACH transmissions and subsequently in PUCCH transmissions.

A UE may support a capability for employing measurement gaps for computing CQI if necessary. A UE may receive next generation system information blocks including one or more of a System Information Block Type 23; System Information Block Type 24; System Information Block Type 25; System Information Block Type 26; System Information Block Type 27; System Information Block Type 28; System Information Block Type 29; System Information Block Type 30; System Information Block Type 31; System Information Block Type 32; System Information Block Type 33. Any one of these system information block types may convey any information herein and may also request a UE to report any information described herein. System information blocks may be receive sequentially in sequential time windows. Alternatively, the time windows for any of the above SIB block types may be overlapping. A base station may be configured to transmit these blocks in any order and interspersed with other legacy system information blocks. Some UE or base station capabilities might include support for a cell broadcast service, support for network slicing, support for SMS, support for MMS, support for a public warning service, support for handoff between 5 g and legacy systems like EPC and/or LTE and 802, support for quality of service levels, or the like. A broadcast service may be started, stopped, restarted etc. based upon capabilities of the broadcast device. Capabilities may include support for latency and reliability requirements. In an MMS or other embodiment, devices may be capable of scanning a users face with an imaging device and providing an emoticon, over a wireless interface, representing an expression made.

Any capabilities identifier, including a UE capability ID may be sent in an emergency call. This may indicate support for eCalling over IMS via SGC. There may also be an indication of support of e911 via 5G calling/texting/messaging. Any capability indicator may be sent via IMS and/or SIP using a register or other request message.

A UE may indicate support for reception of or participation in a 3D video call, 3D message, 360 degree video. This indication may be provided to a network node or to an end UE or group of UEs. If another UE does not have the same capability, a fall back to 2D video, image based message or the like may be provided. A UE may be configured to receive 2D or 3D video from a plurality of mobile network operators (MNOs). In this way, each MNO may serve video to a single UE and may charge the single UE accordingly. In this way, a UE may subscribe to a video platform only on one MNO, while subscribing to a full access capability of another MNO. Each MNO may have unique video libraries and video files to serve. A UE may be provided temporary initial access to determine which videos a platform is configured to serve. A UE may be configured with an access token in order to gain full or temporary access.

UE capabilities may also correspond to QoS instances or supported QoS instances. In one embodiment, there may be a particular QoS identifier used to indicate QoS levels of an LTE or 5G or beyond network device or UE. A bitrate capability may be measured in kilobits, megabits, gigabits per second. There may also be a priority (or QoS specific) level specific to LTE or 5 g. Other priority methods may operate based on PPPP or using a KPI, VQI or 5QI. Any parameter or level indicated may be represented by an integer (signed or unsigned) or boolean data type. Or any other type for that matter. QoS may also indicate a service type for example IPv4 or a traffic class in v6. QoS may be based on traffic flow (having a traffic flow ID) which may be associated with a radio bearer. QoS parameters or thresholds may change based on application specific information or other information, for example, QoS requirements may be negotiated using negation messages (negotiation request, negotiation accept or the like) and may depend on capability. Each device may deny a certain negotiation request but provide a negotiation response message with another request.

Messaging may be different when attempting to reach different traffic or service types. Messages may be denoted traffic type and traffic class. For example, a traffic class for receiving video from a surgical procedure may have a very high QoS, while traffic for synchronization or information receiving which occurs by an application in the background may be of very low priority.

A UE may request and may be provided with a capacity of a base station, how much capacity is occupied or used vs unoccupied or unused, a number of currently active users, a number of inactive users, a particular users throughput (such user may be on another base station or same base station), an RRC connection success rate, received signal strength, and residual capacity on a per network slice per cell basis. This information may be used for the purpose of generating QoS predictions but may also be used for other reasons, for example, for handover determination or initial access determination. A UE may support the ability to collect other UE-specific details such as UE history and UE capability information among other things for making and generating QoS predictions. DCI, MAC CE and RRC control formats may be tailored for requesting/receiving this information.

A UE capability ID may provide support for group messaging. For low capability devices, a services capability server (SCS) or application server (AS) may assign a group ID to all UEs within a certain location which all have a UE common capability threshold. The group ID may be considered internal or external. A message may include the group identifier and a payload. The group ID may be selected at random by the SCS, AS, TRP, gNB, AP, STA, etc. In one embodiment, a UE may cycle through group IDs and once one is no longer used, the group ID may be assignable to another group of UEs or STAs etc. At a high level, any group message may be HTTP (get, post, etc) based. A message may also include the geographical location information of the group of UEs and include a delivery time, CRC and an indication of the common UE capability. An integrity check field or at least a checksum or CRC may be included in any message herein which represents any field herewith. Diffie Hellman may be used in one embodiment. In another embodiment, a SHA may be used.

An HTTP message may be sent from the SCS or AS containing the group ID. Upon receiving an http message, an SCEF may create resources for sending to the group of UEs.

A UE may monitor for a group message. The UE may use a publish/subscribe (pub/sub) paradigm to do so. Based on the UE capabilities and/or location the UE may subscribe to a particular group. In addition to receiving group messages, the UE may still receive individually addressed messages, for example, using pub/sub, label switching or other methods. A type of addressing may be provided in beacon frames or system information, etc.

The UE may subscribe on a per SCEF basis, for example using an SCEF identifier which indicates a particular SCEF or references to one or more SCEF. The SCEF may check with an HSS to verify a subscriber of the UE. The UE might receive an instruction to stop or start subscribing. Configuration of UEs might occur differently if capabilities are mismatched or the AS desires to address bootgroup/individual UEs differently. Groups of UEs may receive messages via MBMS. Group messages may be secure such that non-group members may not decode the message. Security may comprise encryption which is achieved using a shared key passed to each group member. Alternatively, group members may each have a key used to decode or decrypt received content. The content should be shared content among the group. Content caching may be performed at the RAN, at the core network and in the internet, for example, at a content distribution network. Security information for groups or single UEs may be transmitted in a DCI format or other format. Keys may change when group members exit the group so that old members can no longer decrypt.

Group based authentication (one way or two way authentication) may be provided. In one embodiment, a group based keying mechanism may be employed in which each user has a shared key. Alternatively, rolling keys, public/private keys may also be employed. In one embodiment, content may be encrypted by each transmitter, for example AP, each time it is transmitted. In this way, groups which need a key are smaller since only so many devices may be associated per AP. Thus, the AP may be responsible for either providing an encryption key or providing keys for obtaining the encryption key. In this way, a tree like structure is formed with STAs a leaf nodes. The tree like structure may have limits, i.e. a total number of devices at each AP, and a total number of APs at each AP. Wireless or wireless relays may be employed and data may be provided from multiple sources. For example, an AP may relay a frame, for example a broadcast, multicast or unicast frame, the frame being received in one (un)secure format and retransmitted in another secure format, for example in a same broadcast, multicast or unicast frame type or in a different frame type. Security parameters, for example, a challenge parameter may be provided in beacon frames and responses may follow sequentially from STAs. An encryption type may also be provided via beacon. In one embodiment, newly generated keys may be encrypted with older keys. Keys may have an expiration time.

Security parameters may be broadcast or multicast in periodic information or control frames. The periodic frames may comprise one or more keys, signature(s) a time stamp, a sequence number, decoding information including MCS, resource timing information or the like. Keys may include public keys. Signatures may be coded with a private key of the broadcasting device. Keys included in information or control frames may be used to verify authenticity of data frames received in the future. STAs receiving the broadcast may be configured to verify the public key of the AP via the certificate authority.

In one embodiment, stations of a group may need to confirm authenticity of a video stream or broadcast stream originating from an AP or APs of a tree. This way, a STA or AP cannot present a fake or false stream to other STAs. Thus, a STA may verify a public key/certificate of an AP prior to decrypting broadcast/multicast content. STAs may request broadcast data, for example, one or more of a plurality of broadcast data options, from an AP. The AP may advertise which broadcast data content or content types are available for authenticated and authenticated STAs, data or the like.

An authentication group may be configured to participate in a same NOMA scheme or protocol. As used herein, a NOMA protocol may actually be a semi-orthogonal multiple access (SOMA) protocol and embodiments which are directed to NOMA may be directed equally to SOMA. Authenticated or unauthenticated STAs may request that video or other data streams be started or stopped.

A device may be capable of supporting SOMA but not NOMA. Capabilities may differ based on UE devices and/or device types. For example, low bandwith utilizing UE devices may be standardized according to: LTE-M (aka Cat-M/Cat-M1/LTE Cat-M1/eMTC) or NB-IoT (a.k.a. Cat-M2) or EC-GSM-IoT. These devices may utilize their own DCI formats, for example, one or more of DCI formats 6-0A, 6-0B, 6-0C 6-1A, 6-1B, 6-1C, 6-2, 6-2A, 6-2B, 6-2C, 6-3, 6-3A, 6-3B, 6-3C or the like. A device may support receiving a DCI format from a high power node or low power node devices. For example, high power nodes may include large macro gNB while a low power node may refer to a home gNB or shorter range device.

One area of particular study is metering. Meters might be Positive Displacement; Electromagnetic; Single-jet; Multi-jet; Velocity Flow or Fluidic Oscillator. This may depend on whether or not metering application are for commercial or residential purposes. Meters may calculate a measurable flow rate (residential water and gas applications), temperature, and viscosity and may even measure the meter itself (e.g. watch the watchers!) Suppliers indicate whether devices are designed to measure fluid or gas. Meters may be found in homes or cars (V2X). Meters may monitor pumps, values, household elements or the like. Homes may employ communicable front door locksets, communicable doorbells, communicable climate control thermostats, communicable light controls and smoke and communicable carbon monoxide detectors. Smoke and carbon monoxide detectors may discover one another via wireless or wired methods. Capabilities of each (and location of each) may be established for reporting when necessary. If there is an emergency, smoke alarms can all sound an alarm that indicates where the smoke/fire is located. This may be reported to the fire department etc. Smoke alarms may also act as a base station to relay information. In another method, drones, satellites, cameras, heat sensors and the like may be used to detect fires, for example, forest fires.

Because meters communicate infrequently, it is important that only minimal bandwidth be allocated to them. Meters may be allowed to sleep until woken up. In some cases, a meter or other device may be instructed to sleep or enter a power save mode in a DCI format or other communication. The DCI may also include wake up scheduling parameters, for example, a temporal key for use upon wake up, and what to do upon wake up. A meter may or may not wake up depending on whether it has enough energy to wake up and make at least one transmission. The determination may be made based on a battery level which may be charged via light (similar to a photovoltaic solar cell solar such as one found in a calculator; a water meter may be powered by water pressure, or the like). A UE may be powered wirelessly while simultaneously receiving data. The actual charging mechanism may be application specific. The wake up signal may be tailored to this application specific charging mechanism, for example, a wireless charging mechanism. In some embodiments, more than one meter may be woken up using a same wake up signal. The wake up signal may be addressed to multiple meters (or multiple groups of meters) and may also poll the meters for simultaneous or sequential communication. In the case of simultaneous communication, a beam forming technique may be used to avoid collision. A wake up signal may convey one or more UE IDs, a group ID, one or more cell IDs representing the transmitter of the wake up signal, and the resources for transmission of any buffered data (for example, buffered group data, buffered single tx data) of the meter. Instead of an entire UE ID, a number of least significant bits may be used to convey UE ID or Cell ID etc. Cell id may refer to a unique id of a cell in a global sense or within a single mobile network or carrier network. A wake up signal may convey IP address (static, dynamic). A wake up signal may also have a wake up RNTI and may synchronize the MTC device with a cell or provide synchronization information for another cell or carrier. The wake up signal may indicate a switch of a bandwidth part. In some instances, multiple meters may be triggered for a response occurring in a single subframe (e.g. a plurality of responses are transmitted in a same subframe. A wake up signal may be monitored for in one or more resource elements, for example, in a plurality of resource elements which make up a DCI format. If no response is received, the wake up signal transmitter may retransmit the wake up signal using a different band, different ID (group ID or individual ID). A wake up signal may span x subcarriers, for example, 10, 11, 12, 13, 14 or 15 subcarriers which may have a subcarrier spacing of 312.5 KHz. If the number of subcarriers is less than a number x, for example, less than 13, a number y=13-x subcarriers may be used to convey additional information to the STA aside from the wake up signal. A long wake up signal and a shorter version may be transmitted by a same TRP, gNB, STA, UE etc. The shorter (or longer) version may be supported by some stations yet not others.

In one method, a TRP, for example a gNB or AP may randomly generate an identifier for a wireless device, for example a UE, STA or the like. The TRP may assemble a first wake up information format, for example, a MAC layer PDU, DCI format, or another frame. The first wake up information format may be of a first type having a first type identifier. The TRP may assemble a second wake up information format having a second type identifier. The second wake up information format may comprise the randomly generated identifier and a check sequence providing a CRC for any or all elements of the second wake up information format. The first type identifier and the second type identifier may be different type identifiers and the formats may be of different sizes. For example, the total number of bits corresponding the second wake up information format is less than a total number of bits corresponding to the first wake up information format. The TRP may transmit at least one of the first wake up information format or the second wake up information format to the wireless device based on reported capabilities of the wireless device. The wake up information formats may wake up various device types. In an embodiment, the wake up information formats may wake up in home meters.

Meters may have different levels of sleep. Some levels may be changed, for example, via an A-control field of a frame for which state the STA will transfer to after receipt of an ACK frame. Sleep levels may be triggered based on a wake up signal. Some levels may be deeper sleep levels than others. In an embodiment, a UE may measure the wake up signal and enter another sleep mode or stay in a same sleep mode depending on the quality of the measurement. For example, a UE may be configured with four different levels, from deepest to least deep: Ultra deep sleep, deep sleep, light sleep, micro sleep. Any one of these sleep levels may be entered once (or a time thereafter) a UE receives PDCCH. In another method, a UE may be put to sleep if indicated by a downlink transmission. If the downlink transmission indicates that no data shall follow, the UE can subsequently go to sleep (GTS). A GTS indication may be received via preferably via DCI, MAC with RRC signaling providing long term RRC scheduling and or parameters/information.

When asleep, the UE may still be configured to perform positioning, for example transmit a position signal, based on a movement condition or mobility state of the UE. Position may be determined based on angle of departure and/or angle of arrival of a position reference signal. Reference signals may be allocated via DCI in a one time allocation, semi persistent allocation or semi statically. Reference signals may occupy a fixed portion of a slot, subframe or the like. Position may also be determined based on the subframe timing of two or more base stations which are in range of the UE. A UE may make a handover or other decision based on the determined position. The UE may transition between any one or more of the sleep states via a change of any one or more of the parameters or via a change in any information element disclosed herein. UE may wake up periodically and take a measurement or determine a location, speed or the like. The determination, for example, for measurements or location, may be requested by a network node via the gNB. Measurement results, speed location or the like could be reported in resources indicated in the wake up signal or other signals. Alternatively, the UE may be configured to report these signals in configured resources. A UE may indicate a capability to take part in wake up signal transmissions, for example, the UE may indicate wake up and power up capabilities to a gNB, AP, TRP etc. In one instance, a UE may report a capability to join a group or a capability to support a grouping function or method. Wake up signals for UEs of a first group may be transmitted at a time offset from other wake up signals for UEs of a second group. Wake up signals sent to a plurality of members of a same DRX group may be code domain multiplexed and/or frequency domain multiplexed. They may also be time domain multiplexed to fall within the DRX active time.

In an embodiment, a DRX active time may be shortened or lengthened based on a probably of successful listen before talk. For example, if the channel is busy, DRX active time may need to be long vs short when channel is empty and Tx opportunities are plentiful. When the channel is busy or detected as blocked, the UE may switch to another channel, of a plurality of configured channels, and transmit data from the queue which would have been sent on the first channel. DRX periods may be determined based on application layer information. In an embodiment, DRX parameters may be provided via one or more MAC CE commands. In an embodiment, a UE may sleep during a portion of the DRX active time if not actively woken up (via signaling) in a portion of the DRX active time. In DRX active time, or DRX inactive time, a UE may receive a power control signal including a sleep signal.

If uplink data becomes available at the UE when in a DRX power save mode, the UE, based on a priority of the data, may remain in the power save mode until a next inactivity interval. For example, if the transmission is an eMBB type, the UE may remain in power save mode. The opposite may be true for a low latency transmission type. Metering data may remain in memory for an even longer period than eMBB. Power saving mode parameters may be provided as a table in RRC or MAC, and a lookup may be performed upon receiving an indication to transmit via DCI.

One exemplary meter application is in solar roofing panels. Solar roofing panels may be arranged as traditional mounted roof top devices or they may be integrated into a roofing shingle. The ladder is preferable due to the fact that roofing material may be saved from not having to build an asphalt roof layer and then a mounted solar system. Regardless of the design, solar panels may be metered to determine whether there is a fault in a panel or to determine operational characteristics and communicate. In one embodiment, the panels themselves may comprise a transceiver and circuitry to communicate among themselves. Alternatively, or in combination, the cells may be coupled via a backplane or via a power line system. Circuitry may be configured to discover each panel, indicate capabilities of each panel and determine the relative location of each panel. Having a relative location of each panel, reporting an error on a per panel basis may be performed. This may be done using a bitmap. Having the capabilities of each panel may allow for software upgrade of a panel. Panels themselves may communicate via low range, low voltage methods (RFID, Bluetooth, EMV, NFC, etc.). Reporting of the error may be communicated using any technology or topology disclosed herein.

In one method a UE, for example, a solar panel may be capable of a regular wake up signal only. Alternatively, a UE may be capable of an extended wake up signal which includes receiving a wake up signal which indicates any one of the sub frame durations of the regular wake up signal but may also include longer durations. A narrowband wake up signal (NWUS) high ext capable device may be capable of longer wake up signal duration(s).

Figure 4:
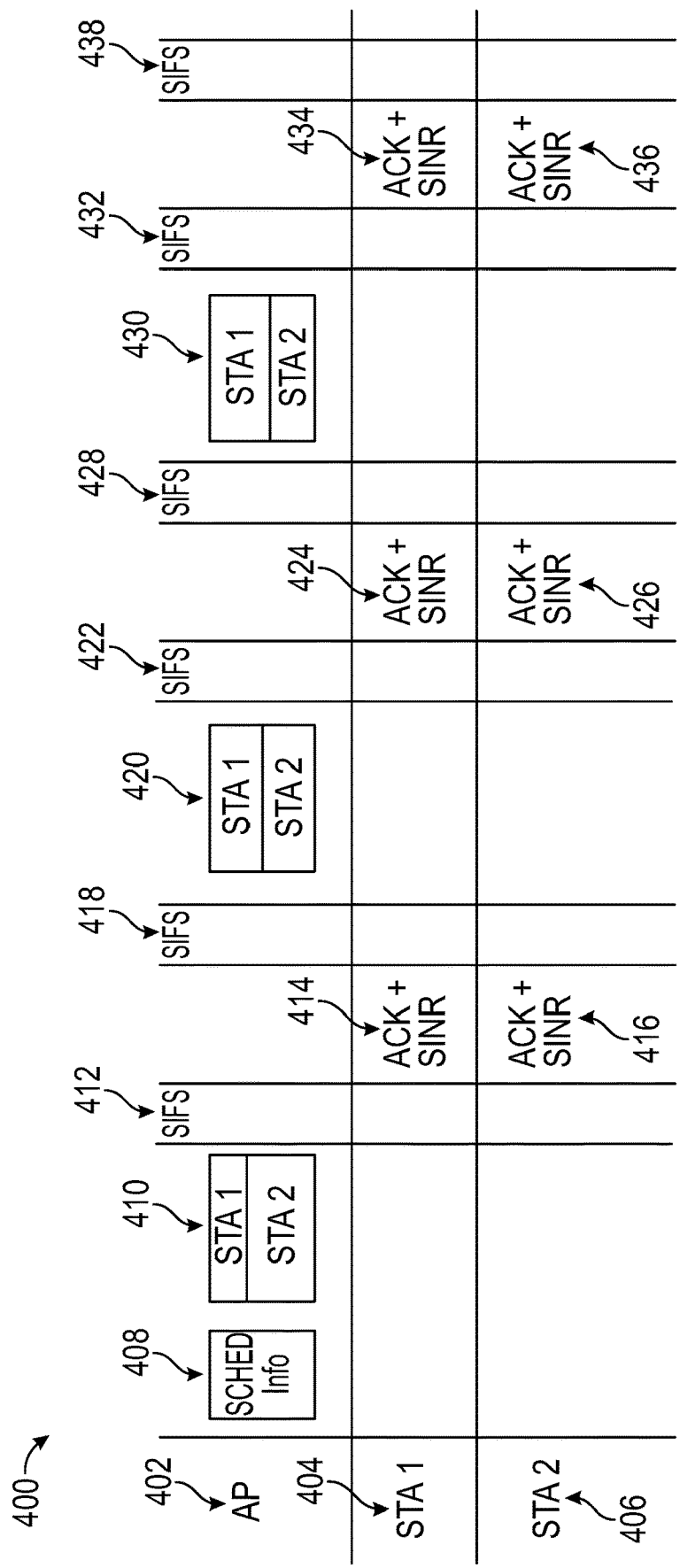
FIG. 4 is a message diagram which illustrates a method for determining a transmit power level for non-orthogonal multiple access (NOMA) communications among stations (STAs) and access points (APs)

FIG. 3 is a table 300 which illustrates an example of such wake up signal duration settings. A UE or may report a wake up signal capability to a network or base station to indicate a capability to receive wake up signals and respective length times. In the example shown in FIG. 3, a UE may have a capability 302 indicated as a regular NWUS capable UE 308, as a NWUS high extension capable UE 310 or a NWUS high extended capable UE 312. According to an NWUS max value 304, a set of supported durations 306 may be configured. The UE may be capably of indicate length times as a command or signal length, i.e. a length of time for which the wake up message is received in. For example, a device may be capable of a long wake up signal and a short wake up signal. The shorter signal may only indicate a portion of a UE address, for example a portion of a MAC address, AID or the like. The capability may include a capability of receiving a may be a factor of wake up signal duration or a factor of FIG. 4 illustrates a method 400 for determining a transmit power level for NOMA communications among STAs and APs. In on embodiment, an AP 402 may send scheduling information 408, including a duration and power level parameters, to STA1 404 and STA2 406. The AP 402 may then proceed with a cascading power level transmission method. The method may chose at random a first STA to transmit a signal with high transmit power, for example, STA2 406 has high power in an initial transmission 410. Both STAs may simultaneously or sequentially respond 414, 416, after a SIFS 412, with an acknowledgement and SI NR or other indication of signal quality. Next, the AP 402, may transmit to STA1 404 and STA2 406 using an equal power level 420 for both STAs after another SIFS 418. After another SIFS 422, STA1 404 and STA2 406 may transmit an ACK and SINR 424, 426. After a SIFS 428, the AP, may allocate high power to STA1 404 and low power to STA2 406 in a transmission 430. After another SIFS 432, the AP 402 may receive another ACK+SINR 434, 436. The AP 402 may determine, from the ACK and SI NR signals received, a preferred power for each receiver for transmission of NOMA type multiplexing. Using groups IDs, STAs may be targeted as a group or groups. Each one of the transmissions may employ 802.11 format type messages with SIG fields, MAC fields, or the like. Any one of the parameters or signals herein may be included in these SIG or MAC fields. A counter may be transmitted with each cascading transmission by the AP.

Ranging based determining transmissions may be cascaded similarly to FIG. 4. For example, a STA or AP may send a ranging NDP announcement frame subsequent to a ranging poll frame. The NDP announcement may have a plurality of STA info fields configured. The STA info fields may include an AID and a token field matching a token field of the ranging poll frame.

Large or small scale meter deployments may relate to security surveillance. For instance, deployed devices may be may be visual or alarm/data based. In a large area a module, device or UE may comprise a battery, sensor and transceiver. In some areas, the cost to replace a battery or service a sensor device may be so costly that it may be may be better to consider the device as disposable. Some disposable devices may be so remote that they even utilize a directional antenna with very low transmission power as compared to a legacy based transmission antenna. This would allow for long distance transmissions at lost costs. Distant devices may also be grouped or clustered. A master node can be thought of as a head node. But the term head node may be deceiving as it may refer to a true root node or it may refer to a branch or cluster head node. In this way, multiple UEs may communicate with the cluster head for relay transmission with the true root node. Clusters may be organized based on special and directional features. For example, a cluster of UEs may be located nearby or all within a given direction from a cluster head. The clustered UEs may form a group. The group may include UEs which are not located nearby or not able to participate in direct communication.

In another embodiment, UEs may be capable of utilizing less than an entire allocation region, for example a resource block. This may allow a large group of UEs to be triggered and respond on a symbol/subcarrier basis. Alternatively, it may be that a portion of a resource block is dedicated to a high cost UE and only a single resource element is dedicated to the low cost UE. Devices that are capable of transmitting or receiving less than a full PRB, for example, sub-PRB capable devices, may indicate this capability to a cell or other transmission point. Devices may support differing modulation and coding schemes for transmitting or receiving on less than full PRB. A UE may be configured to report a number of supported resource blocks, PRBS or the like. A PRB bundle may be indicated in a DCI.

A UE may support code division multiple access CDMA, orthogonal frequency division multiple access OFDMA, power division multiple access, non-orthogonal multiple access (NOMA), layered division multiplexing (LDM) or cognitive radio (CR). Other access schemes include multiple user shared access musa; Sparse Code Multiple Access (SCMA); Interleave-division multiple access (IDMA); interleave grid multiple access (IGMA); maximum likelihood resource spread multiple access (ml-rsma) or sl-rsma; low code rate spreading (LCRS); low code rate and signature based shared access; Welch bound equality spread multiple access (WSMA); resource spread multiple access. A UE may indicate support for any one of these technologies and may receive information (scheduling information, data, grant information, power of a primary user as compared to a secondary user, or the like) in accordance with the capability. For example, two co-scheduled UEs may both support SCMA and thus may be code multiplexed for scheduling/transmissions, or the like based on their location or network topology. UEs may be configured to switch between cyclic prefix (CP) CP-OFDM and DFT spread OFDM (DFT-S-OFDM).

Any technology or topology disclosed herein may operate as an overlay or as an underlay network, wherein each network passes information to the other network. A grouping of users may or may not be performed on the underlay or overlay networks. In an embodiment, NOMA UEs may be configured as a group and may receive a group RNTI (group-RNTI). In an embodiment, the group-RNTI may be a group paging RNTI. If a user drops from the group, or performs a handover etc, a DCI or other signal may indicate updated parameters of the group, updated NOMA parameters, etc. Group based or UE specific resource grants, for example, via DCI, may be persistent, semi-persistent, allocated for multiple symbols, for example, two symbols, three symbols, four symbols, five symbols, six symbols or seven symbols, or the like, or a multiplier of two times any one of these numbers of symbols. A DCI may indicate, for example, via a bitmap resources for transmission, wherein some of the resources are preconfigured at the UE. A DCI may also indicate other NOMA specific parameters including correlation or interference values. DCI may be received on any one or more of symbols 1-7 of a slot. Transmissions may begin in any symbol of the same slot, any symbol of the next slot or any symbol of any slot thereafter.

In another embodiment, metering devices such as water meters (or any other type of MTC device) may share data prior to being triggered by a cell. In this way, a single MTC device may act as a master device (or a peer device) and may collect meter data for reporting to a cell. A single MTC device may have an MTC specific RNTI or another RNTI. This may provide for reduced overhead and bandwidth to the cell. Sharing transmissions may be via a different protocol such as a WLAN protocol, or PAN protocol, etc. In another embodiment, the meters may share data and then collaboratively transmit the data to a base station. This embodiment is referred to a collaborative transmission which shares a frequency and time. Power may also be shared among transmitters, for example in a static fashion, semi-static fashion or dynamic fashion. Any unused power of a transmitter may be allocated to another transmitter. The transmitters may be transmitters of a single WTRU or multiple WTRUs, for example using a collaborative transmission approach. A collaborative transmission may be to a common receiver, for example, a nearby base station.

In large scale meter deployments, for example, it may be difficult to determine which meter is transmitting. But, if the meters are coded based on an address or coordinate system, the BS may be able to ascertain location without the need for wireless detection. In one embodiment, the meters or other UEs may use a sidelink or V2X type protocol for exchanging data and capability information. The data may of course be encrypted such that no other meter may decrypt data of another meter. It may be that only the cell or application server which collects the data is configured to decrypt. UE capability information may be transmitted over the sidelink or v2x link.

V2X devices may exchange information via MAC service primitives, for example, any one or more of the following may be exchanged in mac signaling: source address, destination address, routing information, data, priority, service class, V2X request vector, purpose, device capability, device type, location/position, MCS for decoding, coding type and any other parameter disclosed herein.

A UE may have a capability indicator which indicates whether it can transmit using multiple component carriers, whether it can transmit over non-continuous component carriers. In a sidelink/V2X communication, the UE may provide this indicator to another sidelink/V2X or V2X device (e.g. a UE or car, etc), prior to the second component carrier being activated between the devices. Preferably, a UE will choose contiguous component carrier transmission, but in some cases, only a portion of available carriers may be usable by the UE. A number of component carriers supported by a UE may be included in a capability identification or transmission. A capability reported may be a size of a transmission time interval, such as a block, subframe or the like. A supported size may be short, medium long etc. as gauged by an LTE subframe timing for example. If a UE supports a particular aggregation capability, the UE may or may not have to drop scheduled transmissions/receptions, for example, if two transmissions are simultaneously scheduled. Priority of the transmission may be considered in making the determination.

Vehicles may include farm vehicles which require communication for in farm activities. For example, precision location may be employed so that farm equipment passed over crops efficiently and accurately. Aside from location, radio may be used to independently control farm equipment, via either a remote operator or via a computer driven operation. Further, diagnostic procedures and software upgrades may be remotely performed on the equipment. In one embodiment, a remote diagnostic procedure, via a Controller Area Network (CAN) bus, may be performed remotely over the internet. In one embodiment, the UE may transmit a CAN message over the RAN via the PUSCH. Alternatively, the CAN message may be transmitted over WiFi.

A wake up signal may be defined and employed such that a period of time or gap may be employed before a paging occasion occurs. As such, the gap may be configured for the meters to share data. The paging occasion delay may also be variable based on a number of MTC devices which actually have to transmit. Paging may indicate resources for reception or transmission of data. Alternatively, paging may also be used to simply transmit a short message to an MTC device or UE without any resource indication. A combination of the two may be employed. In one embodiment, a legacy DCI format may be tweaked to indicate whether or not some bits are used to convey actual paging data. A paging message, for example a wake up page, may be an unacknowledged message. Alternatively, paging may be ACKed by some devices. A reference signal, for example, a narrowband reference signal may be sent on a non-anchor for paging purposes. A paging identifier may be conveyed by a wake up signal. Paging messages may be sent on one or more beams, for example, one beam, a subset of beams or all beams of a gNB.

A UE may refer to a cell phone, portable electronic device, PDA or the like. Lesser known UE implementations may refer to biometric devices or sensors which are deployed either in body, on body or near a human (or other animal) body. These UEs may aid individuals with disabilities or illnesses which require monitoring and control or aid. These types of UEs may utilize spectrum in the ISM band or another band, for example, the MICS band which refers to the Medical Device Radiocommunications Service. These UEs may communicate with devices which utilize spectrum outside of the ISM band, for example LTE or NR spectrum. Implanted devices may employ a battery which may be charged via a wireless or wired connection. A coil may be used to wirelessly charge a battery. Sensors may include window sensors, gas sensors (i.e. auto gas sensors, in home gas sensors, landfill gas sensors, or the like.) Sensors may be employed in windmills (wind speed, propeller speed) to sense characteristics and report those characteristics wirelessly. Other remote devices include billboards. Devices may be configured to report information over a power line connection to another device which is configured to transmit the information wirelessly. For example, a meter may be employed for the wireless transmission of information reported over power line communications. A UE may report a capability to be charged wirelessly, for example, at a particular distance away or via a particular beam configuration. A beam configuration may include or support beam correspondence.

In some embodiments, a UE may be configured to operate in a multiple radio access (MR) dual connectivity (DC) (MR-DC) state or spectrum. In one scenario, the MR-DC spectrum may incorporate bands of LTE, NR, ISM, Bluetooth, 802 or the like. It may be that the UE operates in spectrum which is continuous within the same band, or the UE may operate in spectrum which is not continuous within spectrum of one connectivity link of the dual connectivity state. In one embodiment, a UE may be configured with a maximum transmission power which is equal to a sum of the power used for two or more of the frequency bands, for example, power of LTE+power ISM must be less than or equal to a max power (for example, 23 dBm or 46 dBm). Each one of the LTE, NR, ISM, Bluetooth, 802 type bands may be considered when reporting capability of maximum transmit power. In one embodiment, power may be scaled according to a UE class or type. The supported type of dual connectivity may be indicated to a base station or other device. The UE may report a power level capability as a power profile. Power profiles may be configured in terms of one or more preferred power levels or configurations. A preferred scheduling, for example, cross slot vs. same slot scheduling may be reported and the network may select a scheduling method via DCI, MAC or other methods including a wake up signal.

Medical implanted devices may wirelessly control one or more devices outside the body, such as a prostheses device. The opposite is also true, in that a wireless pacemaker may be controlled, e.g. parameters modified, software upgrade or the like via a device external to the body. Some medical device sensors may be deployed outside a patient and monitor the patients movements as well as whereabouts. One such sensor deployment may be a sensor for monitoring an older person's movements, for example, in and out of chairs, in and out of a restroom or even inside vs outside. This may be important for a hospital or nursing home for example. Exemplary sensors include personal glucose monitors, DNA target detectors, disease detectors, EEG recording devices, etc. Software level and software upgradeability may be reported capability indicators. Application software and firmware may be upgraded. Upon update or upgrade, a UE may perform a hash function on the upgraded software or upgraded components or list of components to determine an updated UE capability id. Capability ID may be indicated to the cellular network over the LTE, 5G RAN or over WiFi, etc.

V2X is an evolving radio technology and as it is deployed, V2X UEs may have to report particular capabilities prior to initiating communication with a device. A V2X UE may be configured to report transmission parameters to other V2X UEs or a network or infrastructure device. A UE may respond with a pool of resources which is based on the type of capabilities indicated. The pool may be configured per gNB, i.e. may change at handover. V2X transmissions may be unicast, groupcast or broadcast. V2X messages may employ a higher layer protocol such as IP over TCP or UDP. TCP/IP may take time to setup a session and thus may be less desirable in some circumstances. Other technologies may use communication protocols which are not session based or not structured. A capability of supporting session based or unstructured based connections may be reported by a UE. Infrastructure devices may be entirely foreign to a UE and thus a capability indicator may indicate modulation capabilities, e.g. what type of modulation is supported by the V2X UE. This indicator may be denoted as a 3GPP release indicator. For example, a V2X UE may only support sidelink or v2x communications of a particular release, for example, release 12, 13, 14, 15, 16, 17, etc. Alternatively parameters may be more low level, for example, whether or not frequency hopping (for example, 1, 2, 3, 4 or 5 hops) is employed, capable configured frequencies of the V2X UE, etc. A frequency hopping parameter may indicate a selection of a table for frequency hopping. The indicator may indicate or infer a profile or other technology. In one embodiment, this indicator may be based on the capability ID of the V2X UE assuming the V2X UE is configured with a capability ID. The frequency hopping capability may be necessary in order for the UE to be scheduled properly.

For example, some DCI formats may indicate frequency hopping parameters for the UE to utilize. The UE may need to transmit data which is frequency hopped in a slot or across spectrum, for example using multiple mini slots, for example via repetition, for transmission. DCI may also provide SPS parameters for use with frequency hopped transmissions. One or more DCI formats may provide resources for UL transmission, DL reception, UL sidelink/v2x or DL sidelink. These resources may be transport block size denoted, in accordance with a transmission, retransmission, second retransmission or the like. Some elements of a DCI may be variable in size. For example, a number of UE IDs may be indicated. The number of elements or length of the variable field may be provided. In another example, any one of the parameters or attributes disclosed herein may be included in a DCI format, yet when the DCI is transmitted, a UE may transmit some fields with a lower than maximum number of bits. In some examples, the number of bits may be 0. In one embodiment a DCI format may combine one or more of UL transmission, DL reception, UL sidelink/v2x or DL sidelink/v2x such that resources for UL and DL are assigned together or that UL transmission and DL sidelink/v2x resources are assigned simultaneously in one DCI. For example, an uplink and/or downlink assignment index may be provided.

DCI formats may be based on UE capability. In some settings, v2x resources may be configured by a base station. These resources may be used for a first UE to communicate with a second UE and may change or be switched from transmission to transmission. Resource configurations may vary over time and each configuration may have an associated DMRS or associated uplink control information. The resources from the base station may be indicated over a first radio access network, while the transmission from UE to UE may occur over a different radio access network. One may be NR, one may be LTE, one may be WLAN or any other technology. In one embodiment, a WLAN frame may be modified by including any one of the parameters disclosed herein into a PLCP preamble, for example, into a SIG-A or SIG-B field of the PLCP preamble. The modified frame may be transmitted or received.

A base station may indicate capabilities, and may determine appropriate transmission characteristics, according to UE identifier to one or more devices for v2x/sidelink communication. For sidelink communication, a UE may be configured to communicate via groupcast transmissions. In one embodiment, the UE may be configured to use a lowest capability of any member of the group for a transmission. Sidelink transmissions may be transmitted according to one of OFDM or NOMA based on the capability information.

A frequency hopping scheme may be employed for random access. In some radio technologies, bandwidth may be determined by a threshold bandwidth, for example, 30, 40 or 45, 60 khz and a multiplier. So, the threshold multiplied by an integer or non integer, such as a decimal number, may indicate total bandwidth. In case of detected collision (or overlap) of a random access with another transmission, a RACH transmission may be delayed or postponed. Delay or postponement may occur via a timer or other indicator. In an example, each time a RACH is unsuccessful, on a particular beam, carrier or in accordance with any other parameter disclosed herein, a counter may increment and a following transmission may be optimized or performed differently. For example, preamble transmission counter may be incremented and/or another counter may be incremented to determine radio link failure or another radio link issue.

A delay of RACH or another high priority transmission may not occur regardless of whether the UE is configured with a measurement gap. If a decimal is set to a value less than 1, then a narrowband may be defined. In narrowband frequency hopping, RACH transmissions may occur with a varying scheme. For example, if transmissions occurred at a set distance in frequency, collisions may be frequent as many UEs may have the same pattern. A random hopping approach could be used to avoid this deficiency. In one embodiment, a bandwidth size may be used to determine a bandwidth hopping gap size. In an embodiment, a gap size may be set to a bandwidth size divided by an integer number. For example, in one embodiment, a 30 khz bandwidth divided by 20, provides a minimum gap size of 1.5 khz. A UE could hop a minimum of 1.5 khz (and maximum up to the determined bandwidth). Or, it could hop a random number between the two. For example, if a random integer number (rand_int) is generated between 1 and 20, the UE could hop rand_int gaps. If the hop gap exceeds the bandwidth, the hop value may simply wrap around to the lower bandwidth. A delay may be provided after a set period or set number or hops.

Frequency hopping may apply for any transmission disclosed herein regardless of whether the transmission is in the uplink, downlink or sidelink. The same is true for redundant data receptions, i.e. the transmitter may transmit a same signal, for example, a same PDU twice. Same signal may be changed somewhat, i.e. modulated differently or coded differently but may be a same transport block etc. In an embodiment, different numbers of resource elements may be used for each redundancy version. For example, a first transmission may have control+data Res, a second transmission may have just control Res and a third may have just data Res. There may be more (or less) data REs for subsequent transmissions and the UE or TRP may fix this up via a circular buffer or other means.

In some embodiments, a UE may have redundant circuitry. In fact, some UEs may implement dual cellular stack and dual hardware. This is so that each stack may be used to connect with a different base station and provide redundant (same time) access. This may improve throughput, reliability and latency. A gNB may report statistics, for example via broadcasting, as to the percentage of UEs which satisfy particular throughput, reliability and latency standards/requirements/thresholds.

To aid in reception of a signal, a transmitter may include a known reference signal or signals called demodulation reference signals (DM-RS). In one embodiment, the DM-RS may be code division multiplexed. There may be different CDM groups.

A UE may be configured with one or more bandwidth parts (BWPs). Each BWP may have an identifier which unambiguously identifies the bandwidth part. BWPs may be configured sequentially or non-sequentially (i.e. with gaps or other non sequence). Sequentially may be initially starting with 0 or 1, then 1, 2, 3, etc. A reverse sequence may also apply so as to convey a highest identifier first which may allow a UE to identify quickly a highest number of BWPs. A UE may only transmit on one BWP at a time or may transmit/receive on a supplementary BWP. In one embodiment, BWPs may be configured via a base station to coincide in frequency such that they are in bands next to each other. Alternatively, BWPs may be configured for in bands which are not next to each other, i.e. other bands span between them. In one embodiment, BWPs may be configured such that they do not overlap with bands of another radio technology, for example, 802 or Bluetooth. This way, the UE could simultaneously transmit or receive using the alternative technology while also transmitting or receiving in the 2 (or more) BWPs to the base station. The UE should monitor total power output for the 2 (or more BWPs) and the alternative frequency transmissions so as to ensure that a maximum power level is not reached. A UE may receive a broadcast signal or other signal which indicates that all or a group of UEs should move to one BWP. BWP signaling may be done on a . . . −2, −1, +1, +2 . . . basis. For example, a base station may signal a BWP which is 2 or 1 BWP(s) lower than that the UE is already using. Or it could be the opposite direction.

BWPs may be configured and/or activated. The UE may determine which BWP of the plurality of BWPs to transmit or receive on. The UE may chose 1 or more BWPs. BWPs may be activated or configured in accordance with a reference signal provided by a gNB. A UE may report a preferred BWP which may determined via application specific parameters. Applications may include video, audio, gaming, virtual reality etc applications. Parameters may be based on QoS or QoE.

Sequence numbers may be used by a UE for ordering of Packet Data Convergence Protocol (PDCP) protocol data units which may be transmitted or received by a UE. A UE may support and may indicate support for PDCP sequence numbers of varying sizes. For example, a UE with a particular capability may support 15 bit capability in a first mode, yet support an 18 bit capability in a second mode. In another mode, 16, 17, 18, 19, 20, 21, 22, 23, 24, 25, 26, 27, 28, 29, 30, 31 or 32 bit PDCP sequence numbers may be supported. Sequence numbers may be included in broadcast, multicast or unicast frames.

PDCP sequence number sizing may be based on access technology. For each one of the access schemes disclosed herein, a different PDCP sequence number size may be used. In one embodiment, PDCP sequence numbers may be validated based on PDCP PDUs received from one or more network paths. In one embodiment, if a base station or UE detects that radio conditions are degraded in a dual connectivity scenario, the base station or UE may switch to a duplicative PDCP transmission method, if a plurality of paths are available, in which PDCP PDUs with a same sequence number are transmitted in parallel (in one embodiment, on different frequencies or using different radio access technologies). In one embodiment, the PDCP duplication method may be on a PCell/SCell, two different TRPs or provided to two different gNB, or on licensed vs. unlicensed bands. PDCP duplication may be initiated based on QoS, link quality, application layer priority, an availability of multiple cells or the like. An entire PDCP may not necessarily be completely duplicated, rather only a portion of the PDCP PDU, for example the header portion, may be transmitted in duplicate. A gNB may instruct a UE to duplicate or not duplicate, for example, a UE may not duplicate and may soft combine the received PDUs at a PDCP or lower layer, for example a PHY or MAC layer. Alternatively, or in combination, duplication may be performed based on a number of NACKs received or a timer.

A UE in dual connectivity may have a master cell group and secondary cell group which share or do not share resources. A dual connectivity or a handover (using either make before break or hard handover) scenario may require the UE to instantiate two distinct network stacks, for example, two or more MAC layers, two or more RLC layers, 2 or more PDCP layers etc. A UE may report a number of RLC layers as a capability. A UE may indicate which RLC layer or which PDCP layer will be used for a transmission. A TRP may do the same. In a dual connectivity scenario, if the UE has one redundant PDU session with one or more TRPs and a power level is determined to be exceeded, instead of dropping or discontinuing the dual connectivity connection, the UE may switch to a single PDU session while maintaining dual connectivity, i.e. one or the redundant sessions may be torn down.

In vehicle applications a meter may monitor a battery or other electronics of a vehicle. A meter may be used to monitor current or voltage. The meter may also monitor capacity of battery cells. The batter or battery cells may be series-connected battery elements coupled to the meter or a wireless data acquisition system. A measurement may be taken during an operational period of the battery or during vehicle idle state. While in operation, the vehicle may be found to have an exceptional characteristic pattern or may throw a hardware or software based exception. Vehicles may indicate capabilities to a network including engine capabilities, communication capabilities, operator information, terrain conditions, tire conditions, oil and gas information or any potential overheating condition capabilities. Vehicle meters may monitor road condition and road condition management systems. Road condition management systems may identify traffic patterns and environmental conditions. Problems may be potholes, debris, construction work, abandoned or displaced vehicles or other issues. The meters may compare the vehicle to other vehicles trajectory, speed or movement. Meters may control or monitor an accelerometer or foot pedal of a car, any cameras or sensors, devices that are in or on the road like magnetic or wireless transducers, tire pressure or condition, a Doppler radar, rain temperature or police activity. Vehicle sensors may monitor for water, ice, snow or visibility conditions. Vehicles which are grouped closely together and share the same characteristics may receive group messaging indications or data from an AS based on sensor readings or information provided. Vehicle sensors may monitor Doppler frequency and report same on a periodic or aperiodic basis.

Doppler may affect transmission/reception. During synchronization, a UE needs to detect synchronization signals, for example PSS and SSS or an unlicensed band synchronization signal or unlicensed band reference signal. These signals allow for synchronization and determination, by the UE, of an identifier of a transmitter (e.g. base transmission reception point) or even mobile TRP. In the case of a mobile TRP, for example one mounted on a car, truck, train, blimp, aircraft, etc., Doppler shift may be relative to the displacement of the TRP from the UE. This may be even worse depending on the carrier frequency. Therefore, Doppler shift may be determined and compensated for. A MIMO compliant UE might use multiple beams to search for the TRP, each beam tailored to a slightly different frequency. A best case could be an ideal frequency all the way up to a threshold for a worse Doppler shift quantity. In this way, regardless of the Doppler shift, a UE may detect a TRP transmission in one (or more) time periods. Alternatively, Doppler shift may be determined based on information received from another cell (or based on a transmission of another cell).

Synchronization may be provided by another signal other than the PSS and SSS. For example, a resynchronization signal may be useful for UEs which have synchronized with a cell in the past. A resynchronization signal may be detectable once a UE has already received PBCH and one or more SIBs. Periodicity, length, coding or other parameters may be provided via the one or more SIBs (for example, SIB10, SIB11, SIB12, SIB13, SIB14, SIB15 or the like). Signals, for example, resynchronization signals or reference signals may be coded by Zadoff Chu, Gold code, Hadamard code, a pseudo random sequence, for example, pseudo random binary sequence (PRBS) or the like. The PSS and SSS may be coded in a similar fashion. Resynchronization signal may occur before PSS, after PSS or after SSS (or in any other combination or fashion). A single secondary synchronization signal may convey both physical cell identification and the timing information needed for synchronization. A resynchronization signal may occupy less than an entire physical resource block, a PRB or multiple PRBs. To covey a resynchronization signal using limited bandwidth, the signal may not have to convey an entire physical cell identification. It may convey only a portion of the bits dedicated to PSS/SSS, enough for a UE who already accessed the cell to determine with reasonable probability that the cell is in fact the cell the UE desires to connect with. The resynchronization signal may be transmitted on another band as the primary SS and secondary SS. This band may be licensed or unlicensed and may or may not contain beacon or other coexistence signaling (power level bitmaps, power control signaling or the like). The UE might add in additional information, e.g. location information from WiFi access points, other cellular signals, or even GPS information to determine, based on a look up table for example, a full base station identifier. Reducing the number of bits dedicated to fully identifying the physical cell ID may free up bits for conveying other information. Some information may be, for example, whether important information of the cell has changed. This may be information of a master information block. In one embodiment, it could be that RSS is not always transmitted at a fixed interval. In this way, other transmissions may take priority. As used herein, the term GPS information may refer to any Global Navigation Satellite System (GNSS) transmitter or receiver. Well known systems include, for example, Gonass, Galileao or Beidou, among others. These systems may be used for location detection, synchronization, tracking area management, registration among others. GNSS may be used to provide synchronization, either directly or indirectly, for example in time based on a reference clock. Other nodes may also provide synchronization, for example, a time or position server (for example a location management server or function), an eNodeB, a gNodeB, or the like. Satellites may have a fixed or moving beam footprint. A location may be used for fast reauthentication. For example, assuming a UE has not changed locations, this information may be used for authentication. A malicious user would be unlikely at a same location in time as the legitimate user.

Power control parameters may be provided via DCI. For example, power control values $P_o$, Alpha, power control loop, pathloss and the like may be determined by the service request identifier (SRI) field of a DCI.

Satellite based communication, or non terrestrial communication in non terrestrial networks (NTN) may or may be configured to support harq transmissions. That is, an NTN may enable or disable HARQ for one or more satellites via DCI or other longer term signaling. As an alternative to HARQ, a UE may adapt a redundancy or lower an MCS based on a satellite altitude.

A UE may prioritize synchronization signals. For example, if no synchronization signals are received from a gNB, the UE may search for a satellite based synchronization signal or vice versa. The UE may prioritize signals received via WLAN or beacons provided by other UEs as well.

Synchronization signals may include a primary synchronization signal and a secondary synchronization signal. These signals may be transmitted at different times and may indicate different portions of a variable length identifier of a base station, gNB, TRP etc. They may also be transmitted with different power levels from each other or from other signals. For example, the PSS or SSS may be transmitted at a different power level than the PBCH. It may be that the PSS, SSS and/or PBCH are each beamformed and/or transmitted in a sweeping manner. Other signals may also be swept either in uplink or downlink. The UE may receive the PSS, SSS and/or PBCH on a plurality of beams and determine which beam is strongest. PBCH may carry a master information block and/or secondary information block, i.e. a system information block (SIB). PBCH may be transmitted at a lower power level than SS (or vice versa). A plurality of PBCHs (or PDSCHs, PDCCHs, PUSCHs, PUCCHs) may be transmitted by a gNB (or a UE) which may overlap in time, frequency or beam. In one embodiment, a gNB may or may not vary a DMRS sequence index for each transmission.

Vehicles may have other wireless controlled meters, sensors or actuators. For example, a vehicle seat, radio or even door handle may be wirelessly controlled and monitored. There may be a sensor on the handle which is coupled to a handle controller for forwarding a latch/unlatch control to a vehicle microcontroller. The microcontroller may signal the request over a wireless interface. If the vehicle is moving, this request may be declined.

In one embodiment, a vehicle may be configured to display one or more indications of events, for example, brake lights, turning, road conditions ahead, or the like on a heads up display or on an LCD or other electronic display in dash. In this way, it may be possible to overlay a brake light on the heads up display over top of the transparent windshield in which a driver is looking through. This may increase reaction time for brake light detection. Brake light information (and other vehicle information) may come via sidelink or other radio access technology or transmission. Using a in-dash monitor, a vehicles surroundings may be displayed. Slowing vehicles, hazards, etc may be displayed in a different fashion to a user than ordinary conditions. Vehicle specific parameters may be included in a MIN or one or more SIBs transmitted by one or more TRPs.

The MIB or one or more SIBS may include a UE which indicates whether or not a change in system information has occurred. This indicator may be a data structure which comprises a configuration change count including an integer number which wraps around once a maximum number is met. For example, an 8 bit configuration change count may wrap after 256 increments. A 9 bit may wrap after 512 and so forth. In another embodiment, the MIB may indicate a Boolean value that corresponds to a given time period. In this way, a UE may receive the Boolean value (bool, integer, bitmap, etc.) and determine whether or not a change has occurred based on the time it has not received recent system information. Bitmaps may be preferable when indicating status of a plurality of elements or parameters in a same indication. In an embodiment, a MIB or SIB may include a bitmap which represents which SIBs are transmitted or carried by the base station. There may be a bitmap which corresponds to other base stations as well, for example relay stations or stations of another technology/frequency. In another embodiment, the base station may provide system information change information of another node, base station or access point. This way, a UE may gain information about another node without having to reconnect. The another node or AP may be nearby the base station which transmits the information. In one embodiment, the information regarding change state of a base station may be relied by another network element. For example, a UE may be connected to a relay node which retransmits sync signals of a donor eNB. The relay node may be configured to indicate to the UE whether or not a MIB of the donor eNB has changed.

SIBs may provide UE information and when the UE information changes, the gNB may page the UE to inform the UE of updated SIB(s). For example, SIBs may provide group information, i.e. a group, a subgroup, number of groups/subgroups, group members of the UE, etc. In another example, a UE may receive positioning information in a SIB. In an embodiment, the positioning information may be a reference signal. The UE may receive positioning reference signals from gNBs, eNBs, and/or WiFi APs. Reporting the position may be provided to or transmitted to any one or more of the gNBs, eNBs or WiFi APs. The UE may receive position information and a response may be provided via RRC or another message format. Other information provided by a SIB or DCI may be cooperative transmission or cooperative relay information. In this way, one UE may provide interference information to another UE such that the UE or another UE may make a decision to transmit at a same time/frequency but using a different power. The decision may be based on whether the UE or another UE is a primary or secondary UE and whether the channel conditions or interference exceed or do not exceeds a threshold. A decision to simultaneously transmit may be based on topology, i.e. whether one or both of the devices are on different RATs or whether one is on an underlay vs overlay. Network topologies may change dynamically.

Network topologies may include coordinated transmission topologies or joint transmission topologies. Transmissions/receptions may be made simultaneously by a plurality of APs, a plurality of STAs, a plurality of UEs, a plurality of gNBs or base stations or the like. Some APs of the set may be configured to operate on a 320 mhz bandwith while other APs may be configured to operate on a 160 mhz band. Channels may be aggregated to reach these bandwidths. Transmissions may be coordinated by sending NDPs by an AP or STA to another BSS and receiving sounding responses. If a response is positive, i.e. above a threshold, the AP or STA who sent the NDP may not send transmissions in that direction (using the same beam) in future transmissions to the BSS of which the AP or STA is a member. This information, including the location, selected beam, transmission time and feedback quantity/type/results may be shared among APs and among STAs. A responder of the NDP may broadcast the feedback to multiple BSSs when the NDP indicates to do so.

Network topologies may include sidelink (UE-to-UE), multipoint (for example, Single Cell Point To Multiploint (SC-PTM), broadcast mesh or the like. For example, base stations or access points may work together as a mesh, for example, for load balancing. Whether a device may transmit in a NOMA method may involve determination of the device type or topology. Any one of the devices disclosed herein may have a different availability to transmit, not transmit or transmit 0 simultaneously. In one example, a UE may perform decode and forward instead of or in addition to simultaneous reception (or transmission). In an embodiment, interference measurement resource (IMR) signaling may or may not be transmitted or received. The UE may determine whether to invoke IMR signaling or not. Alternatively, a network node may perform the determination.

Information which may be provided from a node, for example a, donor eNB to one or more relay nodes and ultimately to a UE may be multiplexed via time, frequency or beam. Using time synchronization, a RN may receive synchronization information from a donor eNB and then immediately thereafter retransmit the information. An RN or gNB may employ time synchronization circuitry which synchronizes time among devices. Devices may be of multiples RATs, for example cellular, 802.11, or the like. Using frequency, the information may even overlap in time if the information is not changing rapidly. Synchronization signal blocks (SSBs) may be multiplexed by a relay node within a transmission time interval such as a frame or even smaller interval like a subframe. UEs may aggregate SSBs from relays and gNBs to determine position. SSBs may be located a plurality of symbols of a subframe. For example, SSBs may occupy portions of two slots, for example, first portions (i.e. including a first symbol), middle portions, not including a first/last symbol of a slot, or end portions (i.e. Including at least a last symbol in each slot. SSBs may change as needed or to avoid conflict.

In an embodiment, time multiplexing may consider cell ID, hop order, or number of relay nodes between a UE and donor eNB. Relay nodes may be half or full duplex. UEs may also be half duplex or full duplex. In the event that a relay node transmits sync signals of one or more another nodes and itself, it may be possible for fixed nodes to convey a node identification (ID) based on the time synchronization between the two sync transmitted signals.

Time synchronization may be employed in a relay or other device which converts a TSN to a network which uses an SPS configuration. For example, a UE may determine how an Ethernet TSN periodicity differs from an SPS configuration and may report a time delta or offset such that the TSN or SPS may be reconfigured accordingly.

One or more vehicle batteries or battery cells may employ charge rate optimization. In one of more vehicle modes, vehicle batteries may be charged at a very fast rate (VFR) or at a rate slower than the VFR. An operational state may be determined based upon a distance traveled or a time period of which the vehicle is needed to travel. For example, if a long distance is to be traveled soon, then the charge should be made at the VFR. In some examples, it may be cheaper to charge at a lower power or speed and thus the VFR is not actually necessary.

In some instances, a battery charger or battery charging stations may not actually employ meters. Instead, the battery charger may simply rely upon a meter placed inside the vehicle, thus allowing the battery charging system to lower cost. In one embodiment, the vehicle (or a UE inside the vehicle) may be required to report a usage (for example pattern based), cost or charge quantity for billing purposes. The same may be true for handheld devices. With respect to charging, UE may employ a Cell broadcast DRX mode to improve the battery life. When charging, the UE may or may not employ DRX mode. In some embodiments, the UE may employ multiple simultaneous DRX processes. UEs may be one way wireless charging capable or two way wireless charging capable.

Different vehicle meters may be used depending on location or reported location temperature. For example, if a UE capability report indicates a location in the state of Alaska, which happens to be below freezing, it may be possible for a battery to charge at a higher rate than if the vehicle was in Florida, e.g. where it might be simultaneously above 100 degrees F. A meter and capability report may be used by an application server to instruct a charge rate. Location and temperature may be determined from a network identity and/or timezone information element or the like. In another battery capability example, a UE may report a capability of supporting a NOMA transmission based on the current battery charge. For example, if the UE has good channel gain, and poor battery life, the UE may still support NOMA. However, if the UE has poor channel gain and also has poor battery life, the UE may opt to not support NOMA and may instead fall back to a legacy type transmission.

Vehicles are fast moving devices which may perform handover quite frequently. As such, vehicle and UEs located in vehicles may need to be beamformed or at least report channel state conditions. A UE may measure a channel state information reference signal (CSI-RS), and SRS or a DMRS of a serving base station and/or a neighboring base station. The frequency of these measurements may be less for stationary or low speed UEs. The UE may respond with an RSRP, RSRQ and RS-SINR based measurement result. The response may be preceded with an indicator as to the type of measurement result response as well as a response quantity indicator. A UE may also rely on NZP CSI-RS. Measurements may be inter-frequency or Intra-frequency. Measurements may be taken during measurement gaps or gapless measurements may be made. Sometimes a UE may need to measure transmissions of neighbor cells and current/future serving cells so that applicability of a handoff may be determined. During carrier aggregation (intra band or inter-band) a single component carrier may be measured or multiple component carriers may be measured. Measurement results may indicate QoS measurements and/or actual network radio based measurements, CQI and the like. These measurements may be correlated and reported together. QoS reports may provide feedback for streaming services, for example, streaming based gaming, or lower priority data traffic. Streaming services include services which employ QUIC stream frames. Streams may be unidirectional or bidirectional and may be symmetrical or asymmetrical in data rate, size, QoS etc and may be set up, configured and/or cancelled based on measurements. A base station may transmit packets of streams based on the size, periodicity, and arrival time of the packets at the base station. A UE may report results of the radio based measurements to a base station of a same or differing technology with which it took the measurements from. Measurements and measurement reports may be based on quality of a frequency, quality of a time or quality of a beam or beams. The UE may be configured to report periodic measurement reports based on the type of base station, type of technology used, amount of frequency used or based on a beam or beams. Reporting may be group based and in this case, a signal may be broadcasted or multicasted. The report may be sent on a set of preferred beams.

Traditional gaming applications provide game commands to a game server. The game server may generate game worlds, levels, etc based on the commands. For streaming type gaming, video feeds may be provided directly to clients. The video feeds may be real time feeds comprising other game characters which are controlled by other live players also having video capable clients. There may be additional data which should be sent from the application server (or peer-to-peer) to a client which is non video data. For example, data may be location data, measurement data, feedback (for example tactile feedback). Feedback may also include information on other display formats or display angles which are capable of being generated by the game server and displayed on the client. When a game server provides a measurement object to the client, the client may perform the measurements indicated by the measurement object(s).

Measurements and measurement objects may be assembled which have to do with other radio access technologies. In one embodiment, a measurement object may be a data structure referring to an 802.11x type access network. For example a measobject may be a: measobject11ay for an 11ay RAT; a measobject11ax for an 11ax RAT; a measobject11ba for an 11ba RAT; a measobject11az for an 11az RAT; a measobject11aq for an 11aq RAT; a measobject11ak for an 11ak RAT; a measobject11aj for an 11aj RAT; a measobject11ax for an 11ax RAT. This may further be defined in granularity (frequency, time etc.) options for each reported object. It may be beneficial to report measurements based on band, for example, for 11 ay specifically the high frequency bands, for example, 60 ghz bands.

Aggregated carriers may share power of the UE. For example, when transmitting two signals on two different carriers, a UE may be configured to not exceed a maximum power level. Some carrier may be licensed while others may be unlicensed carriers. A UE may perform RACH simultaneously with the different cells. If two PRACH signals are transmitted simultaneously, a max power may be exceeded. The same is true with other signals. The UE may be configured to split power based on a priority, a signal strength indicator, a distance to cell center, a QoS level of data being transmitted or the like. In one embodiment, a UE may be configured to limit power based on a capability (as defined by the capability ID). A UE may be configured to limit power based on a base station type or identifier. Two PRACH signals (or one PRACH and another uplink signal) transmitted by two different UEs may collide in time, frequency, beam, power or the like. In this case, the base station receiving the PRACH may perform interference cancellation to negate the unwanted uplink signal. Or the receiver may simply ignore the interfered portions in the time domain. Base stations may signal their capability to negotiate a PRACH configuration index. Neighbour base stations, which detect interference from each other, may signal a desire to separate PRACH configuration index or other spectrum/time portion or element so as to provide for fair service to UEs. These signals may be provided over backend/backhaul links such as Xn interfaces. The base stations may also negotiate an allowed PRACH preamble target received power. This target received power may be indicated to UEs from each of the base stations. In one embodiment, a base station may indicate an allowed PRACH preamble target received power for another base station. Base stations may also negotiate transmit directions of other base stations, for example, by indicating a direction, up, down, east, west, etc. In indicating transmission angles may be preferable. Two UEs which are in communication with a base station may support different PRACH configuration indexes. For example a SIB may indicate a limited PRACH configuration index to a first limited capability UE and a less limited PRACH configuration index (or no configuration index at all) to a higher capability UE. Essentially, the higher capability UE could transmit PRACH at any uplink instance. A PRACH configuration may apply to unlicensed spectrum. A PRACH procedure may be avoided in some instances, for example, if an estimate as to transmit power or transmit timing can be made based on position.

In an embodiment RACH may be unnecessary on handover when a UE maintains at least one network connection. For example, a network connection may be over WiFi, over a PCell, an Scell a SPcell, etc. On a condition that the UE is connected to the network, the UE may receive an RACH-less uplink grant on another network node. The UE may transmit at high power or with power ramping so as to transmit on the grant. At some point thereafter, feedback, including a TA may be provided to the UE. HARQ timing and other control parameters for the UL grant may be signalled on the network connection which is not handed over. In one embodiment, the UE may monitor the handed over cell to receive a TA and a resource grant. The control information may comprise frequency, time, beam or other control information. A new timer may also be configured for transmissions or retransmissions.

In one embodiment, a UE may measure beams transmitted by a TRP or panel prior to transmitting RACH. Some beams sent by the TWP may include reference signals for measurements while other beams include data transmissions to one or more other UEs. The measuring UE may determine a best beam, or a preferred beam, from the beams (or subset thereof) which are transmitted. The UE may maintain a list of beams or beam information as to which one of the beams have been successful and are likely to also be successful. The UE may transmit RACH on one or more beams simultaneously, or in time or frequency separated. The UE may maintain a number of failed attempts counter per beam for retransmission purposes. Retransmissions may have lower parameters, as compared to initial transmissions. For example, an MCS may be lower for a retransmission. Power may also be maintained and may be incremented per beam. Mobility state may be considered as well. For example a high mobility state UE may choose to delay RACH for a longer period of time as compared to a stationary UE. The information determined during the RACH procedure, for example the counters and beam information may be reported to the TRP, gNB etc.

Vehicles may be provided with information via base stations, other vehicles, satellites (e.g. GNSS based, GPS, etc). Vehicles may transmit information to other vehicles using a fully autonomous mode, e.g. one in which the transmitting vehicle selects the resources without being provided an indication from a base station. Other transmission schemes including semi-persistent schemes may be dictated by a base station or another device such as another vehicle, sign post, etc. Road side units like sign posts or street lamps (for example, multicolor LED lamps) may have working knowledge of a local congestion condition and may be useful in providing congestion information. UEs, signs, lamps, road side units, or the like may also provide location information to a UE. Signs, lamps and road side units may also be TRPs or incorporate elements of gNBs. In one example, a road side unit may pass a token to a UE which identifies the UEs location. The UE can then use this token to establish a location for receiving a location based service. In one embodiment, a UE attempting to determine location may rely on multiple transmitters to triangulate the position. This method may be secure in some embodiments. Base stations may be temporary or portable in nature. Base stations may be mounted on a movable device or on a tripod or pole. It may be that vehicles attempt to receive any incoming signal. However, there may be collisions. In the case of collisions, a UE may attempt to receive a packet from the strongest transmission point, or the UE may attempt to receive transmissions from weaker signals as well. It may be beneficial for a UE to have multiple antennas to alleviate the congestion. In addition, a UE may include a vehicle operating mode which is configured to receive multiple packets at once. The UE may have an interference mitigation processing unit interference suppression and cancellation may be used to perform the multiple packet detection (or even single packet detection). The interference mitigation processing unit may be configured to determine which one of 2 signals sent at a same time/frequency is a signal for reception by the UE. The UE may achieve this based on power. The UE should have at least 4-8 receive antenna ports for which power may be split equally or non-equally. The UE may scale transmit power based on the number of receive antenna ports. A UE may be configured with one or more LMMSE-IRC receivers. Interference cancellation may be hard or soft. Superposition coding may be performed with successive interference cancellation (SIC) and a message passing algorithm (MPA). A UE or base station may perform a demodulation weight computation If a NOMA transmission or reception collides with DMRS or another uplink control information signal such as an SRS or virtual SRS, the UE may drop the NOMA transmission or reception or alternatively drop the uplink control information, for example the DMRS or SRS. The dropping may be based on exceeding a maximum power or a period of time in which signals overlap/collide. The dropping may be based on an MCS or other parameter. However, the UE may determine whether to transmit (and may determine to transmit) at a maximum power in some embodiments. The signals may overlap in frequency, time, beam, layer etc. Dropping may or may not be applied to HARQ-ACK feedback, scheduling requests, channel state information, channel quality information, pre coding matrix indication, rank indication, layer indicator and beamforming or beam steering transmissions. Dropping may be based on a priority of the transmission and dropping may be based on whether an uplink (or downlink) signal was scheduled by a base station or alternatively is a periodic signal. Dropping may be performed when uplink control information cannot be multiplexed with a PUSCH transmission.

NOMA interference cancellation assistance signal may be received via DCI or via other means. The assistance signal may indicate an amplitude, power, layer or the like. Other types of reference signals or assistance signals may be indicated. Indicated parameters, which may be scaled, may include P0 and alpha. A base station or UE may determine whether to use NOMA for a user, set of users or at all based on a number of users, a QoS level of a user or group of users, a distance each UE is from the base station and/or a gain level delta between each of the UEs.

In an embodiment, a UE may receive a plurality of synchronization signals on a first carrier, for example, an anchor carrier of a gNB. The UE may then receive a MIB or or one or more SIBs on the anchor carrier which indicate to the UE that random access should be performed on another, for example non-anchor carrier. This may occur if the anchor carrier is busy or for any other reason. An anchor carrier and non-anchor carrier may be separated by an offset in frequency. The UE may receive information on a PDCCH which is scrambled with a RA-RNTI. The UE may receive a random access response (on PCell, SCell, SPCell, etc.) and may then transmit an RRC connection request or msg3. The connection request may include CSI or other channel quality information. The UE may then receive another signal on the PDCCH and may then may send an RRC connection setup message to the gNB. The UE may then indicate a buffer status and may receive a DCI including uplink resources. If the gNB has data for the UE, then the gNB may provide a DCI indicating downlink resources. The DCI formats may indicate resources for use on the non-anchor carrier. DCI formats may schedule cross slice transmissions or indicate a network slice to perform RACH on, thus the UE may be scheduled for a plurality of network slices. During one or more RACH procedures, transmission of a BSR or transmission of a scheduling request, the UE may report channel quality information of the anchor or non-anchor carrier. The UE may be configured to perform authentication with the anchor carrier, the non-anchor carrier or via a combination of both. For example, authentication may be based on receipt of PSS or SSS signals on the anchor carrier, while authentication is incorporated into any one or more of the messages transmitted or received on the non-anchor carrier. Authentication may be performed, by a UE, by authenticating any one or more of (or a combination of) the primary synchronization signal, secondary synchronization signal, SS block, PBCH, MIB, or one or more SIBs. During handover, a previous base station may authenticate the next base station prior to handover. A scheduling request may be differed based on authentication, measurement parameters, sensing of one or more channels, beams or the like. Scheduling requests may be aperiodic or periodic.

A UE may be configured to receive information on a relative signal strength as compared to a plurality of other users within range of a base station. For example, the BS may transmit in a SIB, MAC CE, DCI or RRC message an array or bitmap which indicates a user position in terms of signal strength. In one embodiment, a UE may combine messages received over two formats, for example RRC and SIB formats to obtain information. Stronger users may transmit at lower power and experience interference, while weaker users may transmit at a higher power with less interference. This bitmap may be supplied by the base station or determined via sidelink communication by the UEs.

Sidelink transmissions may be aided in part from DCI information provided by a gNB. The gNB may indicate resources for: automatic gain control (AGC), PSCCH, PSSCH, guards and a physical sidelink feedback channel (PSFCH). The PSFCH may be used for CSI feedback and beamforming feedback and may be compressed. The PSFCH may also be used to indicate UE capabilities for renegotiation of resources or to signal enhanced capabilities. Sidelink transmissions may include a S-PSS and S-SSS which may be distinguished from PSS and SSS of a gNB based on length, frequency, amplitude, phase, modulation type/format or the like. In one embodiment, a symbol length may be longer than that of the PSS. Amplitude may be lower, modulation type may be distinct, etc. A gNB may provide resources and other information for detecting an S-PSS and/or S-SSS.

Carrier aggregation in new radio may be more complicated than in LTE. In new radio, carriers may be activated, becoming activated or dormant. For each one of these states, CQI reporting may be treated differently. Timers may be utilized for measurement purposes. CQI may be reported based upon a threshold. For example, for any component carrier (active, IDLE or inactive), it may be beneficial to only use uplink resources for transmission of an indication of CQI for a preferred (or greater than threshold) carrier. In one embodiment, uplink resources may be determined autonomously by a UE. The determination may be in part by information receives via RRC signaling and in another part by measurement taking. Measurement periodicity may be provided in a sib, for example SIB5 and/or the UE may determine to alter the measurement periodicity autonomously. An R16 SIB5 may indicate additional information like priority, time, rat type etc. A type of measurement may also be indicated as well as information about one or more neighbor cells. This may be indicated for current cell and target cell. A SIB may indicate frequencies for measurement, for example, 3, 4 or 5 particular frequencies. Upon activation, a dormant cell may be considered active and may be deactivated subsequently at some point. An active cell may become dormant. Scell parameters may be provided by higher layer signaling, for example RRC signaling. Scells may be activated via MAC layer signaling, for example a MAC CE. In an embodiment, a UE may send a request to a gNB, to activate an Scell. The request may be based on or may indicate a QoS priority, a file size for upload/download. The request may specify a time period (time, number of symbols, offset etc) with which the UE would like the SCell activation to be provided. SCell activation may occur via DCI or MAC CE on a cell which is no the SCell. A MAC CE may also contain URLLC data in addition to the SCell activation or any other MAC CE command.

A MAC CE may also signal SCell beam recovery information, for example, resources for a recovery signal. SCells may be considered activated in time n+2, n+4, n+8, or n+12. Anything less than n+12 may be considered a fast activation. One goal of the present disclosure is to provide for reduced delay for cell access/transition/handover. Another aspect is to receive measurement instructions+indications from cells which are near other cells, for example small cells, gNBs, etc. For handover or other purposes, a UE may indicate a capability to handover, wherein the capability is based on or indicates support for any one of the technologies or devices as disclosed herein. Cells may be quasi collocated or may be separate in location. The gNB may determine, from an SCell beam recovery transmission, a carrier or carrier indicator of the SCell. It may be done implicitly or implicitly.

Carrier aggregation may be intraband or interband. Carriers may be aggregated in licensed, unlicensed or a combination of spectrum in either uplink downlink or both. Carrier aggregation formats including, a format denoted as: CA_1C, CA_1D, CA_1E, CA_1F, CA_1G, CA_1H, CA_1I, etc may indicate any one or more of these combinations. When configured to operate in any one of these formats, the UE may additionally be configured to function in accordance with a particular modulation scheme, a particular power level or using any one of the parameters or information formats disclosed herein. Each one of these carrier aggregation formats may be specified in a DCI, MAC_CE or other message format. Each one may represent or indicate one or more bandwidth or bandwidth parts or sets, For cell access or random access, a UE may be configured with a random access occasion mask index. This mask index may dictate allowed RACH occasions. RACH occasions may be indicated via DCI of another carrier.

Figure 5:
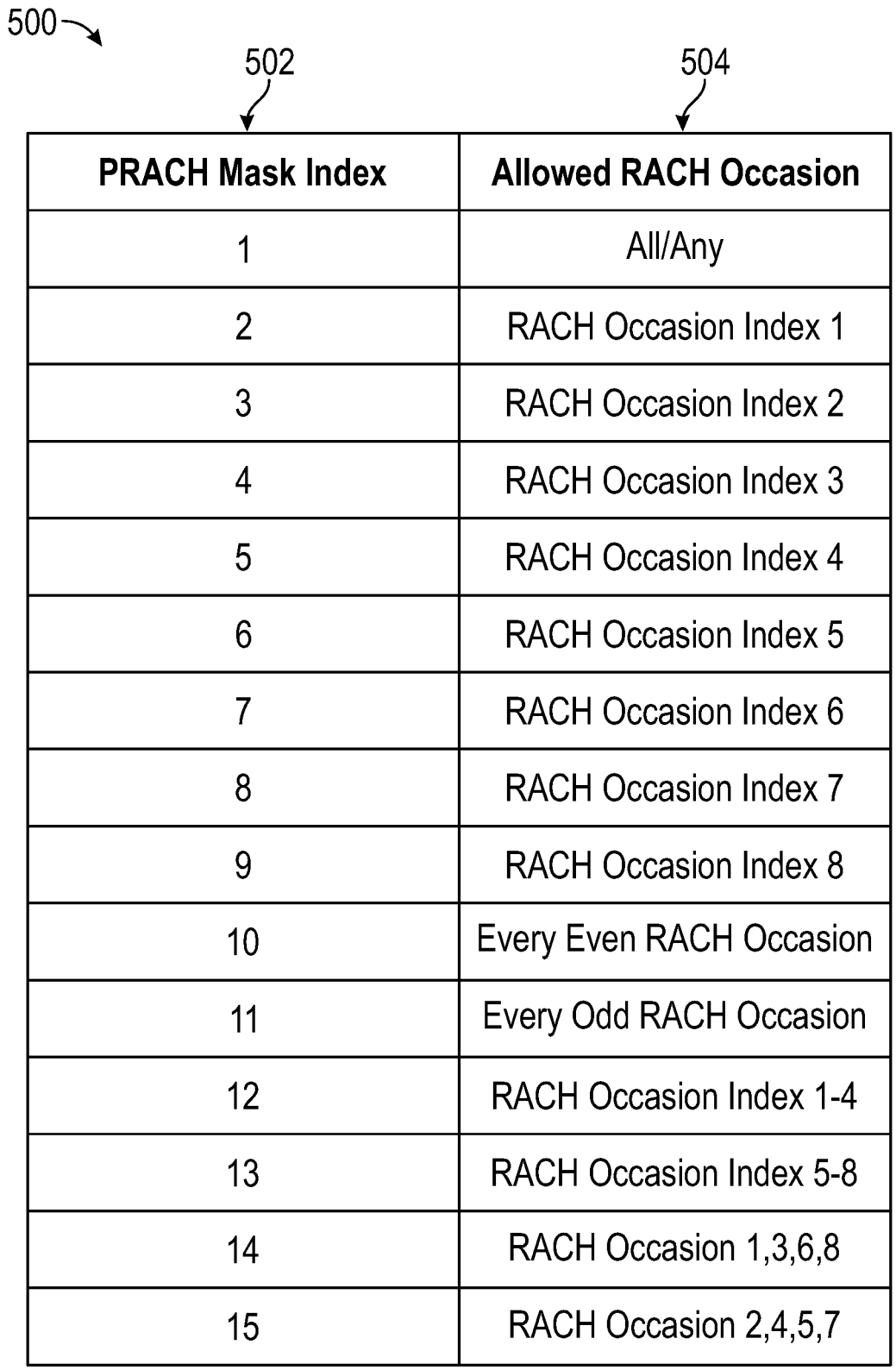
FIG. 5 is a random access channel (RACH) occasion table.

FIG. 5 is a RACH occasion table 500. A mask index 502 may indicate a corresponding allowed rach occasion format 504. In particular, the mask index 502 may relate to a unique RACH occasion of a plurality of potential RACH occasions; the mask index 502 may relate to an even or odd RACH occasion; the mask index may relate to a first half, for example RACH occasion index 1-4; a second half, for example a RACH occasion index 5-8; or alternatively, a combination of RACH occasion indexes which is other than even/odd or uniquely specified. A UE may be capable of power ramping during random access. Additionally, a UE may be capable of beam cycling for each power level. TRPs may also be capable of beam cycling using transmit or receive beams. For example, when receiving transmissions or retransmissions, beam cycling may be employed.

RACH procedures may occur over one, two or more steps. The UE may transmit a preamble (for example, using an index selected randomly between 0 and 63), before a RACH transmission or data transmission. In one embodiment, a UE may send a payload with a preamble, for example, a single bit payload may be provided. The payload may include a request for one of a plurality of system information blocks. Alternatively, the payload may indicate a plurality of system information blocks or information elements requested by the UE.

Including a payload with an initial transmission may be done in licensed or unlicensed frequency bands. Feedback may then be provided by the base station. The UE may then send a second preamble with a payload. The preamble may be sent with a multiple access signature using any one or more of the multiple access schemes disclosed herein. The MA scheme may have random number input, i.e. a random number may be identified as an input to a pool of resources. A first random access preamble may be transmitted on a licensed or unlicensed bandwidth, then the second random access preamble may be transmitted on an opposite one. After initial RACH, RRC signaling may occur, for example connection setup messages may be exchanged, i.e. received by the UE and confirmed via acknowledgement. Connection setup messages may be authenticated and/or integrity protected. For example, any one or more of the parameters disclosed herein may be included in the connection setup messages, and each one may be protected, encrypted. A two step RACH procedure may include: transmitting a msgA with a preamble in a same or different slot with time domain multiplexed payload, wherein the msgA include transmission parameters, for example, MCS, power, resources of other uplink control information in the payload portion; receiving in a msgB, a set of resources to monitor; and monitoring the PDCCH (for example, monitoring 1, 2 or 3 consecutive symbols) for a DCI. In on embodiment, parameters of the data portion may be indicated by the selected preamble or resource for transmission. In this way, a gap may be needed for the gNB to decode the data portion. The data portion may be scrambled with the random access RNTI. The time payload of msgA may comprise the UE capability ID, a UE identifier, UCI or any other information herein. msgB may also include a payload, timing advance and/or UE ID used for signaling DCI or for other purposes. msgB may have a unicast and multicast or broadcast portion. The preamble selected by the UE may have preassociated resources for the data transmission. Some preambles may indicate contiguous resources while others indicate noncontiguous resources. The preamble selected may also indicate MCS, number of resources for data transmission or any other parameters disclosed herein. The DCI may indicate PDSCH resources which provide a MAC CE or other data. A fallback to 4-step RACH may also be performed. The RAR window time may be an offset considering: a first symbol of MsgA, the last symbol of MsgA including data, the last symbol of the preamble, the first symbol of data. The UE may transmit a midamble, for example, in between data transmissions of one or more frames or PPDUs. The midambles may comprise one or more signal (SIG) fields, legacy training fields (LTF) fields or new training fields. Midables may be placed within differently modulated or coded segments, which may also have different power levels, of a PDU. Midambles may provide NOMA interference cancellation parameters or any other data or parameter as disclosed herein. A RAR window may be extended beyond 80 slots and may extend upwards of 10 ms or more if the RAR is configured to occur in an unlicensed band. The RA-RNTI may be computed based on any parameter disclosed herein. Training fields may be secured by a key.

Two or more RACH preambles may be transmitted simultaneously on different frequency resources. One of the resource may be an unlicensed band, while another band is a license band. Alternatively, both may be licensed or both may be unlicensed. More than two may be considered as well. In one example, two transmission on unlicensed bands may include two transmissions on one or more of frequencies including: 6.765 MHz to 6.795 MHz; 13.553 MHz to 13.567 MHz; 26.957 MHz to 27.283 MHz; 40.66 MHz to 40.7 MHz; 433.05 MHz to 434.79 MHz; 902 MHz to 928 MHz; 2.4 GHz to 2.5 GHz; 5.725 GHz to 5.875 GHz; 24 GHz to 24.25 GHz; 61 GHz to 61.5 GHz; 122 GHz to 123 GHz; 244 GHz to 246 GHz. Neighbor reports or maps including locations of PLMNs for each one of these frequencies may be provided by a base station.

Neighbor reports may include channel information of other STAs, APs, gNBs or the like. The neighbor report may include beam/frequency information and periodicity of transmitted broadcast data, for example, beacons or other data. Neighbor reports may include header information, operating class information, channel number(s) and information about the target beacon transmission time of each of the neighboring beacons transmitted by neighbors. For example, TBTT information may indicate whether APs are of a same set, primary channel information, whether or not one or more APs are collocated. Information may be transmitted as part of a BSSID bitmap including BSSID index values and/or whether or not a plurality of short SSIDs are included in the information. The UE/STA may be provided with a wake up signal in order to receive the neighbor information. For example, any one of the neighbors in the group may wake up the STA and provide an indication of when the neighbor report will be broadcasted. The neighbor report may be provided as part of a wake up signal transmission.

Uplink transmissions may be grant based, i.e. received explicitly from a base station or grant free. Grant based transmissions require more overhead, while grant free transmissions complicate and potentially obliterate transmissions of other UEs. A UE may also be capable of grant free receptions. In one embodiment, a capability for supporting grant free transmissions and/or receptions may be provided to the base station. Support for grant free transmissions may be based on whether or not the UE is capable of transmitting in an idle mode as opposed to connected mode. In an idle mode or inactive mode, a UE may support a capability to directly transmit data without performing RACH. The capability may be based on a RAT. In idle, inactive or other modes, UEs may perform beam and cell quality measurement from one or more gNBs. The UE may determine to access a best quality gNB.

In a RACH procedure, the UE may consider determining whether a received timing advance is valid. The UE may do this by receiving synchronization signals and attempting to determine a relative timing advance from sync. In one embodiment, the UE may apply different timing advances for different uplink transmissions, for example transmissions on the PUCCH, PUSCH, RACH, sidelink channels or the like. For example, for RACH, the UE may have no timing advance information and may transmit the RACH successively with different timing advance values chosen. The UE may use a gap or guard period to adjust accordingly. The gap or guard period may be indicated to the UE, for example, number of symbols between uplink and downlink, or between two downlink or two uplink signals, etc. Block interlacing may be applicable to any one of the uplink transmissions, for example the PUCCH, PUSCH, RACH, sidelink channels or the like. This way a plurality of short transmissions may take place over a single lengthy transmission. The embodiments disclosed herein with respect to dropping may still apply to interlaced transmissions. As well as gap or guard time periods, gaps in frequency may be employed, in some scenarios.

A UE may be provided with RACH resources, for example, time/frequency/beam resources for a RACH transmission in a DCI format 6_0, DCI format 6_1, DCI format 6_2 or 6_3, in one embodiment. Alternatively, or in combination, any DCI herein may signify the RACH resources used by the UE. For example, a UE may supply a pool of resources, or at least a plurality of resources and the UE may perform LBT and/or random selection of the resources. The UE may reserve resources of the pool following LBT and/or resource selection.

When a UE enters an idle mode, the UE may receive a configuration for grant free transmissions. This configuration may be received over RRC or other signaling along with any of the parameters disclosed herein. Another consideration of grant free transmission may be a sense before transmit operation. The UE may sense a channel for occupancy. The UE may be configured with or scheduled with a channel occupancy time (COT) or times (COTs). Each one of the COTs may be used to UL or DL traffic and HARQ feedback. The HARQ feedback may be of transmissions in earlier COTs. The UE may be configured with a backoff timer such that upon sensing the channel busy, the UE may wait a backoff time before proceeding. The backoff time may correlate to a type of data transmission, a level of importance and/or a UE capability/type. NOMA or other grant fee transmissions may precede grant based transmissions.

In some instances, such as high channel occupancy instances, traditional carrier sense multiple access may or may not be enough to ensure fairness of a channel. Instead, a coordinated method may need to be employed where a transmitter (non-AP STA or AP STA) becomes a transmission coordinator for congestion control/mitigation. In other embodiments, a controlled access phase may be used instead of CSMA. In some embodiments, longer backoff times may be necessary for each STA in order to maintain a channel. In an embodiment, a carrier may be accessed when no transmission is heard in a certain direction. If, for example, a transmitter transmits in a direction for a given time period and then backs off for a set period, another receiving station may recognize when the backoff period will occur and thus can be aware of a transmission opportunity. This can be direction oriented, i.e. a number of transmission in a certain direction may give way to an opportunity. Alternatively, a coordination mechanism, provided by a gNB other device (road side unit, etc), may act as a coordinator. Transmissions may be scheduled via SIB or other means.

In an embodiment, a SIB, such as a SIB5 may carry timers for measurements made by a UE. The timers may include a validity timer for use by a UE in an IDLE mode (or in any other mode). Other timers may be used for dormant state UEs. Timers may be applicable based on an area of which the UE is in. For example, timers and other SIB information may be applicable to certain UEs of a cell, while not other UEs of the same cell. Some SIBs may or may not be transmitted by a cell.

Carrier aggregation may result in a power issue. For example, if a UE were to aggregate a number of component carriers, a transmission on these component carriers might be considered to exceed a maximum power IE of the UE. A UE may receive an aggregation request, and may respond in accordance with applicable power requirements, power needs, power headroom (NR alone, LTE alone or LTE+NR) or the like. It may be possible to instead of simultaneously transmit, to alternate transmissions on component carriers, thus avoiding the maximum transmission problem. In one embodiment, a UE may determine which one of the one or more component carriers would require more transmission power. The UE may alternate transmissions such that for time period A, transmissions occur on the low power carrier. Then, for transmission time period B, transmissions occur on both carriers. Then, for time period C, transmissions only occur on the high power carrier. The periods A, B and C may be determined based on higher layer signaling or based on UE capabilities. Carrier bands may overlap or may be comprised of different frequencies altogether. Transmit power may be set based on frequency of a radio access technology or frequencies of varying radio access technology. Any RAT as disclosed herein may have a configured TX power max.

Transmission power may vary from RAT to RAT and from transmission type to transmission type. For example, a higher priority transmission may transmit at power (1+x)* (low priority transmission). Power levels may be indicated by DCI or other methods. In an embodiment, repetitions may increase in power again in accordance with their priority over other transmissions and each repetition may or may not have a unique DMRS.

Dormant cells may be measured and reported during DRX cycles of the UE. In this way, a UE may remain in a low power state until required to report CQI. CQI (or other quality reports) for dormant cells may be reported in a new MAC layer uplink format transmission. Other legacy MAC layer formats may still relate to other state transitions. DCI may indicate transition of a dormant CELL, for example, an SCELL, from a dormant state to another state. A DCI may further indicate a BWP switch and/or may provide information regarding other any parameters disclosed herein for the SCELL.

In an uplink direction, a UE may have a buffer configured for different types of qualities of traffic. If a UE is currently actively transmitting (e.g. the UE has an allocation of dedicated resource), and a data of a buffer which is a higher quality than the data which is currently being transmitted is reached, a UE may transmit another BSR using the previous resources. This may be done in a semi persistent fashion and a base station may simply process the BSR and allocate more resources to the UE. The base station may not have to change any parameters other than the SPS allocation parameters and notify the UE of same. The changed parameters may be provided in a DCI or some other signaling format, for example, MAC signaling. A shortened DCI format (as compared to the previous DCI of a same scheduling type, or another DCI format) may be beneficial if the UE need not change static parameters. A DCI may provide an indication of multiple transport blocks, for example, 1, 2, 3 or 4 TBs, for use by a UE for uplink transmission or downlink reception. An SPS allocation or release may be signaled via DCI and may incorporate multiple SPS configurations, each having an associated priority or traffic type. Priority and/or traffic type may be interchangeable on each SPS configuration when ample resources are available or when no corresponding priority data is available for the relevant SPS configuration. Multiple SPS configurations may be relevant/active in a single BWP.

A UE may be in simultaneous communication with an LTE cell and an NR cell (and/or any other cell for that matter such as Wi-Fi, Bluetooth etc.). In any event, a UE may be referred to as in dual connectivity, multi connectivity or may simply be said to have a supplementary uplink (or downlink) connection. The supplementary connection may require reports transmitted to the main (or supplementary) cell. In one embodiment, intra-frequency measurements may be gapless, while inter frequency measurements may be gapped (e.g. the UE is supplied with a gap time). The gap time may be a period of time measured in ms 0.25x wherein x is an integer between 6 and 24.

Dual (or other) mode UEs may be connected to both a core network of a cellular system, the core network operating on a sliced network approach, e.g. using network slicing. Base stations of the sliced network may supply information and data to the UE via a quality of service which is priority based. A priority may be indicated based upon a channel, a traffic type or may be flow based. Dual mode UEs may be connected to both a 5G core network and a legacy evolved packet core of a 4G based system. Dual modes may be dual cellular, e.g. dual licensed connections or cellular/wlan combinations. Carriers may be aggregated between the both technologies. It may be beneficial to provide an indication of a network slice used by the UE to the UE. This may occur via RRC, MAC or other signaling methods.

Cellular systems may include time division duplex (TDD) and frequency division duplex (FDD). In FDD systems, a UE may be both transmitting data and receiving data at the same time using different frequencies. Next generation systems may be more flexible in nature, thus allowing UEs to and cellular networks to determine duplexing schemes in a dynamic fashion. In this way, an optimum duplexing configuration may depend on traffic volume and quality of one or more links between the UE and the base station. UEs may operate in half duplex or full duplex mode in accordance with a traffic type, data priority, power level or the like. A mode may change, for example, for watching a movie, a UE may need substantial downlink resources with minimal uplink resources. Thus, a TDD mode may be employed. Of the UE switches to a two way video application, a 1:1 uplink/downlink allocation may be employed, and the network may instruct the UE to enter a FDD mode. A UE may be provided with a half-duplex pattern similar to a DRX pattern. The UE may switch to TDD from FDD and vise versa according to the pattern. The UE may provide feedback as to buffer status, etc. which may indicate whether the pattern needs to be adjusted. The pattern may also be adjusted based on signal-to-noise ratio and/or how much interference is occurring etc. For example, an interference level may be measured on a subband and if that interference is high, while the need for the subband is low, the UE may autonomously switch to abandon the subband. A switch to FDD may be determined based on a new multiplexing need, for example, additional data becomes available for transmission.

In medical applications a meter may be carried or place inside a body of a user. For example, a UE may be a blood glucose meter, insulin pump or simply or a cell phone. In this application, integrity of both the data and control information transmitted to/from the UE is critical. A medical device UE may first perform a secure boot procedure prior to enabling communication with a base station or other wireless device. This is to ensure the UE is in fact executing software which as not been tampered with. The UE may also perform an encryption checking process, a pairing or association process, and a verification of the operator. Operator verification may be established through visual confirmation (face recognition), voice commands, input via a keyboard, or even operator movement (for example, head or hand movement) and motions, for example, a game controller or other physical hand held controller may be avoided. Eye gaze or depth/zoom of an operator may be mapped distinctly from motion in some embodiments. Once an operator is authorized, the operator may be able to access a digital identification card or other payment access cards.

Operator verification may be performed via his/her eyes, in combination with checking the software hashes, one or more MAC addresses etc. In one embodiment, a UE may perform association based on a burned in address, for example, a MAC address for one device in combination with burned in addresses of other devices (Bluetooth chip, WiFi chip, etc.) In one embodiment, instead of providing a full MAC (or other burned in address) a device may provide a random portion to save space and/or avoid being tracked. Random portions may be used, or randomly generated MAC addresses may also be used. A STA or AP may perform a lookup on a random portion or random MAC Address to bind the MAC address to an IP address. In another embodiment, the STA or AP may simply store a table with MAC/IP pairs. This information may be shared in an ad-hoc fashion or may be transmitted to another STA wirelessly. Any device address disclosed herein may be provided via a low layer control format, for example, a DCI or another control information format.

Association may be performed via public key or shared key procedures. The medical device or meter may communicate with the AS or SCS via HTTP using secure association procedures. In one embodiment, a UE may be configured with a capability to report an attestation level. This level may of course be a hardware or software security level but it also may relate to a UE needing to attest to be who he says he is. In one embodiment, a UE may report a capability of attesting according to a protocol, a technology, an implementation or a particular service provider or company. In this way, it may be possible for the UE to convey to another party that the UE is not a hacker (caffishing or other hack), prank caller or telemarketer. Operator or phone number verification may be important such that calling parties or called networks may screen based on the verification. A secure bootstrap procedure may apply with respect to operator or phone number verification. In this way, a called party (or messaged party) may be able to determine that the calling party has a phone which operates as it should, i.e. has not been tampered with, hacked, spoofed, etc. The calling network may also be verified as well as the called network. A UE or STA may still be capable of receiving data frames, broadcast/multicast frames or the like from a base station regardless of being associated with that base station.

A UE may be relinquished to a support secured signaling only connection. This type of connection may be forced if the UE failed an integrity check. Alternatively, if the UE did pass an integrity check, the secured signaling only connection may be required due to the type of device. UEs may report pass at each stage of integrity checking. All hardware/software may be integrity checks, including OS, virtual machines and even remote software. At one or more stages, the UE may discover a key used for decryption of a message received over the air. A UE may be relegated to a restricted portion of the network, for example, a restricted slice. In the restricted slice, for example, certain DCI formats may or may not be available or applicable. In some embodiments, DCI formats may only be available when a secured signaling or secured association exists.

In one example, consider the medical device example where a security breach may cause death, dismemberment, etc. A secured signaling connection may be secure based on a key derived from parameters of the wireless connection of course depending on the security algorithm implemented. It may be true that a UE has a single key per bearer, or has multiple keys per bearer. Keys may be expressed as integers, characters, strings, doubles, floats and/or the like. Keys may be provided in a random access response or connection setup message. It may be true that a key used for a gNB or other transmission reception point may be reused for another TRP (for example, of another cell). This key or keys may be used to encrypt or at least sign handover messages from one eNB to a UE. The key may be signaled via a wired communication from last eNB to next eNB. In one embodiment, if a UE does pass an integrity check procedure, the UE may access information stored on a SIM, for example a USIM or ISIM. There may be short term and long term keys stored on the SIM, among other applications and keys related to those applications. Keys may be updated when required, in one embodiment, via communication messages received by a gNB or other device. Security may be employed using 128 bit, 256 or 512 bit security.

Hereinafter, the terms communication or carrier aggregation may relate to communication with a single gNB, evolved Node B, single transmission reception point or a multitude or combination of such. For example, a base station may refer to a single station with a plurality of antennas. A base station may be deployed at a base station site such as a tower or building. A site may refer to a single antenna of a single side of a building or all antennas placed in multiple directions on a roof or all sides of a building. In one embodiment, an antenna or panel may be integrated into a building and/or may form a portion of the facade or exterior of the building. Structural components may incorporate antennas.

There may be multiple categories for next generation radio receivers. Standards call for 5G_MBB; 5G_MTC; and 5G_uRLLC categories. In one embodiment, a UE may employ circuitry which is built to implement all three of these categories. However, the chips may be sold at different cost points or to different manufacturers. In one embodiment, an IC such as a baseband chipset may be configured with electronic fuses for effectively 'burning in' a given configuration. In this way, a fuse may be set such that only a certain configuration may be implemented for a given UE. Medical device technology may operate on a similar principle. For example, chips and UEs which are designed to operate at a certain level, for example, a life saving device, the life saving device may burn out other operating modes of a chipset. This may limit hacking/tampering and improve security. The term mBB or eMBB may refer to multimedia broadcast and may also have applicability to even higher data rate applications like 3 dimensional video, virtual reality or online or wireless games/gaming. MTC refers to machine type communication. 5G_uRLLC may refer to low latency communication. Virtual reality systems may be employed for online learning and virtual reality classrooms. In a classroom or other room, UEs may be clock synchronized to receive or process video simultaneously. Video processing may occur on network elements or on components of a UE. In one embodiment, video may be 360 degree video which is processed on both the network and UE. Processing of 360 degree video may involve encoding a portion of the video at different coding rates, for example, a portion which the user is currently viewing (or currently interested in) may be encoded at a higher rate than other less important portions. In on embodiment, the currently viewed video may be configured with a guaranteed minimum bitrate. In one embodiment, 360 degree video may be received via two or more different base stations. The multiple base stations may provide video in two different formats capable of being interleaved or displayed simultaneously on a display of the UE. Video may be coded differently over each link. The UE may be configured with an accelerometer to traverse the 360 degree video. Video may be received for medical/surgical systems.

In an embodiment, a UE may be configured to receive tiled video segments. Highly important tiles, i.e. ones in the user's direct viewpoint, may be received over a lowest latency link, BWP, channel or the like. Lower value tiles may be received over another link which may have a higher latency. The same may be true for simultaneous video based cloud point reception and graphical based cloud point reception. The video segments may be received over the higher quality or lowest latency link.

In some embodiment, parameters regarding 360 degree video may be reported by a UE. These parameters may include a type or number of fisheye lenses, fisheye lens parameters, a number of supported video bitstreams, supported file formats, supported picture height/width, supported bitrate(s), supported video profile(s), stitching and rendering capabilities, whether or not sideband text is renderable by the UE.

Some 360 degree video players may be capable of supporting video games. Some video games may not be integrity verified by a console. Instead, the game may perform an integrity verification and may perform authentication of the player. In one embodiment, a game may be configured to run on a mobile operator platform, for example a mobile edge configured game. The game may authenticate it's users and their consoles/devices. The user commands may be provided to the game and rendering may occur server side, as a combination of server/client or on client side. The game may be configured to drop or slow transmissions of game players which may be considered cheating. Cheating may refer to outright cheating, for example, a player has maliciously modified the game code or user interface to act or behave in a certain way. Cheating may also refer to "cheezing" or using a glitch in a game to affect performance. Glitches may be fixed by no longer accepting data packets at a particular rate which would allow the cheezing to occur.

One or more mobile edge games may be configurable in terms of network parameters at various levels in the network stack. For example, buffering may be changes; a queuing type may be altered and/or a packet size or type may be altered. A UE or mobile edge server may determine whether to update or reconfigure these parameters, such as MCS, LDPC vs. polar coding, number of TX or RX antennas, or the like, based on video, audio or game control jitter (as a change in latency); wander; round trip time, packet loss rate, network congestion (for example traffic channel congestion) or the like. If the mobile edge server is no better at solving these issues, the mobile edge server may forward the UE to another server which may or may not be mobile edge. This may occur, in one embodiment, if the mobile edge server receives too many requests. If it does, the network may instantiate another edge server and respond with a new server address. Users who are already on the edge server may receive sip refer methods to the new server. Alternatively, other methods may be employed.

In an embodiment, cameras may be provided at various locations in venues. These cameras may be synchronized via wireless signals or may be totally independent. For example, cameras may be placed in player's helmets, in dugouts, in umpires helmets, hats etc. A user watching the video at home may elect to switch between each one of these cameras. A UE may be programmed to select, for a user, which views the user would like to commonly see. Then the UE may display those views to the user simultaneously or sequentially. Users may group events together, for example, video of a player running to a base and video of the tagger or ball catcher. Each one of the cameras may transmit video for selection, by a user, at the users UE. The video may be provided to a mobile edge server and then to a UE on receiving feedback or selection criteria. A baseball or other sporting event or game may be shortened, for example, by displaying segments related to a user's choices of camera views. For example, only displaying video of the pitcher at a last pitch (hit, strikeout, etc). Or only displaying video corresponding to a player for each run or hit. The same may be true for other sports, basketball, hockey etc. Camera views may be selected by a watch or other device worn by the user. The watch may be configured as a UE or be configured in operation with a UE, for example a phone or pad. Capability ID may indicate whether or not an auxiliary device, for example the watch, is coupled to the UE. The capability ID may also indicate whether a stylus vs. finger is used for control.

In an embodiment, a mobile edge server may serve as a video file cache. However, instead of storing an entire video file, the mobile edge server may store only a first portion of the file, for example, a first 10 seconds. This may reduce initial latency and allow for a UE to receive the remaining video file segments from their source location or another location further from the mobile edge server. The video may be an omnidirectional video. A given part may be stored on the mobile edge server, while other parts are stored elsewhere. Alternatively, all parts may be stored on the mobile edge server.

UDP data packets are often dropped after they become stale and/or after a congestion threshold is reached, for example, determined in accordance with a channel busy ration, dropped packet ratio or the like. For example, the incoming data packets (or packets being generated by higher layers) outnumber the outgoing or transmitted data packets. Consider the scenario wherein a voice call is made and a UDP data packet transmission fails or becomes stale. The live aspect of the call means that transmission or retransmission of the packet is useless as the conversation has already moved beyond the point of correction. The same is true in other live video or live gaming aspects. The point of which a packet should not be retransmitted may be adjusted accordingly. For example, if a maximum packet delay is set at 180 ms for normal uplink transmissions, then for sidelink/v2x transmissions, the packet delay may be adjusted upwards since no buffering or intermediary is required. In the 180 ms example, packet delay for sidelink/v2x may be adjusted to 360 ms or less. In the event that WLAN is used for a transmission, delay may be between 180 and 360 ms. This is because users may be more closely located and transmissions may be received quicker. Thus, the UE may determine based on a transmission context a packet drop timing. This timing may be adjusted based on feedback from the receiver, network or the like. The same scenario and solution may apply for TCP transmissions. Average packet delay may also be considered, for example, an average uplink delay, average downlink delay and average sidelink delay measurement may be performed and reported. For sidelink/v2x transmission to another gaming user (or video, voice etc), average packet delay may be adjusted to greater than or equal to 60 ms. Dropping via sidelink/v2x may not be as hard and fast of a rule as compared to normal transmission. Sidelink/v2x transmissions may be relaxed with respect to average packet delay for either in coverage or out of coverage UEs. Delay setting may be based on QoS values, thresholds or any other parameters herein. Delay information may be included in a packet for transmission, for example, in a packet header. For example, a delay budget may be signaled. Packet delay may be calculated by one or more of: a time with which the packet is buffered, transmission or processing delay.

Video may be rate adapted to support a given link throughput. In one instance video transmissions may be that of video for a surgical system, for example a remote surgery system conducted by a remote surgeon. The video may be video of a human body or of an internal section.

Video transmissions may be sent via a multimedia broadcast/multicast service. MBMS transmissions may be location or geographic specific. They may be specific to a group of base stations, a city, state, distance, etc. Transmissions may be based on physical cell IDs. They may also be based on cells which have UEs of certain capability thresholds, for example, cells which have an ability to buffer data when a UE is inactive. In this way, it may be possible for a cell to page, via PDCCH for example, a UE after data is already buffered. The UE may rely on an inactivity timer, in an embodiment started upon receipt of a DCI format or wake up signal, for this purpose or for determining whether to monitor another cell of a same or different RAT. A physical cell ID may refer to a unique cell id or a physical cell ID may also indicate a subcell, for example in the case where a base station is split into two or more cells.

Multicast transmissions may require a UE or other network node to report reachability information for participation in the multicast transmission. The reachability information may comprise a mac address, ip address, multicast flow identifier or the like. Multicast information may be provided via a Session Announcement Protocol (SAP).

Video transmission systems have evolved rapidly over the past few years and competition in the video distribution market has heated up. In wireless data based video transmission methods, adaptive bitrate video coding is particularly relevant. This is because a wireless signal quality may change, and thus a video streaming technology or bitrate may need to change as the signal quality degrades (or improves). Adaptive bitrate technologies may consider resolution, frame rate, bits/sec, color spectrum, etc. This may be changed based on a UEs ability to correctly decode video of a given codec, profile or level etc. Technologies or parameters may also change as a user's interest changes, for example, a user moves her head and hence moves a display. A bitrate may be adaptive only over the wireless link. For example, a broadcast/multicast signal may be provided via a constant bitrate stream to a plurality of users, yet only a subset of viewers receive a lower (or higher) bitrate stream over a wireless or other link. In another embodiment, a preprocessor at a video distribution hub or server may predict or estimate a video bitrate based on a user's reported capability and channel quality information, for example, CQI or the like.

Implementations which embody embodiments disclosed herein may be circuit based, chip based, UE based, network based, computer based or even system on a chip based. A single circuit may employ embodiments disclosed herein as a wireless network on chip. In fact, a "wireless" network may be implemented on a completely wired technology. Alternatively, a wireless transceiver may operate on top of a wired link, for example, a wired RF link or optical link. This is true for power line based transmission technology which is wired, but must be thought of as "open" in a sense that power lines are shared between buildings, homes and the like. Thus, Ethernet type protocols may not be applicable to shared line technologies. In one embodiment, Ethernet headers may be compressed like DCI and other control information type elements.

In one embodiment, a base station, gNB, eNB, or any other transmitter/receiver may be powered by a power over Ethernet, power over coax or power over phone line connection to a modem, gateway or other backhaul device which is wired. In another embodiment, the base station, gNB, eNB may be powered and may communicate via $120v$ power lines. A gateway to a gNB or eNB may be a residential gateway which is coupled to the gNB or eNB over a fiber optic, coaxial cable or wireless communication interface. In one embodiment, the residential gateway may receive a buffer status report from a UE and may forward the BSR prior to or simultaneously with receiving data from the UE.

A portion of a gNB or other network device may be deployed in a virtual manner. For example, a single host may contain multiple guest devices. The guest devices may be virtualized, for example, the guest devices may be limited to utilizing only a portion of spectrum, a portion or resources, a portion of dedicated hardware or the like. Other devices which may be virtualized include switches, routers, UEs, TRPs, relay elements and the like. Virtualized UE devices may include medical devices, for example, devices which may or may not incorporate other UE functions such as typical cell phones. Medical devices may require a higher level of security and or dedicated resources.

When medical device software operates on a general purpose UE such as a cell phone, there may be certain security aspects which must be achieved. The UE may run a host OS which is controls security aspects and manages activities of applications. It may be the host OS which is in communication with the AS or SCS. Or, the host OS may establish the security association such that communication from/to the higher layer applications is inherently secure. The medical device software may be channeled and provide a response. The medical device software may also challenge an AS or SCS and confirm a response. Some UEs may only have a capability of a secured signaling mode. With this capability, UEs may only be permitted to transmit secure communications as compared to devices with which security is not mandatory. Supporting secure communications may include supporting transport layer security (TLS), supporting Session Description Protocol (SDP), capability of obtaining obtain authentication certificates, capability of self-signing one or more certificates. Medical devices may operate on special purpose hardware, for example a portable ultrasound machine.

In some embodiments, for example low power or less important communications unlicensed band frequencies may be used for transmissions. The bands traditionally used for 802, Bluetooth, etc are not being more widely considered for transmission of 3 ggp type traffic. Some use cases may be applicable to the above noted example in Alaska for vehicle communications. Parts of Alaska are without conventional population coverage and fail to have substantial infrastructure deployed. This would be a good case for dual mode transmission/reception or transmission/reception with one or more supplementary uplink or downlink band. However, there may be impact to typical 802.11 and Bluetooth operation due to the overlap.

One area in which NR may operate is at a 6 Ghz band and or below. In one embodiment, a UE may report a known 802.11 transceiver type to a cellular network. While this has been done for some time, it has not been done to determine whether or not a UE may listen to a carrier via 802 and actually detect whether there will be time for making transmissions to a cellular base station. Consider, a UE that must listen on a frequency used for 802 before communicating on the same frequency. In 802, any SIFS or other delay period is a delay in which no transmission is expected. Thus, a UE may clearly use any delay period for transmissions.

Figure 6:
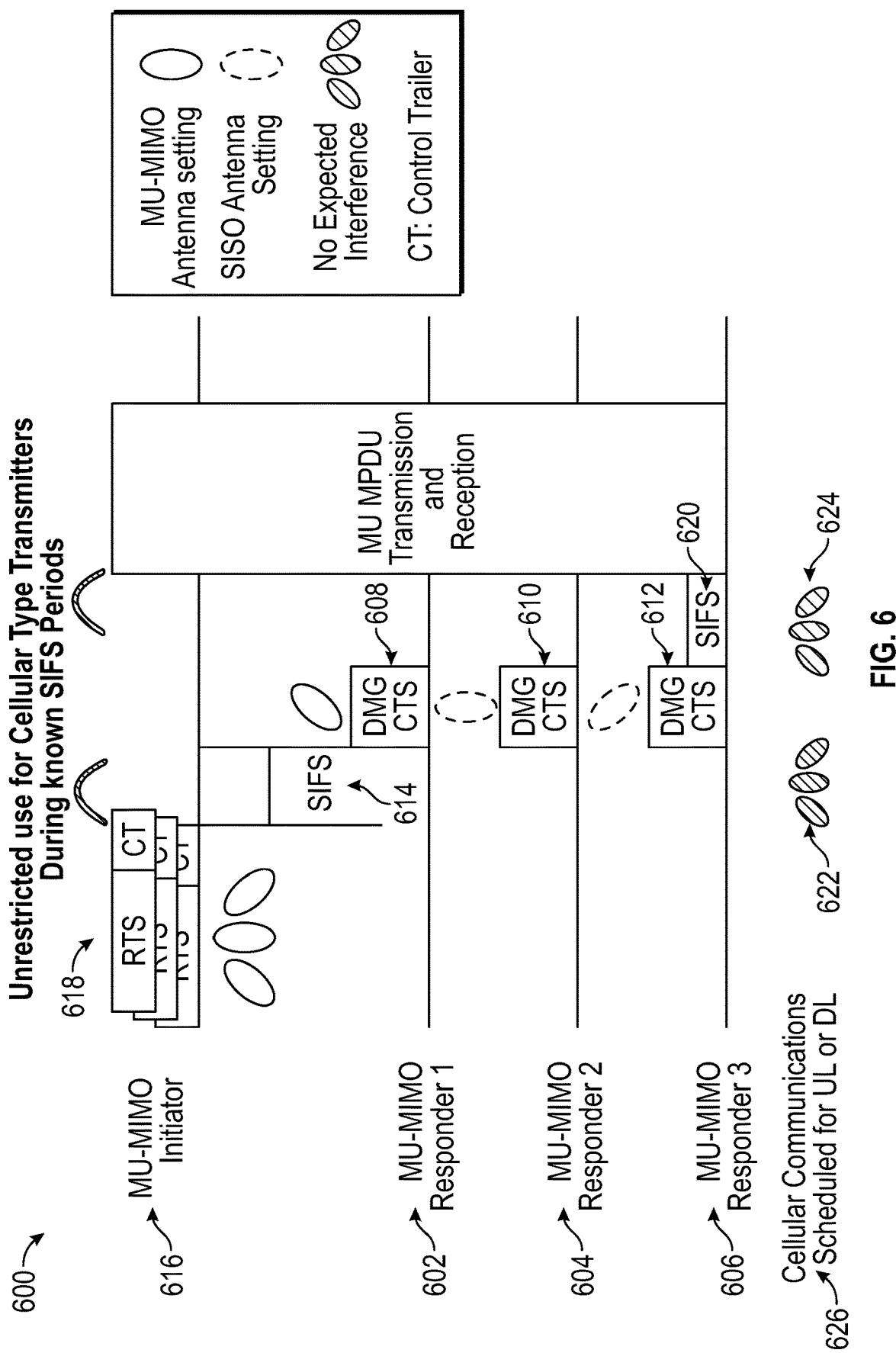
FIG. 6 is a standard 802.11 ay draft procedure in which MU-MIMO responders transmit clear to send responses a short interframe spacing (SIFS) after known initiator transmissions.

FIG. 6 shows a standard 802.11ay draft procedure 600 in which MU-MIMO responders 602-606 transmit clear to send responses 608-612 a SIFS 614 after at known initiator 616 transmission 618. After the CTS provided 608-612 by each responder 602-606, one or more SIFS periods 620 are provided for responders 602-606 to switch from uplink to downlink and receive or transmit one or more MU MPDUs. The SIFS periods 614, 620 shown in FIG. 6 are periods in which can be dedicated for other transmissions of other technologies such as new radio unlicensed (NR-U). These SIFS periods may be used for very short transmissions 622, 624, for example, a control transmission of a cellular type transmitter or receiver 626.

CTS-to-self messages may be used to determine when SIFS periods are scheduled based. Once a UE recognizes a particular standard using 802 or other technology standard, it may be possible to automatically detect the SIFS periods and transmit/receive accordingly. Support fora given standard should of course be provided to a base station.

In some embodiments, signals of LTE or NR may be precoded with more traditional signals of 802 type access schemes. For example, signals could be precoded with a length or duration and modulation/data rate. In some scenarios, beacon signals may provide information to a UE which indicates a number of active users, an average occupancy rate or any other signal which may convey to a UE the load placed on an access point or BSS. In this way, a UE which is not actively communicating with that AP, but rather may simply need to utilize spectrum for other endeavors, for example, communicating with a gNB or other cellular device, may learn of the likelihood that transmissions may be applicable on the unlicensed band. Similarly, the cellular devices may signal to the AP that there exist cellular UEs which are attempting to communicate in that band. Further, other UEs may provide direct communication information as to which BSS or which APs are not being utilized at a given instant. BSS and APs may be co-located, i.e. an AP may contain multiple BSSIDs each configured on one or more frequencies which may or may not overlap. An ability to use certain bands, for example, licensed bands and unlicensed bands may be reported and configured by the network.

In one embodiment, a UE may access the unlicensed band based on QoS. For example, for a brief high qos transmission, the UE may access the channel without listening. In one embodiment, a UE may employ a preamble of another technology of the unlicensed spectrum, for example, an 802.11 preamble (for example, including a PLOP preamble and/or PLOP header) indicative of a sync, symbol, service, length or the like, prior to subsequent transmissions. A UE may also modify the preamble, for example, by including duration or other information useful for securing the medium, but leaving off other information which is 802.11 specific. Instead, a UE may transmit other information in place of the 802.11 specific fields, for example, any one or more of the parameters disclosed herein may be included in the WiFi preamble. A legacy preamble may or may not be transmitted before any other transmission herein.

In NR-U, a UE may perform a listen before talk (LBT) procedure much like an LBT procedure performed in 802.11. Alternatively, a UE may decide not to perform a LBT procedure on unlicensed bands, for example 2.4, 5 ghz bands. One issue is that the unlicensed spectrum is going to become more and more congested as both licensed operators unlicensed operators and UEs are entering the unlicensed spectrum. In fact, services may be delivered across mobile network operators, in which some may be licensed or unlicensed. In one embodiment, a UE may sense not only a transmission instant, i.e. whether the medium is busy, but the UE may listed for an extended period of time and in one embodiment, may listen on multiple channels. This way, the UE may be able to determine whether or not a particular location/frequency/AP, etc is busy. If it is, the UE may choose to use licensed spectrum instead. Sensing may be performed on known bands of a particular technology or standard. For example, sensing may be performed on bands which are used by some protocols for channel hopping. In one embodiment, sensing may include decoding one or more headers or header formats to determine a duration or other information corresponding to the transmission. A UE may choose to transmit on channels which are unused. The UE may report to a cellular network the level of congestion in the unlicensed space. Based on the reported channel congestion condition, the network may signal indications such as a backoff indicator for the UE to use when attempting to use unlicensed spectrum in a particular channel access scheme or method. The backoff indicator may be specified as an integer value, or as a timer value, a number of subframes, etc. The network may determine a backoff value via another UE in a same area, and thus may signal backoff values as a broadcast transmission. For example, this may be done with system information or it may be done with DCI or other format. In one embodiment, a base station may listen on the unlicensed spectrum and provide an indication of the channel conditions of such. This may also be provided in system information, for example, in a MIB or SIB. In some embodiments, any one or more of the transmissions or receptions disclosed herein may be exempt from making a clear channel assessment on a channel prior to transmitting. This may be applicable to very low latency situations or other situation where transmissions a signal is very short in time duration, on a very limited frequency set, at very low power or on a narrow beam. I.e. the UE may make the determination to avoid CCA based on a threshold.

A UE may receive an LBT configuration from the gNB. The UE may use the configuration to sense the channel in coordination with the gNB such that transmissions are scheduled when both the gNB and the UE detect a channel busy ratio below a threshold. In this way, the gNB may not block short range transmissions near to or of the UE. In an embodiment, other UEs near the UE may not be co-scheduled, while UEs not near the scheduled UE may be co-scheduled.

A UE may avoid LBT when needing to transmit a high priority message, for example a HARQ acknowledgement. No LBT may be supported for certain frequency ranges, for example, for frequency bands including 2.4 hz, 5 ghz, 5.9 ghz and 6 ghz or others. In other embodiment, a UE may not avoid LBT and the UE may a decision to switch bands or channels upon determination of a channel busy state. A DCI format or other format may indicate primary uplink transmission resources and backup resources in case of LBT failure. A maximum number of LBT failures, for example, on one or more 20 Mhz channel, may be configured and a determination as to whether this number is met may be made based on a sliding time window, a counter, timer or the like. In one embodiment, a UE may delay transmission on indicated resources. For example, the UE may transmit on a later in time resources, but not a first portion of the resources. A UE may transmit on a portion of frequency resources.

Latency compatibility may be an issue in NR. One particular goal of NR is to reduce latency to 1 ms or below. A number of enhancements may support achieving this goal. One such enhancement may be to support blind PDSCH repetition. This may be achieved using legacy PDCCH or PUCCH formats. There may be no HARQ performed in a blind repetition. In other scenarios, UEs may operate on a best effort only policy. Blind configurations may be only applicable to secondary cells, for example cells which are not a primary cell of the UE. Secondary cells may be 802.11 based, Bluetooth based or even cellular or other network carrier based. There are many ways in which secondary cells could be employed: any potential secondary cell (on any frequency known to the UE) might be measured. These measurements might be reported in idle mode. It may even be possible to signal an SCELL measurement report on the SCELL. For example, some networks might allow a measurement to be reported prior to the UE performing an association procedure with the SCELL. This might also provide signaling for the end-to-end latency to be received by a component of a PCELL or another network node. Consider the delay not being of the RAN, but potentially of the underlying wireless network. In this case, only limited RAN resources would be utilized if the wired network is determined to be congested.

Control channel and shared channels have typically been split in prior art systems. In some designs, the locations of control, for example PDCCH, and PUSCH or PDSCH may be interleaved. Transport blocks may be interleaved on any one of these or other channels. For example, if there are any unused or unnecessary resource elements dedicated to PUCCH, they may be configured as PDSCH RBs. In this way, a base station may be able to signal data to a UE in a same subcarrier or a subcarrier only a short time frame away. This may be implemented only if a UE is configured to always receive X symbols in time, wherein X is means the 0 through X symbols in the first subcarriers or a slot, subframe, etc. Resources, for example, for PUCCH or PUSCH may be determined or selected based on a combination of payload size or payload data type. A UE may have a capability indicator which indicates capability to receive a downlink shared channel in a different slot or subframe than the downlink control channel. The capability may indicate a number of simultaneous PDCCH, PDSCH, PUCCH, PUSCH, PRACH or other channel transmissions which may be supported in time. Another capability may relate to an ability to receive a plurality of downlink shared channels indicated by a downlink control channel on a different frequency and on a different slot or subframe. The UE may be configured to monitor for downlink control channel in a particular time/frequency resource(s). For example, a UE may be configured to monitor for a PDCCH at a subframe, slot, mini-slot which may be configurable based on DCI or MAC signaling. The UE may be configured after transmitting a PDCCH monitoring capability indication. This monitoring configuration may be changed dynamically (on either an unlicensed band or a licensed band) and may depend on a type of control information. A gNB may indicate a gap period of which no PDCCH monitoring must be performed. This may be indicated per period or over a time period using a bitmap or via a duration indication. The monitoring capability may be provided in DCI and may be a set of one or more configured timers for monitoring PDCCH, not monitoring PDCCH, skipping reception of PDCCH etc. CCEs may indicate for the UE to skip x symbols, or x slots, or the like. Different numbers of CCEs may be monitored in a slot based on capability. A capability may relate to an ability of a UE to process downlink or uplink after receiving an indication of the resources for such transmission. A UE may employ another timer to sleep for a period of time between PDCCH reception and subsequent data reception or transmission.

A UE may out of order process downlink resources→uplink transmission, for example, by performing out of order HARQ operations. A UE may be scheduled for transmissions out of order HARQ for processes that vary in terms of priority. For example, a UE may receive a HARQ ACK for a second (or subsequent) transmission prior to receiving a HARQ ACK for a first uplink transmission. This may be due a higher priority of the second uplink transmission. This may be based on an MCS of the first and second transmission. For example, higher MCS may be ACKed first or subsequently.

In an embodiment, PDSCH may have an associated priority indicated in the transmission or in the DCI indicating the transmission. If two PDSCHs collide in the time domain and are not be multiplexed, the UE may only decode the higher priority of the pair of PDSCHs.

A UE may be capable of supporting out of order PDSCH reception, out of order PUSCH transmission, out of order HARQ transmission for received PDSCH and/or out of order HARQ reception for PUSCH. Out of order HARQ transmissions may be out of order based on transmission priority or HARQ identifier. A UE may be capable of processing two or more NACKs or ACKS together based on two different HARQ processes. Out of order processing may occur based on a BWP (default or configured), numerology, SCS, gap size, number of overlapping symbols of the transmissions or the like. Regardless, the UE should always decode the PDCCH and determine priority before making a decision on a HARQ ack procedure. The determination may be in accordance with a serving cell, secondary serving cell, number of serving cells or the like.

In one embodiment, the UE may transmit a HARQ-ACK for a subsequent PDSCH prior to a first PDSCH in accordance with a priority of the first and second PDSCH. For example, if a first PDSCH is an eMBB PDSCH and a following PDSCH is a URLLC PDSCH, the HARQ ACK for the URLLC PDSCH may precede the HARQ ACK for the eMBB PDSCH. A multiplexing of two ACKs for different downlink transmissions may also be in accordance with a priority level, for example, HARQ-ACK for eMBB and URLLC may be multiplexed on uplink (or downlink). The priority may be based on a subcarrier spacing, numerology, a quantity of buffered data, a subsequent transmission type/format or the like. In one embodiment, the priority may coincide with a priority of the gNB and may, for example, be based on priority levels of a gNB having a separate Central Unit (CU) and Distributed Unit (DU).

In this way, multiple DUs can be separated while still being connected to a single CU. In one embodiment, a gNB may have a split control plane and user plane. Each DU may be responsible for one or more of a control plane and user plane. In some instances, user data may be received on the control plane. A UE may be connected to the gNB via multiple distributed units. One connection may be used for transmission, while another is used for retransmission.

In some embodiments, a UE may be configured to operate with multiple TRPs and or multiple panels. Each panel may have an identifier for including in an uplink transmission to the TRP. A UE may indicate a capability to support only a single PDCCH design, indicate a capability to support a multiple PDCCH design, indicate a capability to support both single PDCCH and multiple PDCCH. Any other channel disclosed herein may be supported in terms of a single/multiple channel. The UE may report both a capability and a preference. Either one of PDCCH or PUCCH may be encrypted for security purposes. This may be done on top of the data. PDCCH capabilities may include support for URLLC and eMBB services. Other PDCCH capabilities may indicate support for a maximum number of simultaneous PDCCH candidates per slot, supported DCI formats, etc.

New radio technologies may be deployed in non-traditional spectrum bands. For example, consider transmissions at 20 Hz to 20 Khz, e.g. audible human hearing. Or transmissions at 430-770 THz, e.g. human vision. In the past, audible human hearing frequencies were used extensively for phone line based transmissions, but these frequencies may be used in wireless transmissions as well. Considering the concept of noise cancelling headphones, one might apply intermittent data transmissions along with noise cancelling transmissions, thus providing both noise cancelling and data transmission capabilities. In one embodiment, a human may be provided with virtual reality glasses for viewing information received over a communication link. Virtual reality devices may interface with UEs or be coupled to UEs via radio wireless or wired links. Virtual reality devices may incorporate wireless sensors, wireless transmitters, motion sensors and controller, foot sensors, controller with buttons, all these devices may be integrated wirelessly. Other virtual reality applications include social media and social interaction sites. In one example, for example a virtual scene application, some users may be remote while others are local to an environment. A UE may be configured to switch video feeds among multiple cameras, wherein the switch occurs via a signal sent to the UE over a wireless medium.

Terminals may need to be equipped with cameras and sensors to at least provide the UE with capability of acting as a media source. Any capability parameters disclosed herein may be reported to Media Gateway Function (MGW) or an Application Function (AF) in a network, the that the network may recognize the UE capabilities. The MGW may subsequently receive, process and distribute video recorded by the UE. The MGW may make recommendation as to bitrate, quality, video size, video format or type. These recommendations may be based on the wireless environment or an ability for the MGW to further distribute the video.

Wireless communication environments may include light based environments. Modulation types, for example, may include asymmetrically clipped optical OFDM (ACO-OFDM), DC biased optical OFDM (DCO-OFDM) and asymmetrically clipped DC biased optical OFDM (ADO-OFDM). Any one or more of these modulation types may be used for light based environments. A transmitter may indicate a switch to another OFDM type. In many home and commercial environments, lamps have shades and windows have window dressings (curtains, blinds, shades, etc). In one embodiment, a translucent material is employed in place of the blind or lamp shade. The translucent material may be comprised of a twisted nematic or light based devices that polarize light. In this way, the polarizers may be set to correspond to a particular translucency and cause dimming. Given that the polarizers are electrically actuated, a control circuitry may cause them to intermittently transmit data while also blocking light. A visible light transmitting device may be configured as an scell or master cell. A visible light receiving device may rely on a photodiode or camera for receiving light signals. A photodiode may, for example, receive signals (for example MIMO based) and provide them to a filer (low-pass, high-pass) for separating and providing output data and any light output. A photodiode may be used to measure channel characteristics, i.e. signal to noise ratio(s) and the receiver may report the SNR to the transmitter to adjust bitloading. Bitloading may be done based on time, frequency, movement, angle, color, intensity or the like for light based methods. Bitloading may be adjusted with respect to RF transmissions based on feedback received over one or more light transmission(s) or vice versa.

A capability of the photodiode or camera may need to be assessed and reported in order to receive transmissions accordingly. For visible light communication (or any other communication for that matter, a UE may report a capability to support any one or more of the following codes or coding schemes: Hierarchical Codes; LCD to camera Manchester coding; BCH Code; Alpha channel coding; RGB coding; Overlay coding; Quick response (QR) codes; Interframe Erasure Codes; QR codes; Robust dynamic coding; Rainbar coding; Rateless coding; Texture codes; Alpha39 coding; Manchester coding; Raptor Codes; Reed-Solomon coding; binary convolutional coding (BCC). Supported modulation techniques may include: Wavelength Division Multiplexing (WDM); Pulse Width Modulation (PWM); Phase Shift Keying; Under-sampled Differential Phase Shift On-Off Keying (UDPSOOK); On-Off Keying (OOK); Quadrature Phase Shift Keying (QPSK), Color shift keying (CSK); Under-sampled Frequency Shift On-Off Keying (UFSOOK); Under-Sampled Quadrature Amplitude Modulation with Subcarrier Modulation (UQAMSM); 16QAM; 64QAM; 128QAM; 256QAM; 512QAM/1024QAM; 2048QAM; 4096QAM; Hybrid OOK-PWM; Spatially-Modulated Space-Time (SM-ST); Layered Space-Time Code (L-STC); Spatial-Temporal Complementary Frames (S-TCF); Pixel translucency modulation; Spatial Discrete Multitone (SDMT). PDUs may indicate modulation scheme in a preamble. Modulation schemes may be indicated in the alternative, i.e. one or another. Any scheme may by hybrid in nature and employ a combination of two or more schemes. For example, a single packet, frame PPDU, or the like may employ multiple (for example, 2-3) modulation methods wherein a first modulation method is a lower speed/coding than a following modulation method. The second (or third) portion may be sent with a higher or lower power or at a different beam or angle, etc. In an embodiment, a combined analog/digital method may be employed. Any one of these modulations techniques and coding techniques may vary as the transmitter employs HARQ. Any one may change based on a redundancy or redundancy version for transmission. Channel probing may be performed.

Circuitry may include one or more of a circular buffer, multiplexor, first in first out buffer, last in last out buffer, last in first out buffer, strings, memory, state machines, Multiplexer/ALU, priority queue, microprocessor, registers, microcode, threaded pipeline, bus, field programmable gate array (FPGA), application specific integrated circuit (ASIC), baseband processor, video processor or other electronic circuit for that matter. Logical calculations may be performed on any parameter or parameters. ANDing, ORing, XORing, or the like may be performed in a logical or Boolean fashion. Circuitry may include interleavers such as LDPC block interleavers. Circuitry may be configured to generate a random number as input or compute a modulus operation. Circuitry may include equalizers for interference cancellation or other techniques. Equalizers may include spatial temporal linear equalizers including zero-forcing (ZF) and minimum mean square error (MMSE). Circuitry may also include amplifier(s) such as a power amplifier. Video circuitry may include a video processing unit (VPU) and a graphics processing unit (GPU). A display may be coupled to the GPU. Circuitry may include ciphering and deciphering circuitry. Circuitry may refer to buffer, for example, a time sensitive networking buffer which may be supported by a UE or STA.

Figure 7:
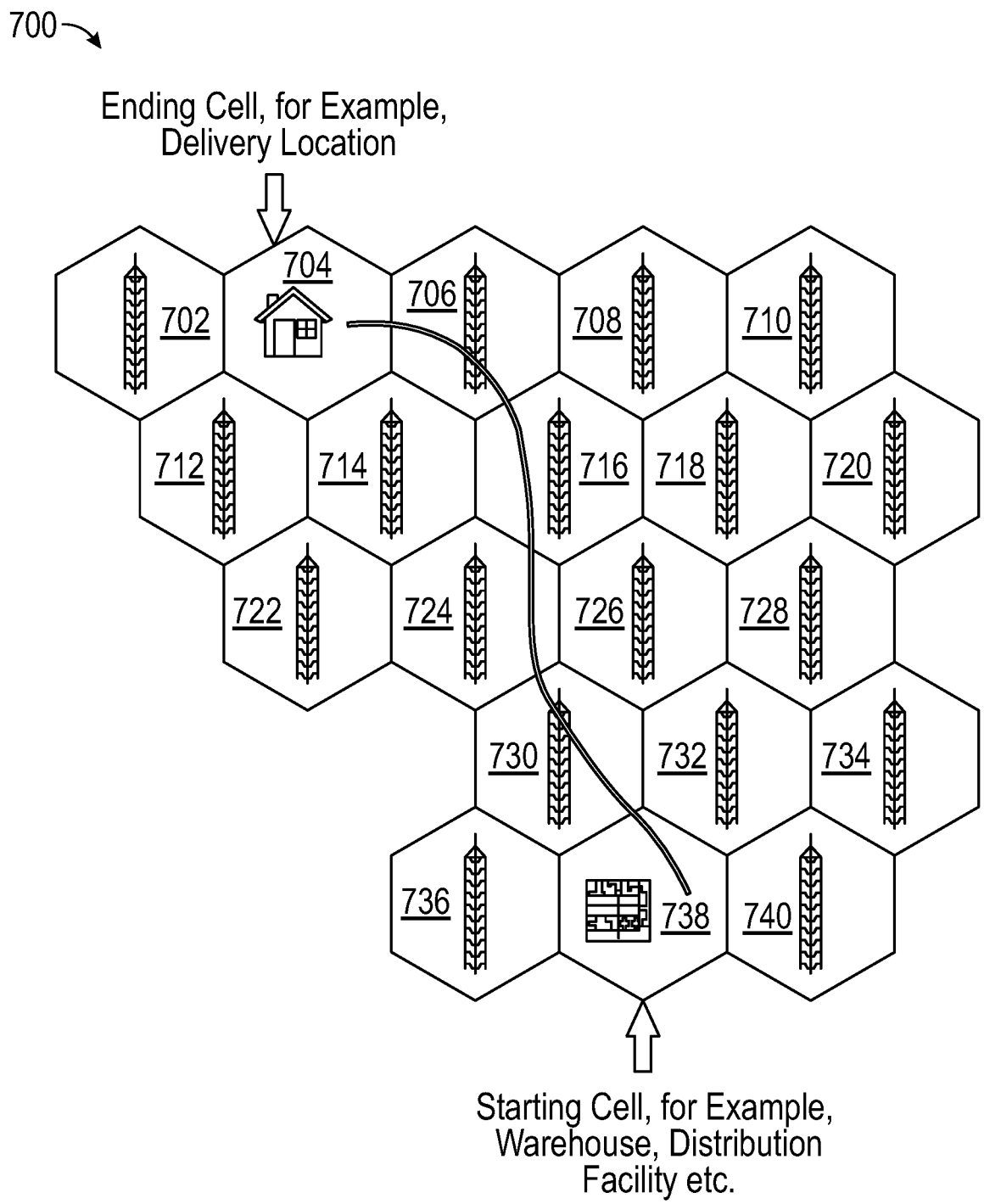
FIG. 7 is an illustration of an exemplary flight pattern.

FIG. 7 illustrates an exemplary UAV or UE or even vehicle which follows a route from a distribution center to a drop off point. In one embodiment, a UAV may maintain a listing of base station identifiers between its origination point and destination point. By maintaining this list, the UAV may be able to save on measurement reporting. In one embodiment, a listing of base stations may be developed via previous flights from origination to destination or from origination to a point beyond the destination. If the UAV is also a radio access node on-board UAV (UxNB), the UAV may participate in negotiating and scheduling transmission blanking intervals, no transmission intervals/periods and reference signals based on location and position signals received from the base stations flown over. The UxNB may transmit reference signals to indicate location to base stations so that transmissions may be coordinated.

FIG. 7 indicates a flight pattern 700 of a drone through cells 702-740. As shown in FIG. 7 a drone may take flight in cell 738 which may be a warehouse, distribution facility or the like. The drone may navigate through cells 730, 724, 716, 706 to reach a destination cell 704. In an embodiment, the drone may serve internet access or data access to UEs which are ground based. The drone may navigate to destination cell 704 based on a location of one or more UEs which need data access from the drone or UAV. In an example, instead of entering cell 724, the drone may enter cell 726 to serve data to a UE located within that cell. In an embodiment, a drone may fly a route which corresponds to cells for which it needs data access or may be using for data transmission. For example, the drone may enter cell 716 instead of 714 if cell 714 is inaccessible or restricted to the drone.

Other exemplary applications include railway applications which include similar embodiments. In one embodiment, a railway car or train may transmit signals via the rails to a relay which relays them wirelessly. In another embodiment, a train may transmit directly to a base station. Trains may need to communicate when a potential problem exists, for example, a mechanical failure, a light is out, a track is observed to be obstructed. These conditions may be threshold based, and communication may be based on a threshold. Other needs for communication may be due to maintenance, location detection or diagnostics. Trains may communicate with track equipment and other equipment. Trains and train track equipment may be equipped with a wireless transceiver for this purpose. Automatic train commands may be issued to trains or track equipment. Both may indicate location, capability and may perform synchronization and the like. Transmission of RF signals may switch between wireless RF transmissions to a base station and track based signaling, based on determination of any radio conditions. Track based communications may be RF to track or elements near track, power rail modulation (signal transmission over the train power supply), or via wheel to track, train to interlock or vice versa, or the like. A switch in transmission or reception type may occur based on any signals or parameters as disclosed herein. A switch or a switch to a redundant operation may be based on signal quality, train location, train speed, detection of a drowsy operator or any other fault or error condition. Communication diversity or switching may be to visible light spectrum, ultraviolet or other light based methods. A train may be configured to transmit in a redundant fashion, for example, using any one or more of track based transmission, transmission over single power rail, wireless transmission, wireless relay transmission (via a lamp or other base station, for example), via light based communication, satellite based communication or to/from a UAV. A UE may support multiple different diversity transmission schemes or methods for example using cyclic delay diversity (CDD) or other methods. Support for a number of schemes may be indicated. A single DCI format may support the different schemes supported by the UE.

Figures 8, 9:
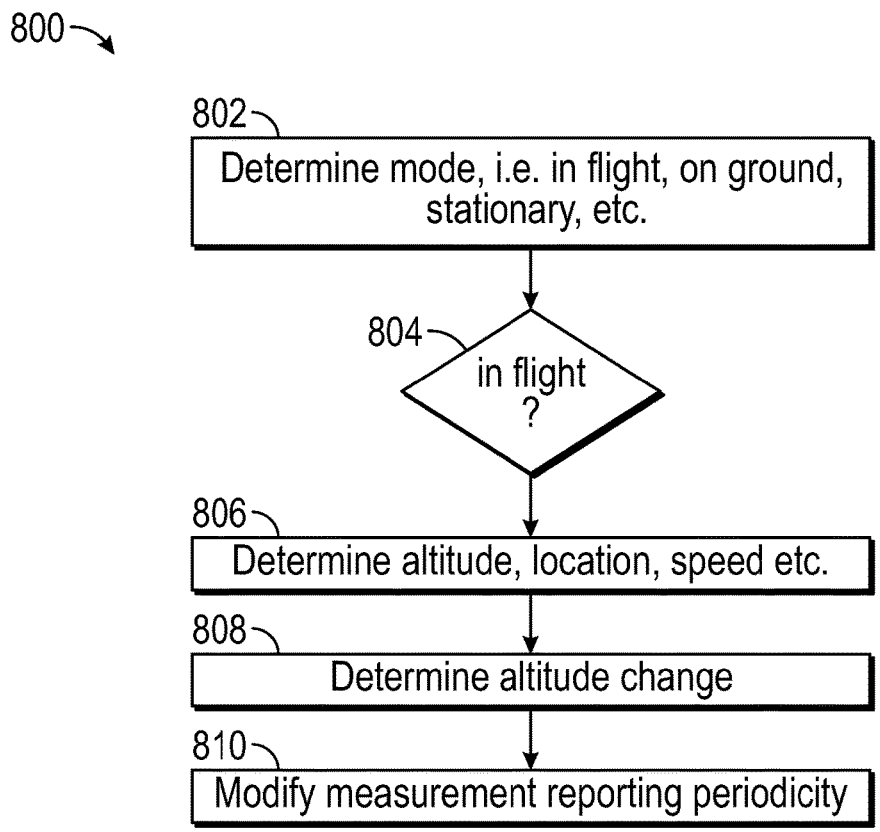
FIG. 8 is an illustration of a line of sight concept.
FIG. 9 is another illustration of the line of sight concept.

FIG. 8 and FIG. 9 illustrate a line of sight concept. In one embodiment, a UE may report energy efficiency, imperfect CSI, number of channel estimation errors, partial CSI and other limited channel feedback, for example 1 or 2 bit feedback. Feedback type may be indicated, along with the resources for the feedback, in any DCI format message. A UE may need time to compute feedback and may not transmit feedback if time does not allow for it. A UE may perform Data-Aided Channel Estimation (DACE) and or Midamble Channel Estimation (MCE).

In FIG. 8, a flowchart 800 is provided for determining measurement determining and reporting periodicity. For example, a UE may determine a mode of flight 802, i.e. on the ground or stationary, or in flight. If the UE is in flight 804, am altitude, location speed or the like may be determined 806. If there is a change 806 in altitude, location or speed, the UE may determine 808 the change. Based on a look up table or other means, the UE may modify the measurement reporting periodicity 810. The UE may be configured to take more or less measurements based on speed, altitude change or the like.

FIG. 9 is a table 900 which illustrates examples corresponding to descent scenarios. A ground based unit may report CQI/PMI 902 and RI similar to that of LTE 906. For example, a legacy LTE device 906 may report CQI between 1 and 160 subframes. A UAV may receive a configuration via RRC signaling and use this configuration to determine periodicity for measurement reporting. In legacy LTE 906, CQI/PMI 902 is reported between 1 and 160 subframes. RI is reported between 1 and 32 subframes. In one embodiment, depending on the speed of descent (or ascent) of a UAV, reporting periodicity may be either increased or decreased. This is because radio conditions may improve (or get worse) with altitude, i.e. the UAV may have a better (or worse) line of sight to a base station or other receiver/transmitter. Descent may be measured in three different intevals, for example, slow decent 910, medium descent 912 and rapid descent 914.

Drones may be configured to implement any one or more of the procedures disclosed with reference to a vehicle. Drones may participate in capability discovery procedures (at start up, connection establishment, time of flight, etc).

Drones or other vehicles may support one or more light detection and ranging (LiDAR) capabilities in combination with other vision, safety or other wireless technologies. LiDAR devices may be controlled over the wireless link. LiDAR capable devices may be configured to generate LiDAR point clouds and transmit compressed signals accordingly. Safety specific communications may be relegated to one or more safety specific channels, for example, impending crash warnings, broken down vehicle warnings, or the like. Drones or UAVs may be configured as farm assets, for example, drones may be configured to spray crops or scan for disease or pests.

In one embodiment, the UAV (or any other UE, base station, station, etc for that matter) may be configured to determine whether or not it is in line of sight with a receiver. This line of sight determination may occur via a handshake with another device. A first device may transmit a signal to the second device and the second device may respond thereafter. Both sides can determine the line of site condition by comparing power and phase of the transmissions. A determination as to line of sight conditions may be signaled or indicated to another device, for example, another UE, base station or the like.

Line of site determination may be helpful for ranging. If it is understood where a UE is located based on ranging, the base station might initiate handover before a UE is actually within range of a new base station. For high speed UEs, which may or may not be traveling in relatively fixed lines (roadway, train track, etc), it would be helpful for a previous base station to signal to a next base station the likely handover of the UE. The UE may be provided with a random access resource or other information to assist in handover. The UE may handover after a timer expiration or based on some other condition which was signaled by the previous base station to the UE. Handover may be conditional. In one embodiment, a base station may broadcast conditional handover information in a SIB for use by a UE for handover to another neighbor base station. Alternatively, the conditional information may be transmitted via MAC in a unicast fashion. The conditional information may be filtered by a gNB based on the UE capability. Alternatively, the UE may filter handover decisions in accordance with capability. Handover may be to a gNB or eNB of a same or different operator. Handover may be to WiFi etc. Handover may be make before break or may be switched completely instantaneously. In one embodiment, by ranging a UE, a base station (or UE) may be able to adjust for Doppler shift. This likely will also require determining a speed of travel of the UE as well as a direction to/from the BS.

Handover may fail in some instances. For example, handover may fail if the UE does not receive a handover command from a base station. Failure may also occur if the handover is received but the UE cannot access the new base station for mobility, speed, link errors or other reasons. After expiration of a handover related timer, the UE may declare radio link failure. A handover success rate may be maintained by the UE and reported accordingly.

Embodiments disclosed herein may have been referenced using the term user equipment (UE). However, one of skill in the art will recognize that the term UE may apply to devices like drones, robots (i.e. telemedicine, metering, etc.), virtual reality devices including games, other motion control implementation and the like. The terms UE and STA may be used interchangeably herein. Other devices may include traffic controllers, traffic lamps and street signs. Street signs and traffic lamps may be portable, for example, designed for use in construction environments. In some environments, the traffic lights may communicate and may turn a two way road into a one way road by alternating a flow of traffic. Each sign may signal to vehicles, via both light based communication (red, green, yellow) and via radio frequency communication. The signs may alter traffic flow, perform software updates, and deliver information to vehicles based on information received wirelessly from a base station, server or the like.

A virtual reality device may augment or totally encompass human vision. For example, by augmenting, the virtual reality device may take images and video, at one or more frame rates, of a field of view and provide those images to a server for processing and returning augmented information. If encompassing, it may be helpful to include a space sensor, accelerometer or the like so that users are not using while walking or moving in dangerous environments. In another embodiment, the virtual reality device like a heads up display may be transparent so that the user can focus on the environment along with the electronic elements. In a home embodiment, a user may view his home from outside and have landscaping displayed on the display in front of the home. Inside the home, the user may shop for furniture, pick out wall colors or wallpaper etc and have these items displayed on the AR scene.

In a surgical embodiment, an augmented reality display may display a 3 dimensional view of a patient with instructions or other information overlaid. In this way, the surgeon may have instructions as to how to guide a scope or location for cuts, etc superimposed on screen. The surgeon may switch between views such that more traditional information, i.e. blood pressure, etc can be displayed. The surgeon may also view catscan, MR or other images. In one embodiment, the actual procedure may be performed in part using a robot. The screen may be composed of a plurality of screens, for example, if a UE is foldable/unfoldable. Once unfolded, images may be overlaid or superimposed and made to be traversable together as one. The images may be switched to a surgeon's heads up display, for example, AR or VR glasses. The switch may be accomplished via short range WLAN or via activation over cellular technologies. Navigation may be performed via voice commands, head movements, or hand movements. When a head movement or hand movement is detected, responsive video may be requested and may be provided with a lower latency channel so as to provide video as soon as possible. This may be necessary due to having only little or no information in a video buffer which the user is not currently looking at.

AR and VR glasses may monitor temperature and report temp to a network server, entity etc so as to control workload/processing on the glasses themselves. If the glasses are overheating, then the processing can be moved to server. The same may be true for any technology disclosed herein.

Robots may be indoor or outdoor robots. Indoor robots may move packages, scan packages, prepare packages, move dirt or other material etc and may be configured to utilize any one of the technologies disclosed herein. Indoor robots may have schedule transmission times or may be scheduled based on a master/slave relationship. Robots may be configured to prepare food or flip burgers etc. Robots may walk and talk. In an environment where multiple robots exist, there may be a need to limit how many robots who can do something simultaneously with another, for example a limit on how many robots can talk or be mobile at the same time. A robot may have one or more grabbers, backhoes, drive motors etc. Robots may package goods, for example, for shipment. Robots may build a box to hold multiple items, for example, the robots may assemble boxed from cardboard sheets, fold the sheets, cut the sheets etc based on a size of each available item and a size of preexisting packing materials. A robot may tear packing materials from a longer length to fix the box and items.

A remote user may be capable of configuring multiple machines at multiple sites, for example, farms, to till soil, plant crops, harvest crops, spread fertilizer or perform other farm activities. The user may be provided with an interface which displays an aerial view of the farm, for example. Depending on the equipment on site, the user may, via an interface, set a plan for the one or more machine to perform the tilling, planting or harvesting. This may be done in a row-by-row fashion in which the tractor (or other server) maps the rows to longitude/latitude coordinates/lines to 3d video imaging. The UI may be configured to offer a suggested path to the user based on capabilities of the equipment on site. For example, a mower may have a 48" deck and a x degree turning radius. Based on these example parameters a number of rows may be organized for efficiency, speed or job quality. The UI may be configured provide instructions to the machinery on a fixed or other schedule. Machinery, for example, irrigation systems, may have the capability to be monitored remotely and any associated parameters of the machinery may be configured remotely by the UI. Machinery may be started up, serviced, diagnosed all remotely.

UEs may be configured to display video and status indicators for the remote machinery. The UE may be configured to switch between two or more factories, sites or farms where equipment is simultaneously operating and may instruct operational changes as needed. One problem which exists for remote machinery is the determination that an areas (of a farm or field) is wet or wetlands. An operator manually driving a tractor will easily recognize not to bother seeding an area which consistently floods, but an autonomous tractor may not have the same capability without either being programmed to avoid floodable areas, having a wetlands delineation map, having sensors to detect poor soil conditions, or the like. Information may be provided via a remote UE for an operator to avoid those areas.

UEs may be configured to display farm equipment images based on cameras on the equipment. For example, if a farmer has three tractors on a farm, a UE may be provided with video and/or geolocation feeds corresponding to each tractor. The UE may have a wake up signal sent to UEs on each piece of farm equipment. Subsequently, the remote UEs and remote cameras may be powered up and begin providing video to the farmer's UE without the farmer having to first locate his farm equipment using conventional means. For example, the farm could spend time refilling seed tanks instead of manually operating one. In this way, a remote tractor or seeder may report that a canister is nearing empty or that at a given seed rate, there may not be enough seed to finish a job. The same may be true for a gasoline tank or diesel tank. A remote UE may then alter parameters of the seeding equipment. In another embodiment, at a given rate of speed, the remote equipment may indicate that there is not enough time in the day to perform a given task. Each of these indications may be provided, via cellular, via sidelink or via WiFi, to the UE (or other machinery) during planning of the route or during performance of the task.

Tractors or other machinery may be configured to report images which show signs of disease, insect damage or rot. This information may provide an indication of pesticides which may be deployed remotely via instruction by an operator (or may occur automatically. For example, remote weed killer application may be performed thus potentially saving an operator from manual application. The weed killer, for example, glyphosate may be applied to weeds once they reach a certain threshold height or quantity. This way weed killer may be applied appropriately.

Medical device applications may include heart monitors, capsules for inspection of the digestive tract, blood/glucose monitors, or the like. Each device may be configured to report information over a wireless link. A capsule designed to be swallowable by a user may have a battery or may be powered by another method, for example a transformer (coil) located outside of the body. The capsule may have a camera for recording 360 degree (or other) video. Other 360 degree video applications include scoping, for example, in wastewater pipes or image capture for robotic devices, mechanical devices, tractors or the like. As used herein, the term UE may refer to any equipment near a user, in possession of a user, in a home of a user, or the like. The UE may include other access technologies other than wireless, for example, cable or telephone line communication transceivers.

Figure 10:
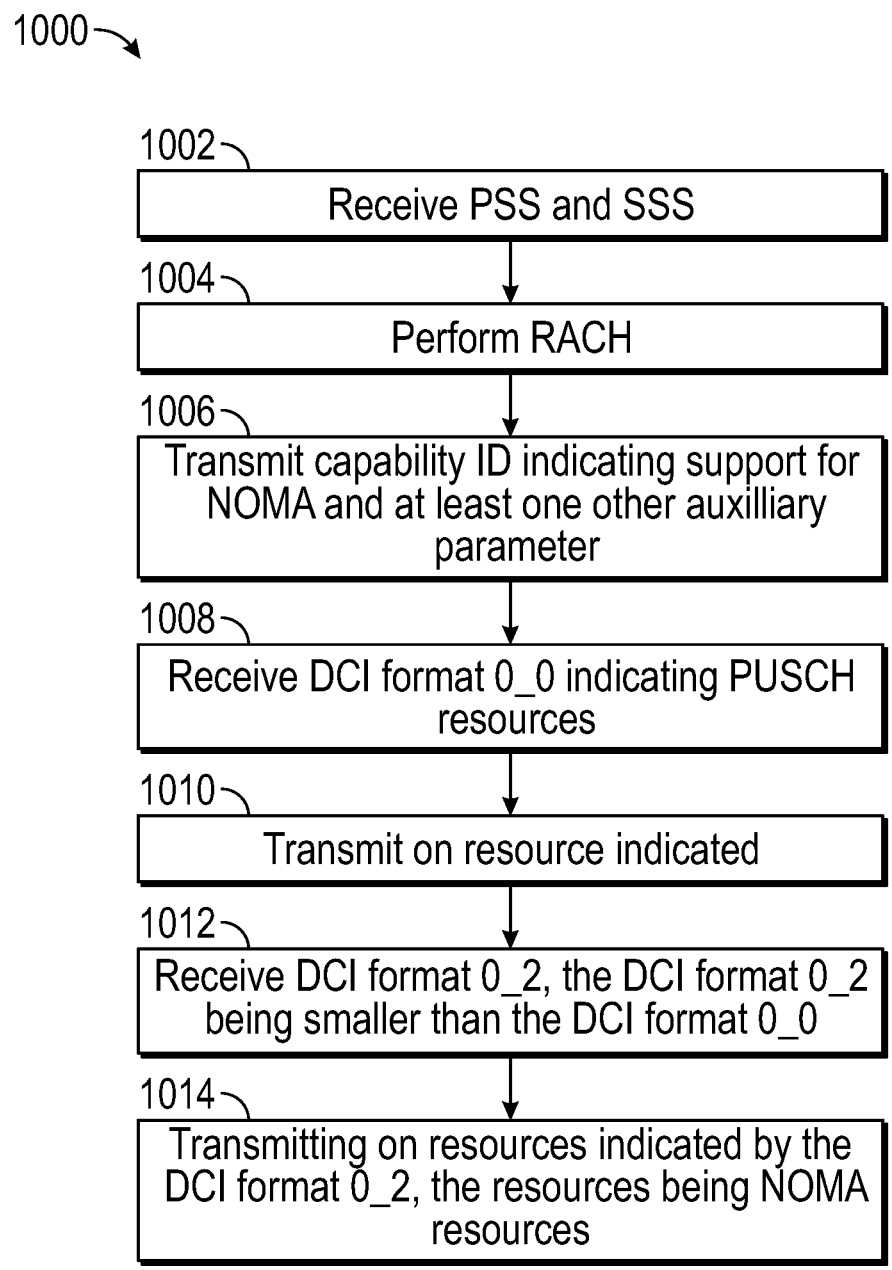
FIG. 10 is a flowchart for receiving resources for non-orthogonal multiple access (NOMA) transmissions by a user equipment (UE).

FIG. 10 is a flowchart 1000 for receiving resources for NOMA transmissions by a UE. The UE may receive a synchronization signal 1002, for example a PSS and SSS. The UE may also receive a resynchronization signal at some point, which differs from the PSS and SSS. RACH may be performed 1004. The UE may indicate support 1006 for NOMA transmission capability along with at least one other parameters of the UE. The another parameter may be unrelated to the capability to support NOMA. The UE may receive 1008 a DCI format 0_0 indicated PUSCH resources for transmission. The UE may transmit 1010 on the PUSCH resources and subsequently receive a DCI format 0_2 1012 which has a total number of bits which is less than the total number of bits used for the DCI format 0_0. Any DCI format herein may be specified with the smaller number of bits by comparison to another disclosed format. The UE may then transmit and/or receive on 1014 the indicated resources of the DCI format 0_2.

What is claimed is:

1. A method performed by a user equipment (UE), the method comprising:
   receiving first downlink control information (DCI) of a first DCI format;
   receiving second DCI of a second DCI format, wherein the second DCI format is different than the first DCI format, wherein the second DCI format specifies a variable number of transmit power control (TPC) command bits, wherein the second DCI includes no less than 6 bits of TPC information;
   receiving third DCI of a third DCI format which is different than the first DCI format and the second DCI format, wherein the third DCI format is a variable length DCI format, wherein the third DCI is scrambled according to a paging radio network temporary identifier (RNTI), wherein the third DCI includes information for a tracking reference signal; and
   receiving subgroup information via a system information block (SIB) and processing the third DCI in accordance with the subgroup information;
   wherein a number of information bits of the second DCI format is variable and a total number of information bits of the second DCI is less than or equal to a size of the first DCI format;
   wherein the second DCI is scrambled with a sounding reference signal (SRS) RNTI;
   wherein at least 4 bits of the second DCI are applicable to power control of the UE;

wherein the second DCI is received based on information of preceding DCI, wherein the preceding DCI specifies at least time and beam information corresponding to at least the second DCI.

2. The method of claim 1, wherein the third DCI is sent to a group of UEs;
wherein the SIB is provided to the UE by a relay node, wherein the subgroup information includes a number of subgroups.

3. The method of claim 1, wherein the third DCI includes a bitmap of paging information, wherein the length of the bitmap is determined via a relay node.

4. A base station comprising:
a transmitter that:
transmits first downlink control information (DCI) of a first DCI format;
transmits second DCI of a second DCI format, wherein the second DCI format is different than the first DCI format, wherein the second DCI format specifies a variable number of transmit power control (TPC) command bits, wherein the second DCI includes no less than 6 bits of TPC information;
transmits third DCI of a third DCI format which is different than the first DCI format and the second DCI format, wherein the third DCI format is a variable length DCI format, wherein the third DCI is scrambled according to a paging radio network temporary identifier (RNTI), wherein the third DCI includes information for a tracking reference signal; and
transmits subgroup information for processing the third DCI, via a system information block (SIB);
wherein a number of information bits of the second DCI is less than or equal to a size of the first DCI format;
wherein the second DCI is scrambled with a sounding reference signal (SRS) RNTI;
wherein the base station processes DCI that specifies at least time and beam information corresponding to at least the second DCI, before transmitting the second DCI.

* * * * *